US011815727B2

(12) United States Patent
Wells et al.

(10) Patent No.: US 11,815,727 B2
(45) Date of Patent: Nov. 14, 2023

(54) BLADED CHASSIS SYSTEMS

(71) Applicant: CommScope Technologies LLC, Hickory, NC (US)

(72) Inventors: Dennis Ray Wells, Richfield, MN (US); Rodney C. Schoenfelder, Shakopee, MN (US); Cyle D. Petersen, Belle Plaine, MN (US); Kamlesh G. Patel, Chanhassen, MN (US); Jonathan R. Kaml, Shakopee, MN (US); Matthew Holmberg, Le Center, MN (US); James J. Solheid, Lakeville, MN (US); Dennis Krampotich, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/712,950

(22) Filed: Apr. 4, 2022

(65) Prior Publication Data
US 2022/0229255 A1 Jul. 21, 2022

Related U.S. Application Data

(63) Continuation of application No. 17/104,758, filed on Nov. 25, 2020, now Pat. No. 11,294,134, which is a
(Continued)

(51) Int. Cl.
*G02B 6/44* (2006.01)
(52) U.S. Cl.
CPC .......... *G02B 6/4452* (2013.01); *G02B 6/4457* (2013.01); *G02B 6/4471* (2013.01)

(58) Field of Classification Search
None
See application file for complete search history.

(56) References Cited

U.S. PATENT DOCUMENTS

| 5,613,030 A | 3/1997 | Hoffer et al. |
| 5,823,646 A | 10/1998 | Arizpe et al. |

(Continued)

FOREIGN PATENT DOCUMENTS

| CN | 101981484 A | 2/2011 |
| CN | 203012204 U | 6/2013 |

(Continued)

OTHER PUBLICATIONS

Chinese Office Action for Application No. 201910551712.5 dated Apr. 9, 2020.
(Continued)

*Primary Examiner* — Chad H Smith
(74) *Attorney, Agent, or Firm* — Merchant & Gould P.C.

(57) ABSTRACT

A bladed chassis system facilitates installation of the bladed chassis system and replacement of the blades at the chassis. For example, a front panel of the blade can be opened either upwardly or downwardly at the discretion of the user. Blades can be inserted and removed from the front and/or the rear of the bladed chassis system at the discretion of the user. Cables can be routed to the rear of the chassis system from either of two sides at the discretion of the user. The blades carried by the chassis have fiber management trays that can be rotationally oriented in any desired rotational position at the discretion of the user.

20 Claims, 46 Drawing Sheets

Related U.S. Application Data continuation of application No. 16/518,464, filed on Jul. 22, 2019, now Pat. No. 10,852,500, which is a continuation of application No. 15/650,539, filed on Jul. 14, 2017, now Pat. No. 10,359,593, which is a continuation of application No. 14/747,854, filed on Jun. 23, 2015, now Pat. No. 9,709,765.

(60) Provisional application No. 62/159,084, filed on May 8, 2015, provisional application No. 62/082,429, filed on Nov. 20, 2014, provisional application No. 62/018,193, filed on Jun. 27, 2014, provisional application No. 62/015,886, filed on Jun. 23, 2014.

(56) References Cited

U.S. PATENT DOCUMENTS

| | | | |
|---|---|---|---|
| 5,969,294 | A | 10/1999 | Eberle et al. |
| D466,087 | S | 11/2002 | Cuny et al. |
| 6,582,255 | B2 | 6/2003 | Simmons et al. |
| 7,570,860 | B2 | 8/2009 | Smrha et al. |
| 7,570,861 | B2 | 8/2009 | Smrha et al. |
| 7,764,859 | B2 | 7/2010 | Krampotich et al. |
| 7,873,252 | B2 | 1/2011 | Smrha et al. |
| 7,873,253 | B2 | 1/2011 | Smrha et al. |
| 8,179,684 | B2 | 5/2012 | Smrha et al. |
| 8,184,938 | B2 | 5/2012 | Cooke et al. |
| 8,229,265 | B2 | 7/2012 | Solheid et al. |
| 8,340,490 | B2 | 12/2012 | Smrha et al. |
| 8,346,044 | B2 | 1/2013 | Smrha et al. |
| 8,712,206 | B2 | 4/2014 | Cooke et al. |
| 8,718,435 | B2 | 5/2014 | Marsac et al. |
| 8,867,884 | B2 | 10/2014 | Smrha et al. |
| 8,923,013 | B2 | 12/2014 | Anderson et al. |
| 8,934,252 | B2 | 1/2015 | Anderson et al. |
| 8,934,253 | B2 | 1/2015 | Anderson et al. |
| 8,953,921 | B2 | 2/2015 | Smrha et al. |
| 8,994,547 | B2 | 3/2015 | German |
| 9,020,319 | B2 | 4/2015 | Anderson et al. |
| 9,020,320 | B2 | 4/2015 | Cooke et al. |
| 9,069,150 | B2 | 6/2015 | Solheid et al. |
| 9,097,871 | B2 | 8/2015 | Smrha et al. |
| 9,128,262 | B2 | 9/2015 | Campbell et al. |
| 9,709,765 | B2 | 7/2017 | Wells et al. |
| 10,094,996 | B2 | 10/2018 | Cooke et al. |
| 10,120,153 | B2 | 11/2018 | Cooke et al. |
| 10,126,513 | B2 | 11/2018 | Wells et al. |
| 10,359,593 | B2 | 7/2019 | Wells et al. |
| 10,444,456 | B2 | 10/2019 | Cooke et al. |
| 10,852,500 | B2 | 12/2020 | Wells et al. |
| 2006/0269205 | A1 | 11/2006 | Zimmel |
| 2007/0189692 | A1 | 8/2007 | Zimmel et al. |
| 2008/0079341 | A1 | 4/2008 | Anderson et al. |
| 2009/0245743 | A1 | 10/2009 | Cote et al. |
| 2010/0054684 | A1 | 3/2010 | Cooke et al. |
| 2010/0086275 | A1 | 4/2010 | Krampotich et al. |
| 2011/0267794 | A1* | 11/2011 | Anderson ............ G02B 6/428 361/810 |
| 2011/0317974 | A1 | 12/2011 | Krampotich et al. |
| 2012/0114295 | A1 | 5/2012 | Guzzo et al. |
| 2014/0003782 | A1 | 1/2014 | Blackwell, Jr. et al. |
| 2014/0219614 | A1 | 8/2014 | Marcouiller et al. |
| 2014/0219615 | A1 | 8/2014 | Petersen et al. |
| 2015/0177780 | A1 | 6/2015 | Anderson et al. |
| 2015/0195945 | A1 | 7/2015 | Anderson et al. |
| 2015/0219869 | A1 | 8/2015 | Anderson et al. |
| 2015/0245530 | A1 | 8/2015 | Anderson et al. |
| 2015/0286021 | A1 | 10/2015 | Smrha et al. |
| 2015/0331214 | A1 | 11/2015 | Smrha et al. |
| 2015/0331215 | A1 | 11/2015 | Smrha et al. |
| 2015/0331216 | A1 | 11/2015 | Smrha et al. |

FOREIGN PATENT DOCUMENTS

| | | |
|---|---|---|
| WO | 02/089499 A2 | 11/2002 |
| WO | 2010/144310 A1 | 12/2010 |
| WO | 2010/147540 A1 | 12/2010 |

OTHER PUBLICATIONS

Extended European Search Report for Application No. 15812511.2 dated Dec. 21, 2017.
Extended European Search Report for Application No. 20180118.0 dated Nov. 30, 2020.
Partial International Search Report for Application No. PCT/US2015/037187 dated Oct. 15, 2015.
International Search Report and Written Opinion for Application No. PCT/US2015/037187 dated Dec. 15, 2015.
Office Action in copending European Application No. 15812511.2, which claims the benefit of the same priority document as the pending application; dated Jun. 2, 2020; 5 pages.

* cited by examiner

BLADED CHASSIS SYSTEMS

CROSS-REFERENCE TO RELATED APPLICATIONS

This application is a continuation of U.S. application Ser. No. 17/104,758, filed Nov. 25, 2020, now U.S. Pat. No. 11,294,134, which is a continuation of U.S. application Ser. No. 16/518,464, filed Jul. 22, 2019, now U.S. Pat. No. 10,852,500, which is a continuation of U.S. application Ser. No. 15/650,539, filed Jul. 14, 2017, now U.S. Pat. No. 10,359,593, which is a continuation of U.S. application Ser. No. 14/747,854, filed Jun. 23, 2015, now U.S. Pat. No. 9,709,765, which application claims the benefit of U.S. Provisional Application No. 62/015,886, filed Jun. 23, 2014, titled "Bladed Chassis Systems;" U.S. Provisional Application No. 62/018,193, filed Jun. 27, 2014, titled "Bladed Chassis Systems;" U.S. Provisional Application No. 62/082,429, filed Nov. 20, 2014, titled "Bladed Chassis Systems," and U.S. Provisional Application No. 62/159,084, filed May 8, 2015, titled "Bladed Chassis Systems," which applications are incorporated herein by reference in their entirety.

BACKGROUND

In bladed chassis systems, optical adapters are mounted to one or more blades that are disposable within a chassis. The blades can slide forwardly of the chassis to enhance access to the optical adapters. Cable clamps, anchors, or other fasteners can be fixed to the rear of the chassis to secure incoming cables in fixed positions relative to the chassis.

Improvements are desired.

SUMMARY

The present disclosure relates generally to a bladed chassis system at which blades can be inserted and removed from the front and can be inserted and removed from the rear at the discretion of the user. In certain examples, a rear portion of the chassis opens to enable insertion and/or removal of the blades at the rear. In certain examples, a front portion of the chassis opens to enable insertion and/or removal of the blades at the front.

In accordance with some aspects of the disclosure, a chassis system includes a housing, a cable bracket, and a bracket cover. The housing includes first and second sidewalls extending between a bottom wall and a top wall to define an interior. The first and second sides also extend between an open front of the housing and an open rear of the housing. The cable bracket is coupled to the housing at the open rear. The cable bracket is configured to pivot relative to the housing between a first position and a second position. The cable bracket extends at least partially across the open rear when in the first position. The cable bracket does not extend across the open rear when in the second position. The bracket cover is coupled to the housing at the open rear. The bracket cover is configured to pivot relative to the housing between a first position and a second position. The bracket cover extends at least partially across the open rear when in the first position. The bracket cover does not extend across the open rear when in the second position. The bracket cover is configured to fasten to the cable bracket to hold the bracket cover and bracket in the first positions.

In certain examples, a blade is configured to mount within the interior of the housing, the blade including at least one optical adapter. In an example, the blade includes a plurality of optical adapters. In an example, the blade is configured to slide relative to the housing.

In certain examples, the blade includes a fiber management tray including a fiber spool. In examples, the blade includes two fiber management trays. In an example, the fiber management tray is configured to hold at least one fanout device. In an example, the fiber management tray is configured to hold a plurality of fanout devices.

In an example, the blade is removable from the interior of the housing through the open front. In an example, the blade is removable from the interior of the housing through the open rear when the cable bracket and the bracket cover are in the second positions.

In certain examples, a front panel is configured to removably couple to the chassis. The front panel extends across the open front of the chassis. In examples, arms extending forwardly of the housing, each arm defining a pivot hinge. The front panel includes slots sized to receive the pivot hinges of the arms to pivotally couple the front panel to the chassis.

In an example, the arms are mounted towards the top of the housing, wherein the blade is removable from the housing through the open front when the front panel is pivoted open. In an example, the arms are mounted towards the bottom of the housing. The blade is removable from the housing through the open front when the front panel is pivoted open. In an example, two of the arms are mounted towards the top of the housing and two of the arms are mounted towards the bottom of the housing.

In certain examples, the cable bracket is configured to receive a clamping assembly for holding one end of a cable to the cable bracket. The cable bracket carries the end of the cable as the cable bracket pivots between the first and second positions.

In accordance with other aspects of the disclosure, a blade arrangement for use in a chassis system includes a blade including a base extending between sidewalls that define outwardly facing slides; optical adapters disposed on the base; a fiber management tray disposed on the base; and forwardly extending arms having forward ends defining cable retainers. The optical adapters have forwardly facing ports and rearwardly facing ports. The fiber management tray includes a spool and a fanout holder that is configured to hold a fanout device. The fiber management tray defines a fastener opening that defines a rotational axis. The fiber management tray is configured to rotationally couple to the base in any desired rotational orientation about the rotational axis, thereby enabling any fanout device held by the fanout holder to be disposed in any desired rotational orientation about the rotational axis.

In examples, the fanout holder of the fiber management tray is configured to hold a second fanout device. In examples, at least some of the forwardly extending arms define mounts for the plurality of optical adapters. In an example, at least one of the forwardly extending arms is integral with the base.

In accordance with other aspects of the disclosure, a method of replacing a blade within a chassis system includes decoupling a bracket cover from a cable bracket at a rear of a chassis; pivoting the bracket cover and the cable bracket away from the chassis to reveal an open rear of the chassis; and sliding the blade out of the chassis through the open rear. The cable bracket carries a cable routed into the chassis through the rear of the chassis.

In certain examples, the method of replacing also includes sliding a replacement blade into the chassis through the open rear; pivoting the cable bracket to extend partially across the open rear; pivoting the bracket cover to contact the cable bracket, thereby closing the open rear; and coupling the bracket cover to the cable bracket.

In accordance with other aspects of the disclosure, a kit for installing a bladed chassis system includes a chassis housing defining an interior; a cable bracket that is mountable to an open rear of the chassis housing; and a bracket cover that is mountable to the chassis housing at the open rear. The cable bracket is pivotally coupled to the chassis housing at a selected one of the first side and the second side of the chassis housing. The cable bracket extends across a first portion of the open rear of the chassis housing when pivoted to a closed position. The cable bracket reveals the first portion of the open rear when pivoted to an open position. The bracket cover is pivotally coupled to the chassis housing at the other of the first side and the second side of the chassis housing. The bracket cover extends across a second portion of the open rear of the chassis housing when pivoted to a closed position. The bracket cover reveals the second portion of the open rear when pivoted to an open position.

In accordance with other aspects of the disclosure, a method of installing a bladed chassis system at a frame includes providing a bladed chassis system including a chassis, a cable bracket, and a plurality of blades. The cable bracket is pivotally coupled to a rear of the chassis to define an exposed cable port facing in a first direction and a covered cable port facing in a second direction that is different from the first direction. The method also includes determining whether the first side or the second side of the frame is a cabled side by determining whether a cable is disposed at the first side or the second side of the frame; orienting the chassis at the frame in a first orientation so that the exposed cable port faces towards the cabled side of the frame; mounting the cable to the cable bracket and closing the rear of the chassis with the cable bracket; and installing the blades in the chassis while the chassis is oriented in the first orientation.

In certain examples, the method also includes mounting a front panel to the chassis while the chassis is oriented in the first orientation.

In certain examples, the method also includes removing the blades from the chassis; moving the cable bracket to an open position and detaching the cable from the cable bracket; flipping the chassis upside-down into a second orientation and mounting the chassis in the second orientation; mounting the cable to the cable bracket and closing the rear of the chassis with the cable bracket; installing the blades in the chassis while the chassis is oriented in the second orientation; and mounting the front panel to the chassis while the chassis is oriented in the second orientation.

In accordance with other aspects of the disclosure, a chassis system includes a housing and blades configured to slide relative to the housing and to be retained within the housing. The housing includes first and second sidewalls extending between a bottom wall and a top wall to define an interior. The first and second sides also extend between an open front of the housing and an open rear of the housing. Each of the first and second sides includes a guide member. Each blade includes a latching arrangement configured to cooperate with the guide member to lock the blade into at least one discrete position and to allow the blade to selectively move relative to the housing between the discrete positions.

In certain implementations, the latching arrangement of each blade is configured to lock the blade into an operation position and into a connector access position, which is located forwardly of the operation position. In certain examples, the latching arrangement of each blade is configured to lock the blade into an adapter access position, which is located forwardly of the connector access position. In certain examples, each blade is further movable relative to the housing to a discrete position located rearwardly of the operation position.

In certain implementations, the blade is removable from the housing through the open front. In certain implementations, the blade is removable from the housing through the open rear.

In certain implementations, each guide member has an inner surface through which one or more channels are defined. The channels are elongated between the front and rear of the inner surface. Each channel is sized to receive the slide of one blade. A forward end of each channel is open to the front of the housing. Each channel defines a notch at a stop location along the channel. Each channel also defines a trough recessed rearwardly from the forward end of each channel.

In certain implementations, each latching arrangement includes a slide sized and shaped to ride along one of the channels of the guide member, two forward stop members disposed at opposite sides of the slide, and a rearward stop member that extends outwardly beyond the slide. The two forward stop members do not extend laterally outwardly beyond the slide. Each latching arrangement also includes a forward deflectable handle and a rearward deflectable handle. Deflection of the forward handle causes the forward stop members to move towards the blade and deflection of the rearward handle causes the rearward stop member to move towards the blade.

In certain examples, a spring is coupled to the blade to strengthen the forward handle.

In certain examples, a latch member also is coupled to the blade. The latch member has forward and rearward ends that pivot relative to the blade about the pivot location. The forward end of the latch body defines a handle. The rearward end of the latch body includes a stop member so that the stop member deflects laterally inwardly when the handle is deflected laterally outwardly.

In certain implementations, the guide member includes a rail configured to glide within a channel defined by the latching arrangement. In certain examples, the latching arrangement includes a body that supports a first handle, a second handle, and one or more stop members, each handle can be moved forwardly and rearwardly relative to the body along a travel distance.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure relates generally to a bladed chassis system that facilitates installation of the bladed chassis system and replacement of the blades at the chassis. For example, in certain examples, a front panel of the blade can be opened either upwardly or downwardly at the discretion of the user. In certain examples, blades can be inserted and removed from the front and/or the rear of the bladed chassis system at the discretion of the user. In certain examples, cables can be routed to the rear of the chassis system from either of two sides at the discretion of the user. In certain examples, the blades carried by the chassis have fiber management trays that can be rotationally oriented in any desired rotational position at the discretion of the user.

Figure 1:
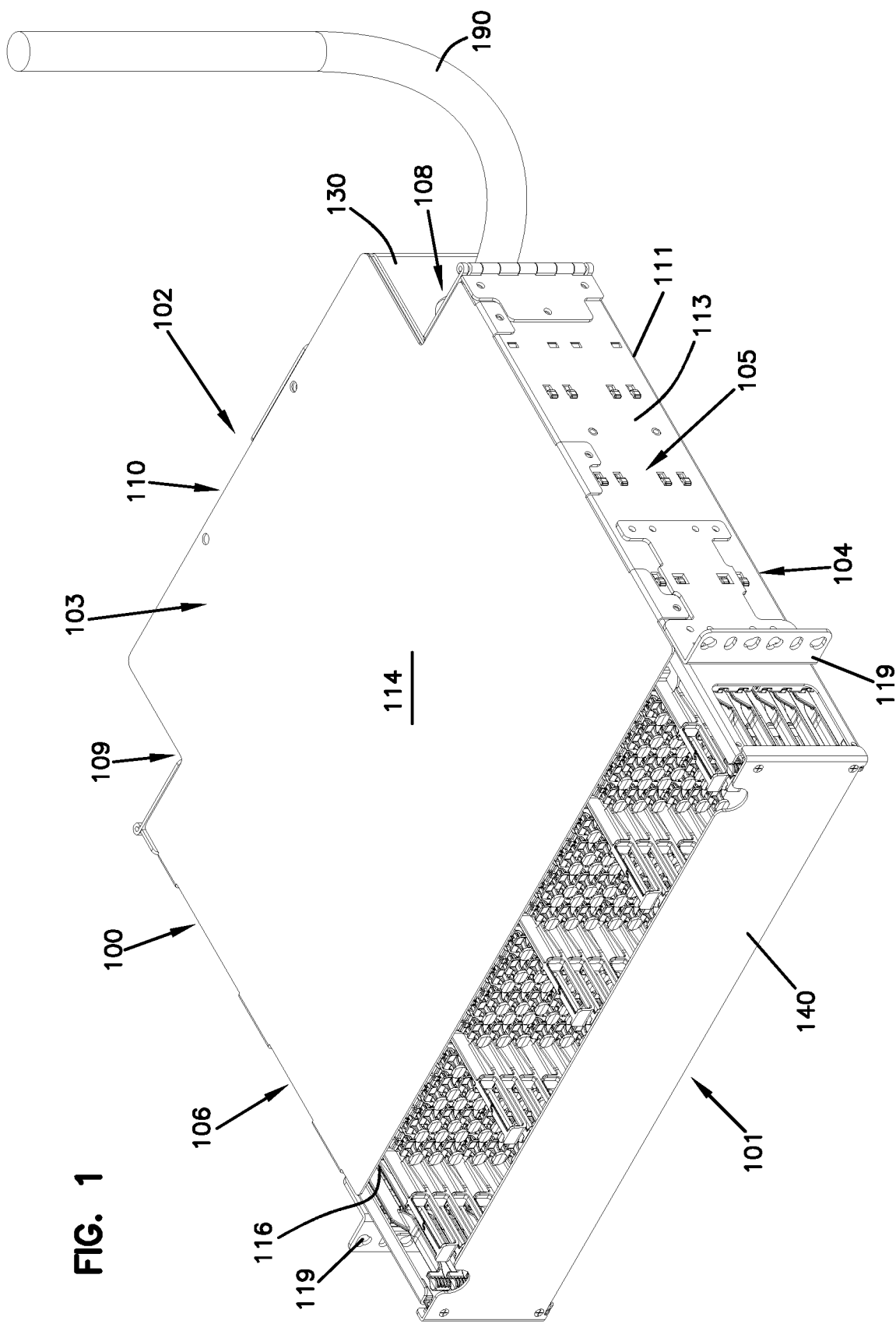
FIG. 1 is a front perspective view of an example bladed chassis system including blades mounted within a chassis and a multi-fiber cable routed to a rear of the chassis.
Figure 2:
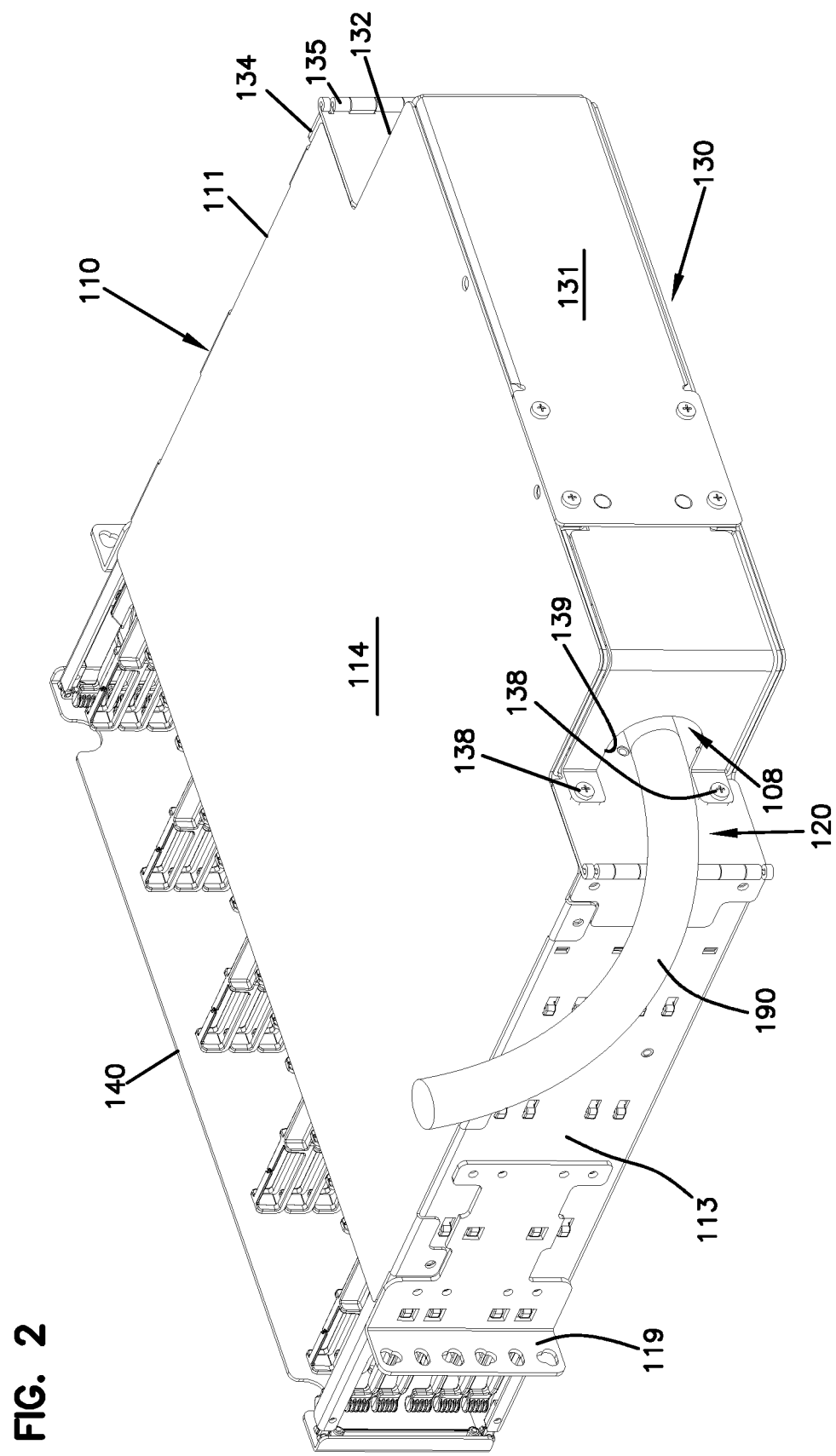
FIG. 2 is a rear perspective view of the bladed chassis system of FIG. 1.
Figure 3:
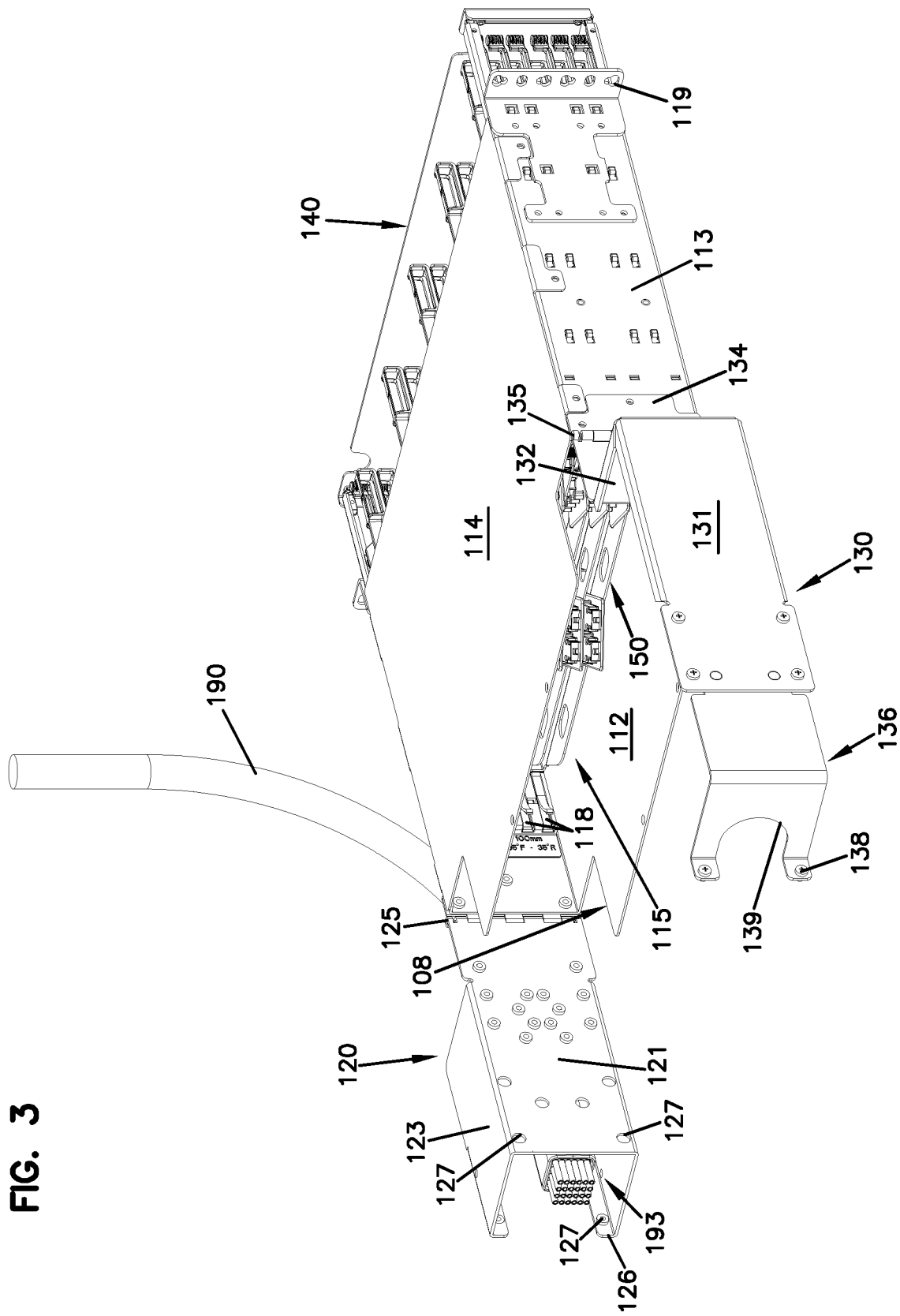
FIG. 3 is a rear perspective view of the bladed chassis system of FIG. 1 with a cable bracket and a bracket cover moved to open positions.

FIGS. 1-3 illustrate one example bladed chassis system 100 including a chassis 110 and a blade 150, 160. The chassis system 100 has a front 101, a rear 102, a top 103, a bottom 104, a first side 105, and a second side 106. The chassis 110 includes a housing 111 having two sidewalls 113 extending between a first end wall 112 (FIG. 3) and a second end wall 114 (FIG. 1). The first end wall 112, sidewalls 113, and second end wall 114 define an interior 115 (FIG. 3) having an open front 116 and an open rear 117 (FIG. 3). Interior surfaces of the sidewalls 113 define guide channels 118 at which the blades 150, 160 can be received (see FIG. 3). Mounting brackets 119 are disposed at exterior surfaces of the sidewalls 113.

The chassis system 100 is configured to receive one or more multi-fiber cables 190 at the rear 102 of the chassis system 100. In certain examples, the chassis system 100 defines one or more side ports 108, 109 at the rear 102 of the chassis system 100. As will be described in more detail herein, one or more multi-fiber cables 190 can be received and anchored at one of the ports 108, 109 at the discretion of the user. In certain implementations, the other of the ports 108, 109 can be covered to protect the optical fibers within the interior 115 of the chassis 110.

A cable bracket 120 and a bracket cover 130 are mounted to the chassis housing 111 at the open rear 117. Each of the cable bracket 120 and the bracket cover 130 are movable between an open position and a closed position. The cable bracket 120 and the bracket cover 130 cooperate to close the open rear 117 when both are disposed in the closed positions (see FIG. 2). The cable bracket 120 and the bracket cover 130 also cooperate to define one of the side ports 108, 109 and to cover the other of the side ports 108, 109 when disposed in the closed positions. Moving both the cable bracket 120 and bracket cover 130 to the open positions reveals the open rear sufficient to enable a blade 150, 160 to be inserted and/or removed at the open rear 117 of the chassis housing 111 (see FIG. 3).

Figure 4:
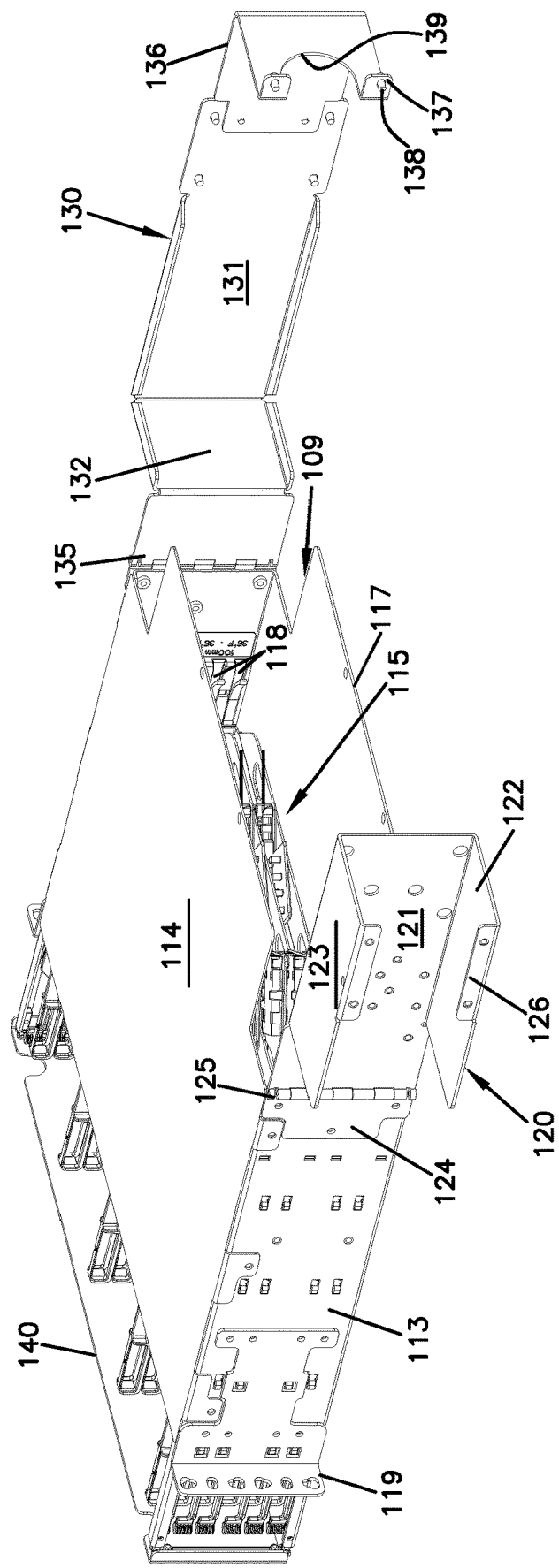
FIG. 4 is a perspective view of the bladed chassis system of FIG. 3 from an opposite side of the system with the cable removed.
Figure 5:
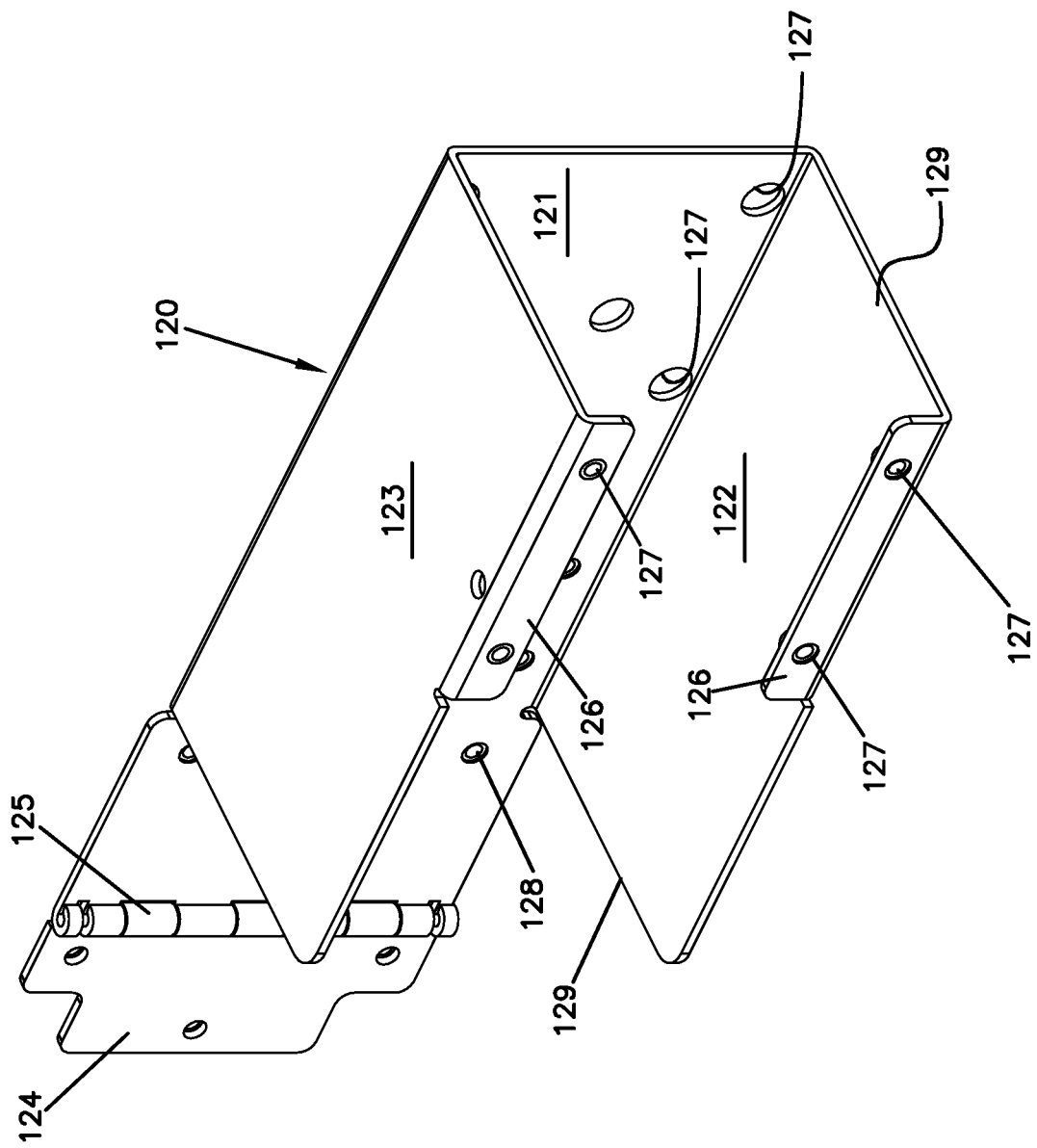
FIG. 5 is a perspective view of an example cable bracket suitable for use in bladed chassis systems.

FIGS. 4 and 5 illustrate one example cable bracket 120 configured to be utilized in the chassis system 100. The cable bracket 120 is configured to carry one or more multi-fiber cables 190 (e.g., see FIG. 3). In certain implementations, the cable bracket 120 includes a bottom member 122 and a top member 123 extending outwardly from a closure wall 121. A hinge bracket 124 is pivotally coupled to the closure wall 121 using a hinge 125. The hinge bracket 124 is coupled to the chassis housing 111 (e.g., at one of the sidewalls 113) to pivotally mount the cable bracket 120 to the chassis 110. Accordingly, in the example shown, the cable bracket 120 is configured to pivot between a closed position and an open position. The cable bracket extends at least partially across the open rear 117 of the chassis housing 111 when in the closed position. The cable bracket 120 does not extend across the open rear 117 when in the open position.

Figure 6:
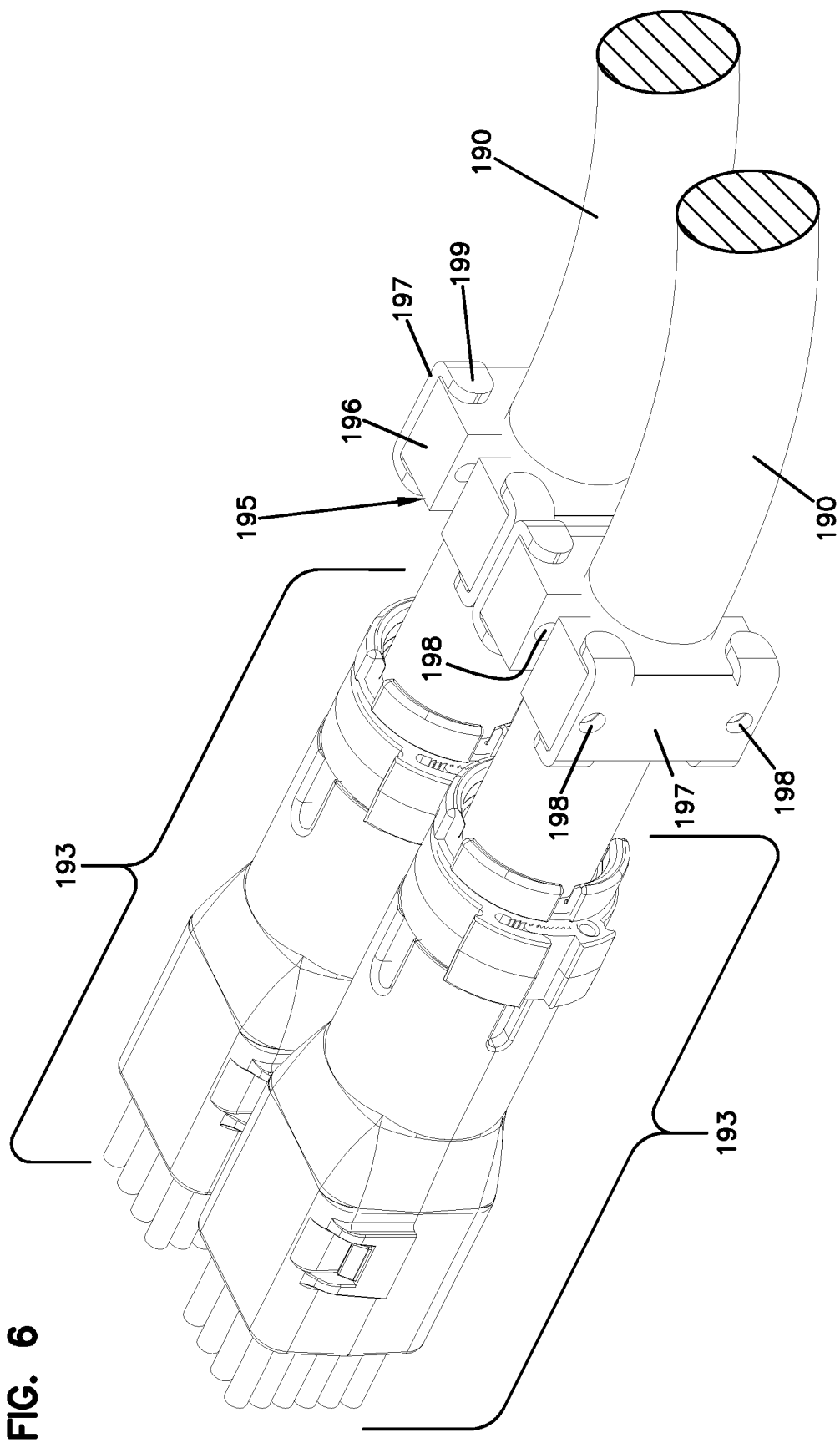
FIG. 6 is a perspective view of an example clamping assembly suitable for use in bladed chassis systems.

The cable bracket 120 is configured to support a clamping assembly 195 to secure the cable 190 to the cable bracket 120. FIG. 6 illustrates one example clamping assembly 195 for holding one or more cables. The clamping assembly 195 includes one or more gasket members 196 held between two clamp members 197. The gasket member(s) 196 is disposed around a cable 190 to be clamped. The clamp members 197 and gasket members 196 define aligned fastener apertures 198 through which a fastener can extend to hold the clamp members 197 and gasket members 196 together. Tightening the fastener increases a compressive force between the two clamp members 197. In certain examples, one or more clamping assemblies 195 can be disposed adjacent each other so that the fastener apertures 198 align. Accordingly, a fastener can simultaneously apply a compressive force to multiple clamping assemblies 195.

Figure 8:
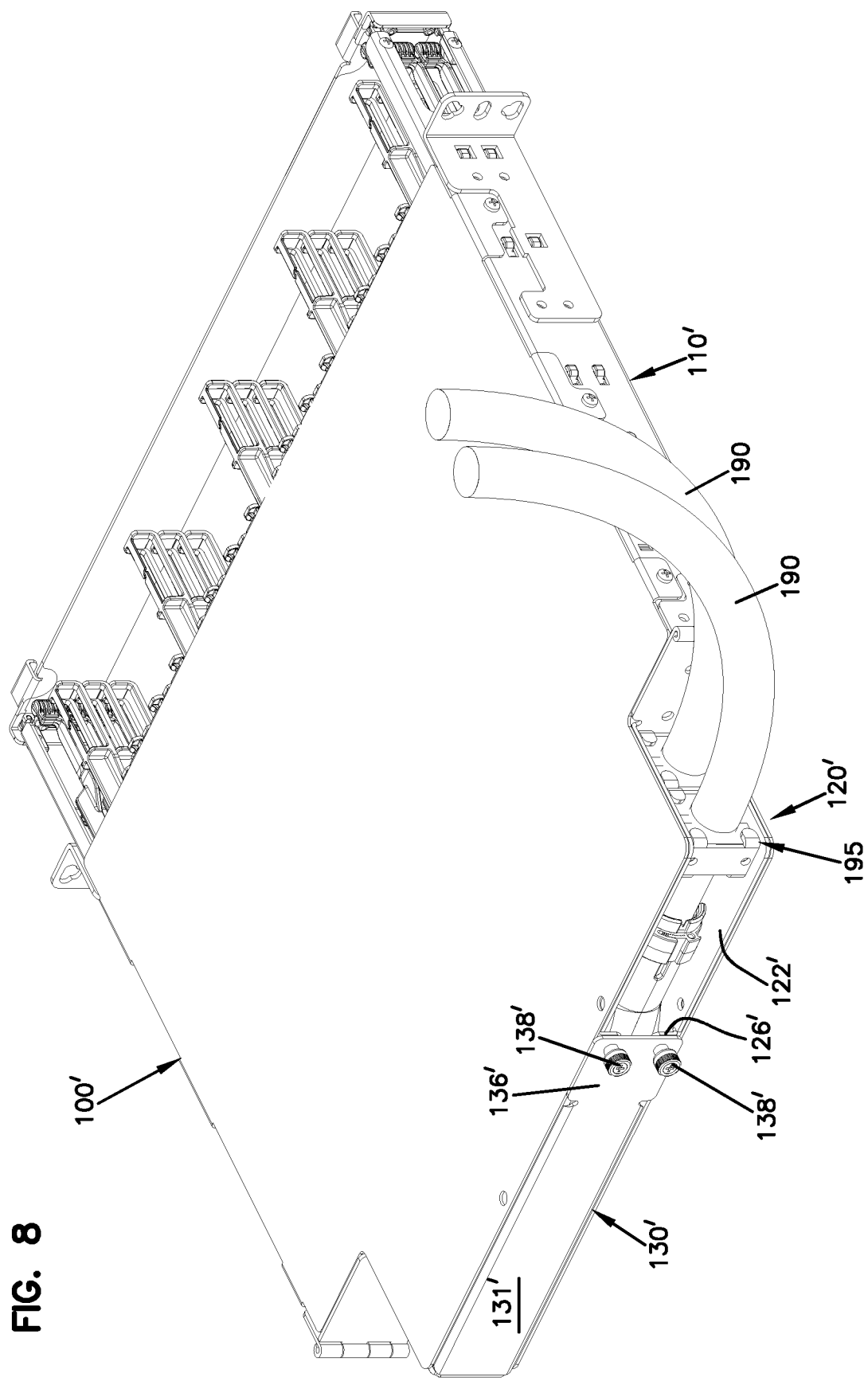
FIG. 8 is a perspective view of another example bladed chassis system.

As shown in FIG. 5, the closure wall 121 of the cable bracket 120 defines first apertures 127 that are sized and positioned to align with the fastener apertures 198 of a clamping assembly 195 mounted to the cable bracket 120 (e.g., see FIG. 8). Accordingly, the fastener can be inserted through the closure wall 121 (via the first apertures 127) in addition to the clamping assembly 195, thereby securing the clamping assembly 195 to the closure wall 121. In certain examples, the cable bracket 120 includes support members 126 at an opposite side of the top and bottom members 122, 123 from the closure wall 121. The support members 126 also define fastener apertures 127 to receive the fasteners of the clamping assemblies 195. The support members 126 may provide a bracing surface for a nut to hold the fasteners in position.

The bottom and top members 122, 123 of the cable bracket 120 define open ends 129 to accommodate the cable 190 and fibers 191 (FIG. 3) extending from the cable bracket 120. In particular, the cable 190 extends into the cable bracket 120 at a first of the ends 129 and fibers 191 of the cable 190 extend out of the cable bracket 120 at a second of the ends 129. Accordingly, the first end 129 of the cable bracket 120 provides access to one of the side ports 108, 109 of the chassis system 100. The cable bracket 120 also includes second apertures 128 spaced from the first apertures 127. In certain examples, the second apertures 128 are laterally spaced along the closure wall 121 from the bottom member 122 and the top member 123 (see FIG. 5). In examples, the second apertures 128 are disposed between the hinge 125 and the second open end 129 (see FIG. 5).

FIGS. 2-4 illustrate one example bracket cover 130 configured to be utilized in the chassis system 100. The bracket cover 130 includes a closure wall 131 that is coupled to a hinge bracket 134 via a hinge 135. The hinge bracket 134 is coupled to the chassis housing 111 (e.g., at one of the sidewalls 113) to pivotally mount the bracket cover 130 to the chassis 110. Accordingly, in the example shown, the bracket cover 130 is configured to pivot between a closed position and an open position. The bracket cover 130 extends at least partially across the open rear 117 of the chassis housing 111 when in the closed position. The bracket cover 130 does not extend across the open rear 117 when in the open position.

The bracket cover 130 is configured to secure to the cable bracket 120 to hold the cable bracket 120 in position. For example, the closure wall 131 includes or is coupled to a fastening section 136 that defines apertures 137 (FIG. 4) that align with the second apertures 128 of the cable bracket 120 when the bracket cover 130 and cable bracket 120 are disposed in the closed positions. One or more fasteners (e.g., set screws) 138 extend through the apertures 137 and the second apertures 128 to releasably secure the bracket cover 130 to the cable bracket 120. Loosening or removing the fasteners 138 enables the bracket cover 130 to be moved (e.g., pivoted) away from the cable bracket 120.

The bracket cover 130 is configured to close one of the side ports 108, 109. For example, the bracket cover 130 includes a port cover 132 that extends across one of the side ports 108, 109 when the bracket cover 130 is disposed in the closed position. In examples, the port cover 132 is located closer to the hinge 135 than t the apertures 137. In certain implementations, the bracket cover 130 also includes a notch 139 or aperture that provides access to one of the side ports 108, 109. In examples, the notch 139 is located at an opposite side of the closure wall 131 from the port cover 132 (see FIG. 4). In an example, the apertures 137 are located at the first end 129 of the cable bracket 120 when the bracket cover 130 is coupled to the cable bracket 120 (e.g., see FIG. 2). In another example, the apertures 137 are located at the second end 129 of the cable bracket 120 when the bracket cover 130 is coupled to the cable bracket 120 (e.g., see FIG. 8).

Figure 7:
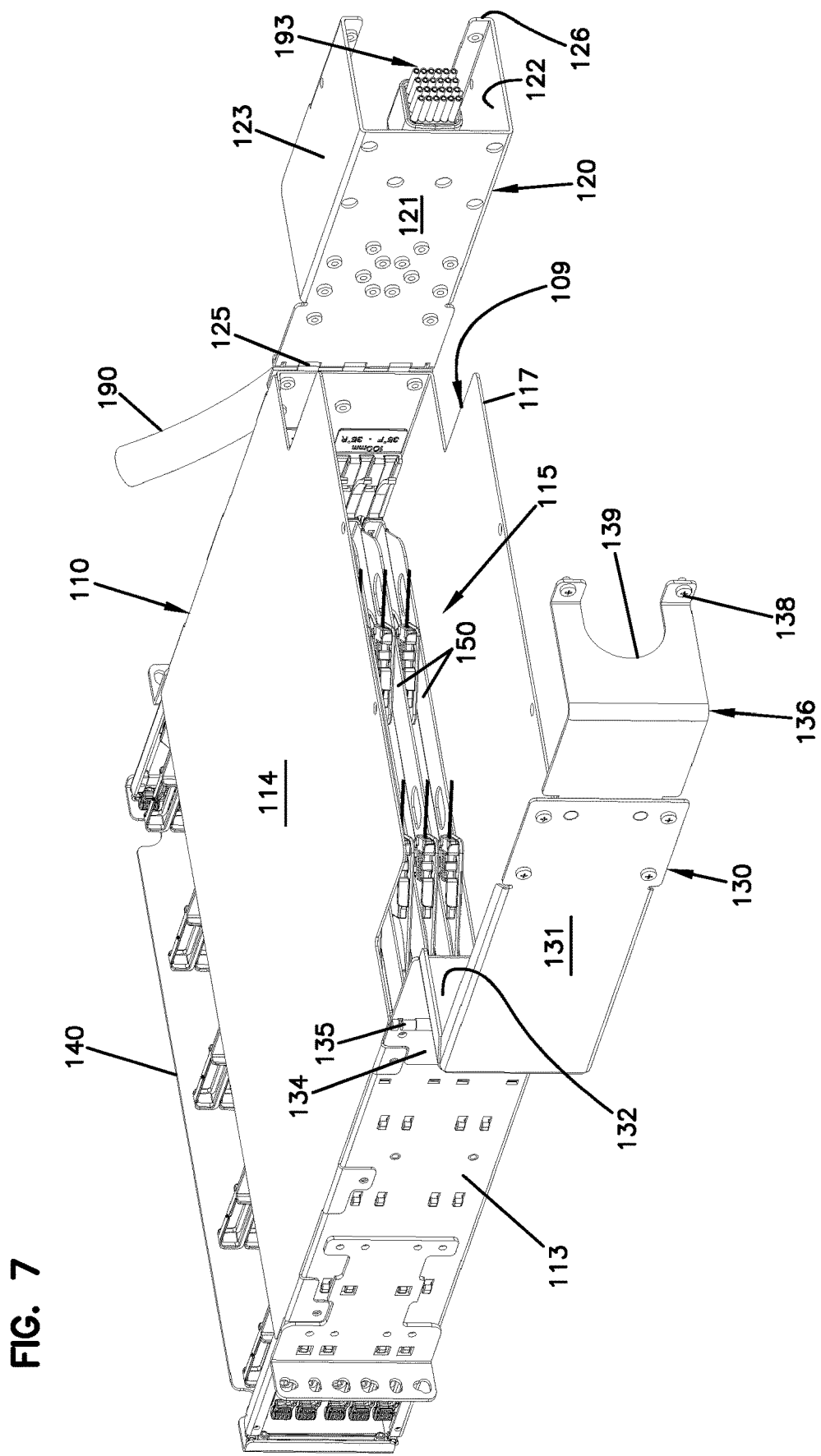
FIG. 7 is a perspective view of an example bladed chassis system with the cable bracket and the bracket cover mounted to opposite sides compared to the bladed chassis system of FIG. 3.

In some implementations, the cable bracket 120 and the bracket cover 130 are symmetrical about a horizontal axis. Accordingly, each of the cable bracket 120 and the bracket cover 130 can be selectively mounted to either side 105, 106 of the chassis housing 111, e.g., by flipping the piece upside down (compare FIGS. 3 and 7). The cable bracket 120 and bracket cover 130 enable a user, during installation of the chassis system 100, to select at which of the sides 105, 106 of the chassis system 100 the user wants to introduce the multi-fiber cable(s) 190. The user mounts the cable bracket 120 to the selected side 105, 106 and mounts the bracket cover 130 to the other side 105, 106.

In accordance with some aspects of the disclosure, the chassis 110 can be flipped upside-down to change the direction in which the open port 108, 109 faces without using tools. Flipping the chassis 110 causes the open port 108, 109 to face in the opposite direction from where it was facing. The guides 118 of the chassis 110 are structured to receive the blades 150 in a first orientation and in a second orientation that is flipped 180° from the first orientation. Accordingly, the blades 150 can be installed in the chassis 110 when the chassis is disposed in a first orientation; the blades 150 also can be installed in the chassis 110 when the chassis 110 is disposed in a second orientation that is flipped 180° from the first orientation.

Figure 20:
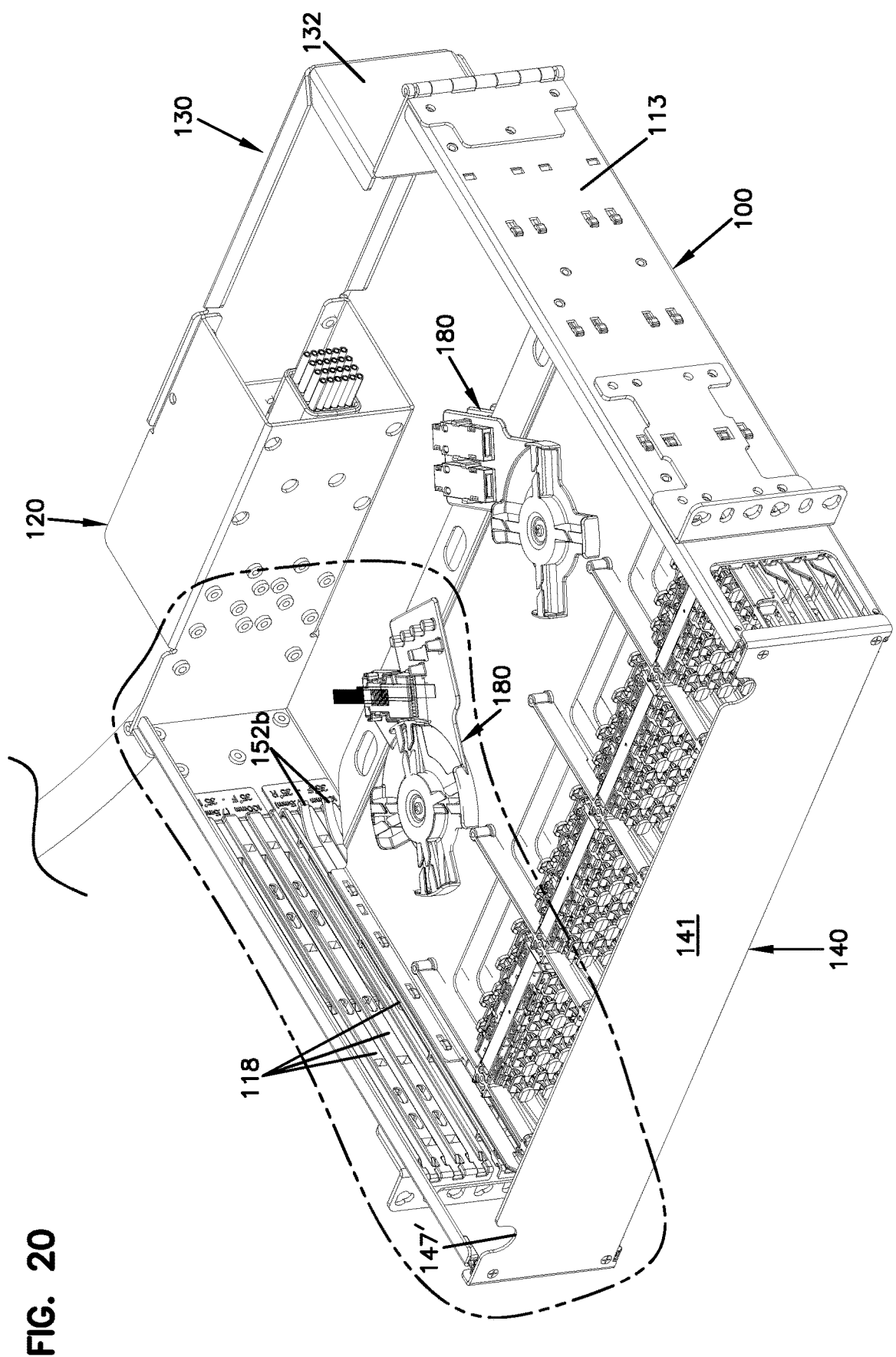
FIG. 20 is a perspective view of the bladed chassis system of FIG. 1 with a first end wall and some of the blades removed to expose the guide channels.
Figure 21:
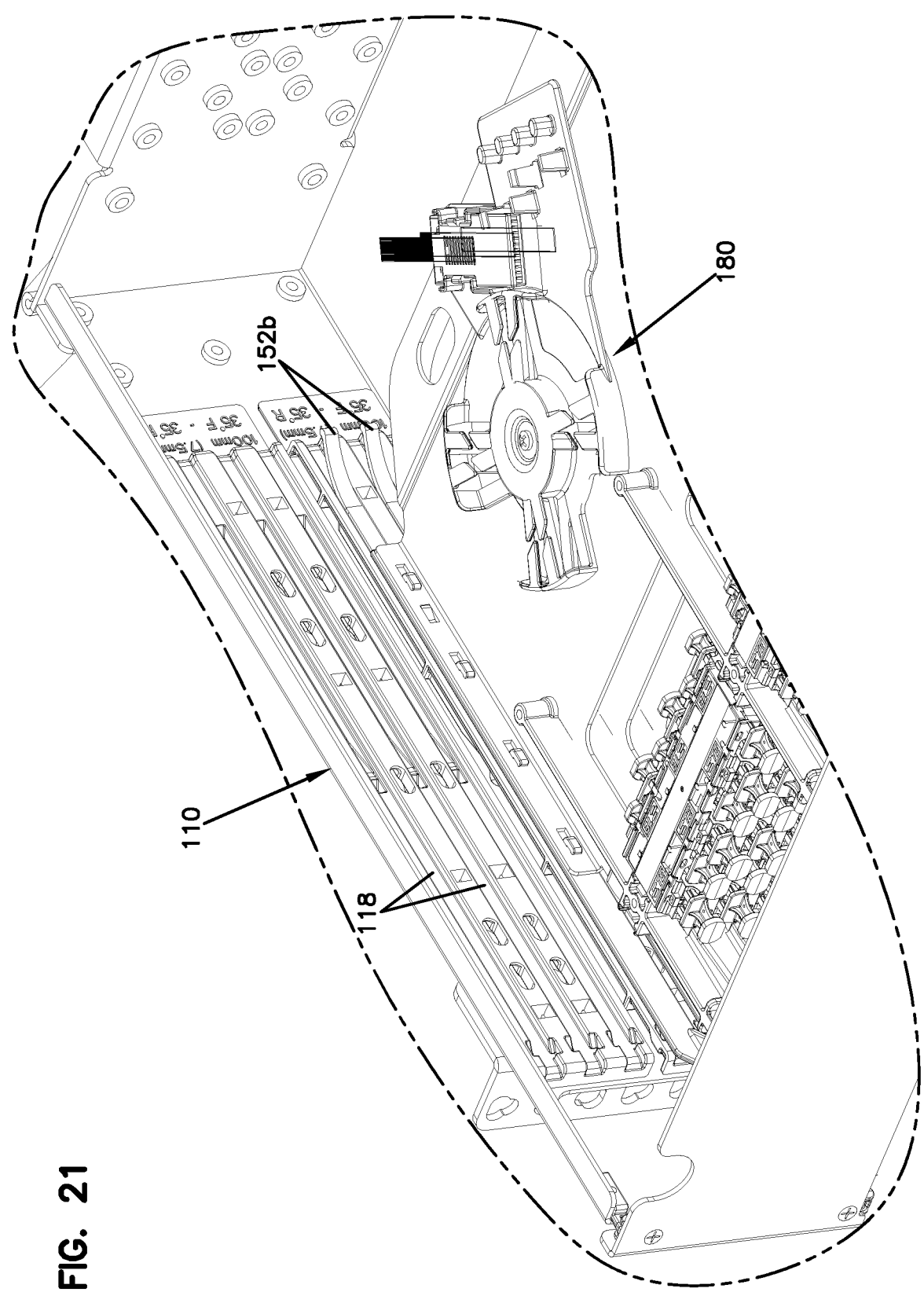
FIG. 21 is an enlarged view of a portion of FIG. 20.

For example, as shown in FIGS. 20 and 21, the guides 118 include channels recessed into an interior surface of each sidewall 113. In certain examples, the guide channels 118 extend between the open front 116 and the open rear 117 of the chassis 110. In certain examples, the guide channels 118 are symmetrical about a horizontal axis.

When the bladed chassis system 100 is installed at a frame, the chassis 110 can be installed in either the first orientation or the second orientation based on where the cable is routed to on the frame. If the cable is routed to the first side of the frame, then the chassis 110 can be installed in the first orientation so that the open cable port faces the first side of the frame and the closed cable port faces the second side of the frame. If the cable is routed to the second side of the frame, then the chassis 110 can be installed in the second orientation so that the open cable port faces the second side of the frame and the closed cable port faces the first side of the frame. The blades 150 can be inserted into the chassis in the same orientation relative to the frame regardless of whether the chassis is mounted in the frame in the first or second orientation. As will be discussed in more detail herein, a front panel 140 can be coupled to the chassis 110 regardless of the orientation of the chassis 110.

FIG. 8 illustrates another example bladed chassis system 100' including a chassis 110' and a blade 150, 160. The bladed chassis system 100' is substantially similar to the bladed chassis system 100 shown in FIGS. 1-7 except for the design of the cable bracket 120' and the bracket cover 130'. The cable bracket 120' and the bracket cover 130' are substantially the same as the cable bracket 120 and bracket cover 130 shown in FIGS. 1-7, except as discussed below.

The cable bracket 120' shown in FIG. 8 does not include support members opposite the closure wall. Furthermore, the closure wall of the cable bracket 120' does not define the second apertures for receiving fasteners 138' from the bracket cover 130. Rather, retention flanges 126' extend from the bottom 122' member and top member of the cable bracket 120'. Each retention flange 126' defines an aperture through which one of the fasteners 138' can extend to secure the bracket cover 130' to the cable bracket 120'.

The bracket cover 130' shown in FIG. 8 does not include a notch providing access to the open side port 108, 109. Rather, the fastening section 136' of the bracket cover 130' is coplanar with the closure wall 131'. The fastening section 136' extends across the retention flanges 126' of the cable bracket 120' to align the fastener apertures when the cable bracket 120' and the bracket cover 130' are in the closed positions.

Figure 9:
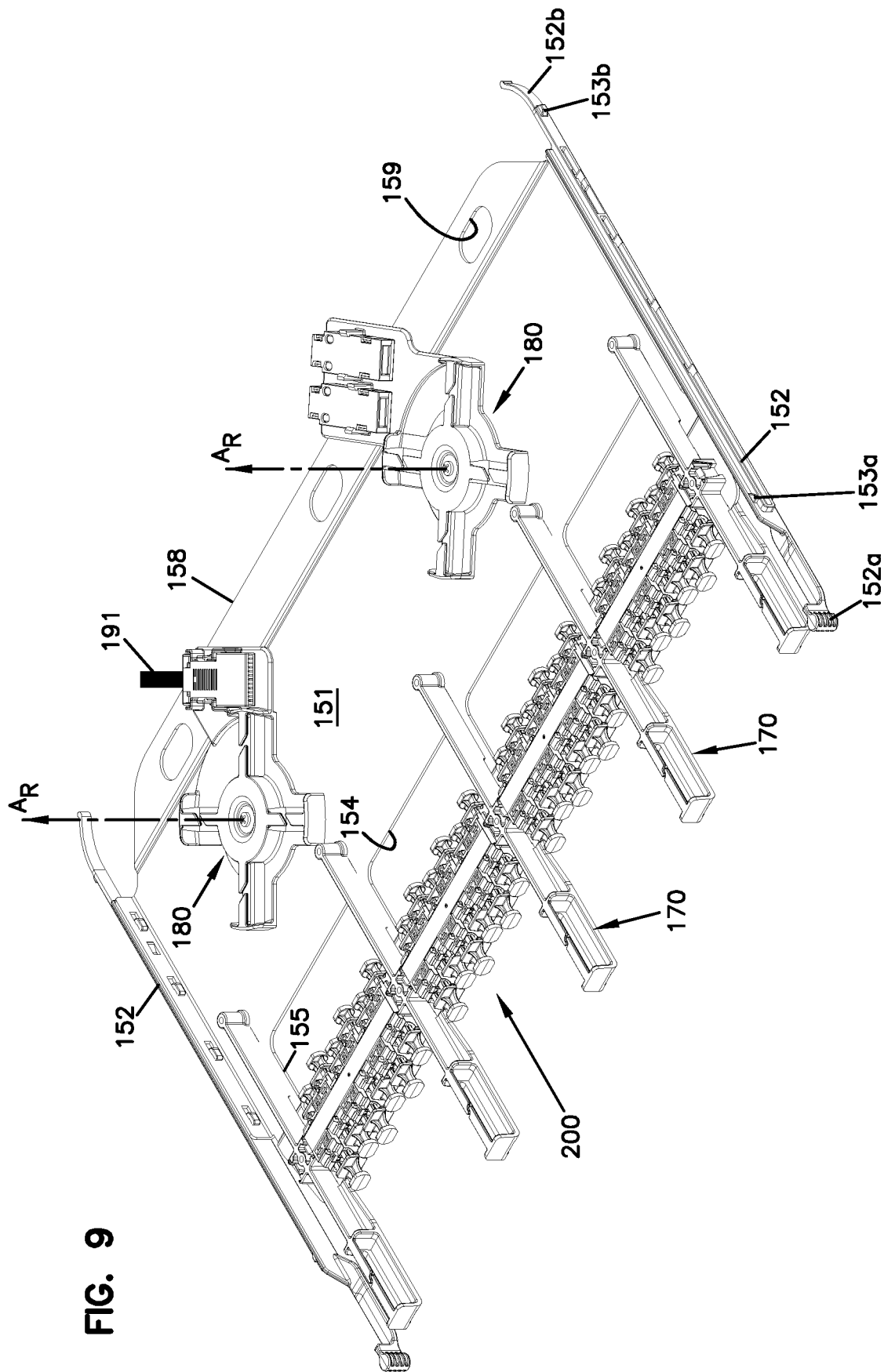
FIG. 9 is a perspective view of an example blade suitable for use in any of the bladed chassis systems disclosed herein.
Figure 10:
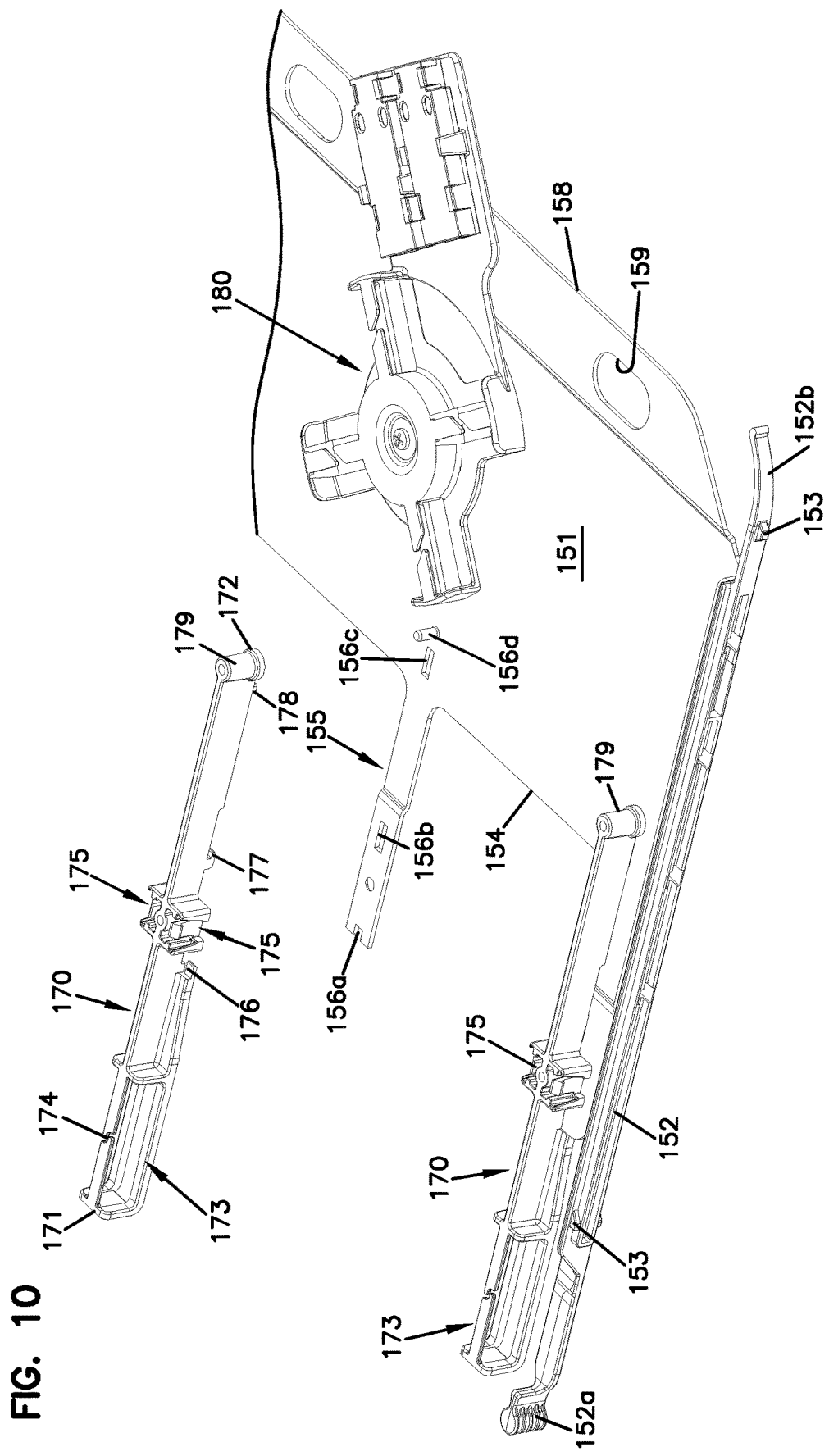
FIG. 10 is an enlarged view of a portion of FIG. 9 with an adapter mounting arrangement exploded from a base of the blade.
Figure 11:
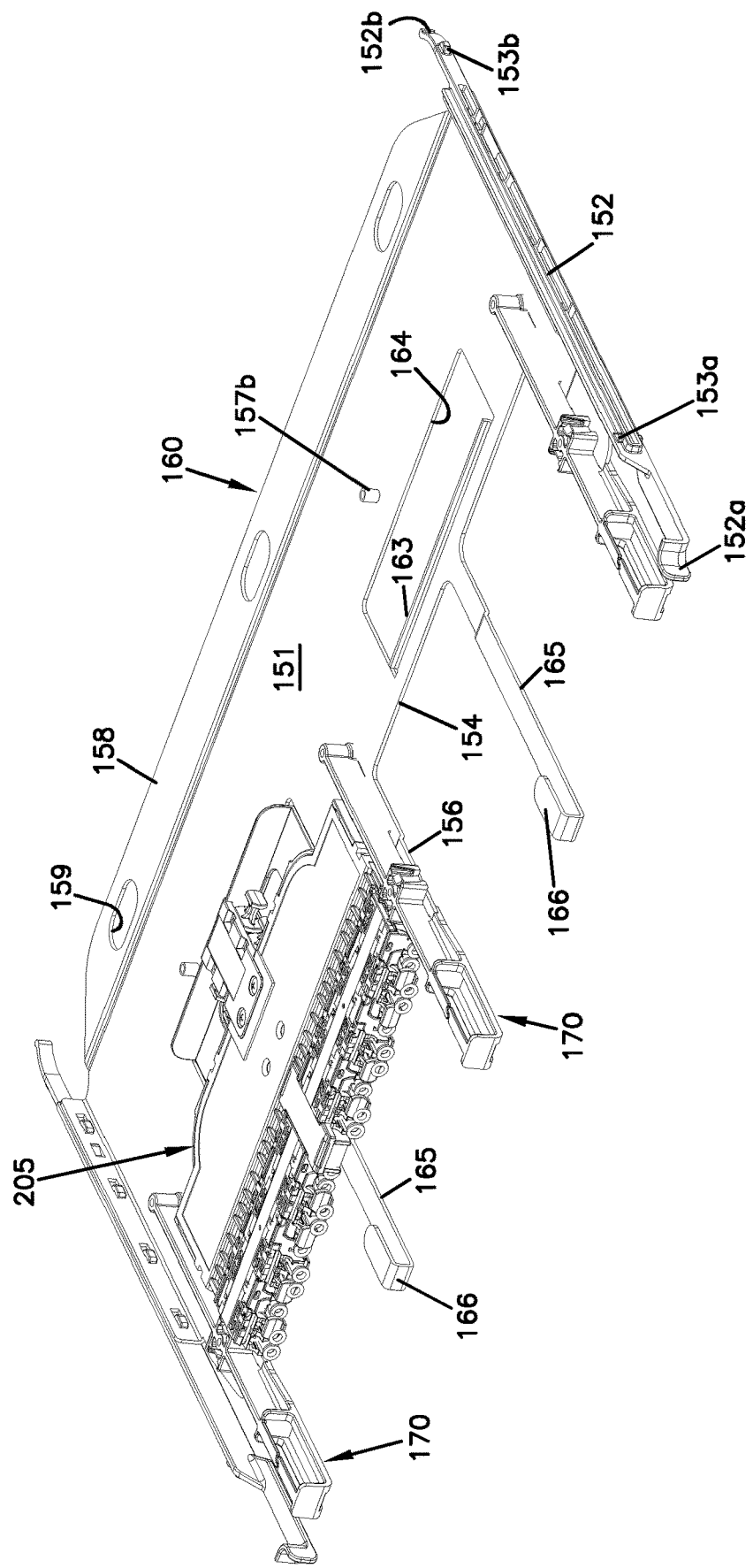
FIG. 11 is a perspective view of another blade suitable for use in any of the bladed chassis systems disclosed herein.

FIGS. 9-11 illustrate example blades 150, 160 configured to mount within the interior 115 of a bladed chassis system 100, 100'. Each blade 150, 160 includes a base 151 having slides 152 disposed at opposite sides thereof. The slides 152 are configured to ride in the guides 118 defined in the chassis 110. The slides 152 enable the blade 150, 160 to slide forwardly and rearwardly relative to the chassis 110. Each slide 152 includes a first release 152*a* at the forward end of the blade 150, 160 and a second release 152*b* at the rearward end of the blade 150. Each blade 150, 160 also includes a forward and rearward catch or stop 153. Flexing the first release 152*a* releases the forward stop 153 from an interior surface of the chassis sidewalls 113. Flexing the second release 152*b* releases the rearward stop 153 from an interior surface of the chassis sidewalls 113.

A front edge 154 of the base 151 is disposed at an intermediate position along the slides 152. A rearward edge is disposed towards the rearward end of the slides 152. In certain examples, a flange 158 extends from a rearward edge of the base 151 of the blade 150, 160. In some examples, the flange 158 defines one or more openings 159 to provide a handle for a user to withdraw the blade 150, 160 through the rear 117 of the chassis 110. In other examples, the flange 158 otherwise provides a handle or handhold for the user to manipulate the blade 150, 160 from the rear 102 of the chassis system 100, 100'.

One or more support members 155 extend forwardly from the front edge 154 of the blade 150, 160. An adapter mounting arrangement 170 can be mounted to the support member 155. In certain examples, the support member 155 includes connection structures that cooperate with connection structures on the adapter mounting arrangement 170. In the example shown, the support member 155 includes a notched end 165*a*, a first aperture 165*b*, a second aperture 165*c*, and a pin 165*d*.

One example adapter mounting arrangement 170 is shown in FIG. 10. The adapter mounting arrangement 170 extends from a first end 171 to a second end 172. The first end 171 defines a retention section 173. In the example shown, the retention section 173 defines a passage through which fibers or patch cables can be routed. A gap 174 may enable the fibers or patch cables to enter the passage without being threaded therethrough. In other examples, the retention section 173 can be otherwise shaped to guide the fibers or patch cables away from the front 101 of the chassis system 100 while inhibiting tangling and/or excessive bending of the fibers and/or patch cables.

Each adapter mounting arrangement 170 includes an adapter mount 175. One or more adapter blocks 200, 205 couple to the adapter mount 175 of the adapter mounting arrangements 170. In certain examples, a first end of each adapter block 200, 205 couples to an adapter mount 175 at a first adapter mount arrangement 170 and a second end of each adapter block 200, 205 couples to an adapter mount 175 at a second adapter mount arrangement 170. In the example shown, the adapter mount 175 includes guide channels and a latch. In other examples, the adapter mount can include guide pins, guide apertures, or other retention structures. In the example shown, the adapter mounting arrangement 170 includes two adapter mounts 175 facing in opposite directions.

The adapter mounting arrangement 170 is configured to secure to the support member 155. For example, in certain implementations, the adapter mounting arrangement 170 includes a first upwardly facing ledge 176, a second upwardly facing ledge 177, a downwardly extending tab 178, and a cap 179. The cap 179 is disposed at the second end 172 of the adapter mounting arrangement 170. The tab 178 is disposed adjacent the cap 179. The first ledge 176 is disposed between the first end 171 and the adapter mount 175. The second ledge 177 is disposed between the adapter mount 175 and the tab 178.

To mount the adapter mounting arrangement 170 to the support member 155 of the blade 150, 160, the first ledge 176 is aligned with the notched end 156a of the support member 155 and the second ledge 177 is aligned with the first aperture 156b. As the adapter mounting arrangement 170 is slid rearwardly relative to the blade 150, 160, the adapter mounting arrangement 170 is rotated so that the tab 178 enters the second aperture 156c and the cap 179 covers the pin 156d. The cap 179 and tab 178 hold the adapter mounting arrangement 170 from sliding forwardly to release the first and second ledges 176, 177.

In some implementations, an example blade 160 includes a retention arm 165 that extend outwardly from the front edge 154 of the blade base 151 between two adjacent ones of the adapter mounting arrangements 170 (see FIG. 11). The retention arm 165 is flat, thereby allowing an adapter block 205 to extend over the retention arm 165 between the two adapter mounting arrangements 170. A distal end of the retention arm 165 provides a retention section 166. In the example shown in FIG. 11, the retention section 166 includes a hook folded back to face the rear 102 of the bladed chassis system 100, 100'. In other implementations, an example blade 150 includes only adapter mounting arrangements 170 extending outwardly from the front edge 154 of the blade base 151 (see FIG. 9).

In some implementations, the adapter block 200 has accessible rearwardly-facing ports for receiving the fibers 191 of the multi-fiber cable 190. In such implementations, the adapter block 200 is sized so that the front edge 154 of the blade base 151 is spaced rearwardly from rearwardly-facing ports of the adapter block 200. Thereby, finger access for the rearwardly-facing ports is provided (see FIG. 9). In other implementations, the adapter block 205 is sized to reach or extend over the front edge 154 of the blade base 151. In some such implementations, the adapter block 205 has sideways-facing ports for receiving the fibers 191 of the multi-fiber cable 190. In the example shown in FIG. 11, the base 151 of the blade 160 defines apertures 164 and a rail 163 that accommodate the adapter block 205.

In accordance with some implementations, the blades 150, 160 include one or more fiber management trays. Each fiber management tray 180 defines a fastener aperture that defines a rotational axis AR (FIG. 9). The fiber management tray can be positioned on the blade base 151 in any selected rotational orientation and then secured to the base 151 in the selected rotational orientation by a fastener. In some examples, the blade base 151 also defines a fastener aperture for receiving the fastener. In other examples, the blade base 151 includes an upwardly extending pin 156 (FIG. 11) that fits into the fastener aperture 156. In an example, a fastener can be inserted through the fastener aperture 156 and into the pin 156.

Figure 12:
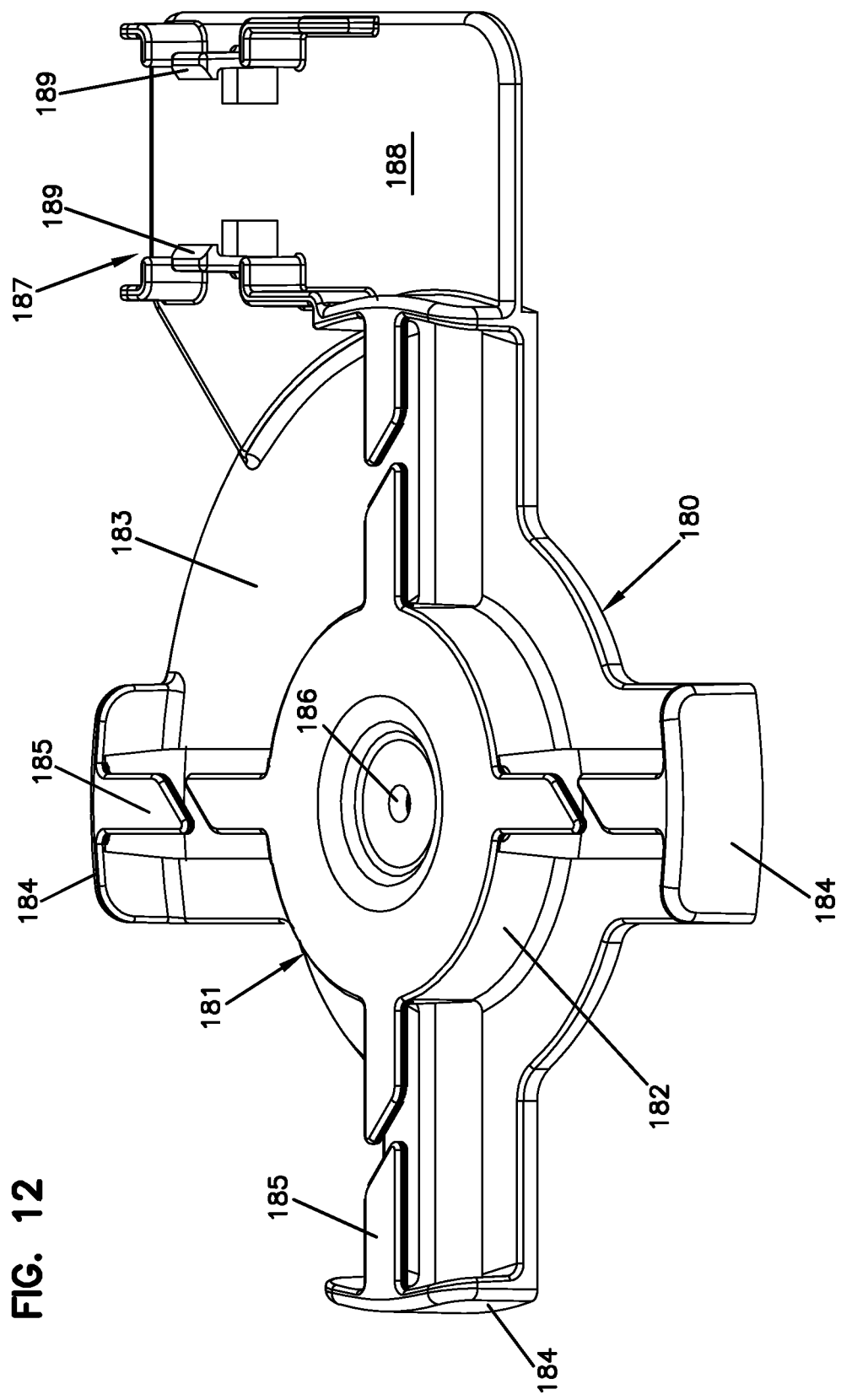
FIG. 12 is an example fiber management tray suitable for use with any of the blades disclosed herein.
Figure 13:
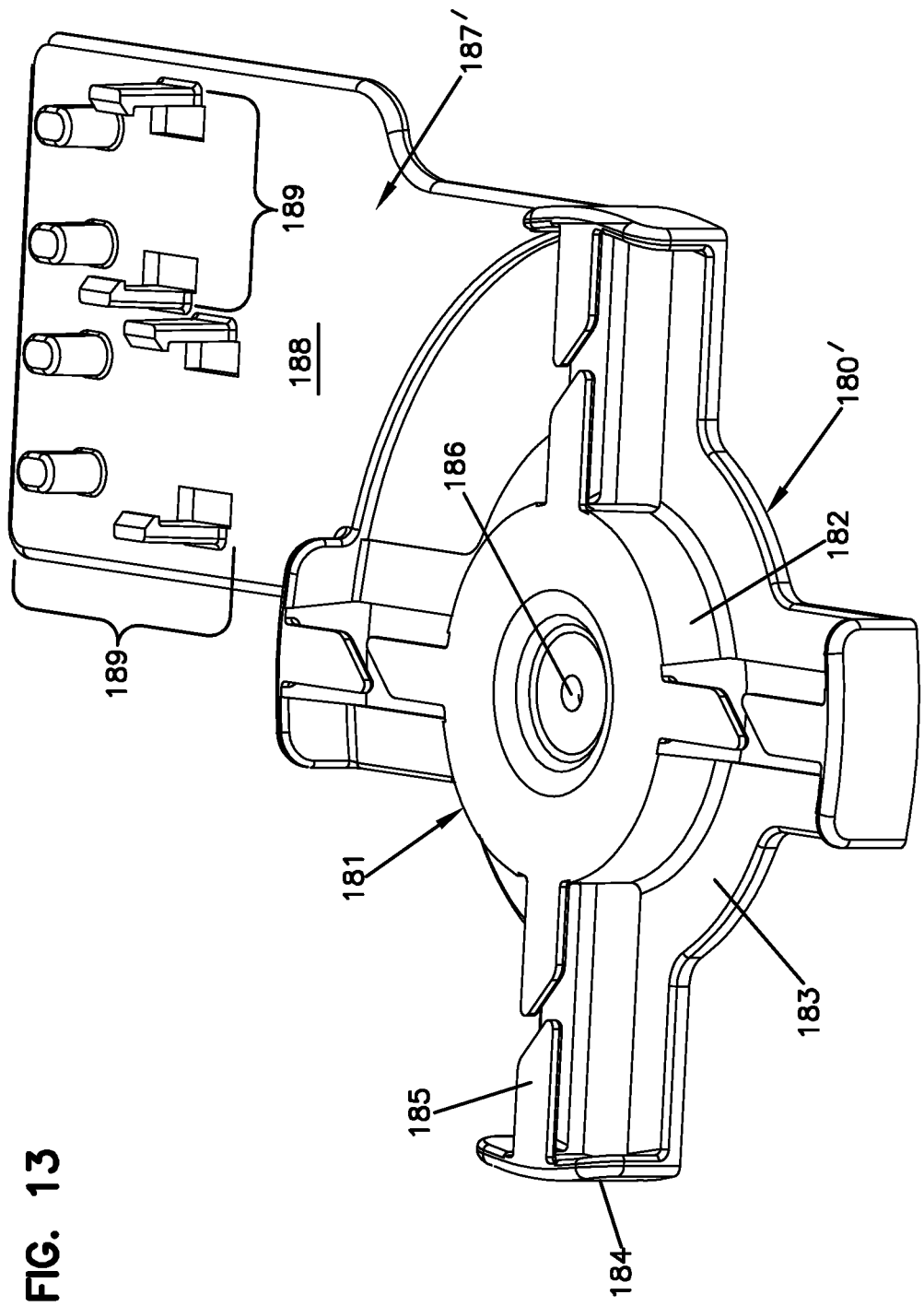
FIG. 13 is another example fiber management tray suitable for use with any of the blades disclosed herein.
Figure 14:
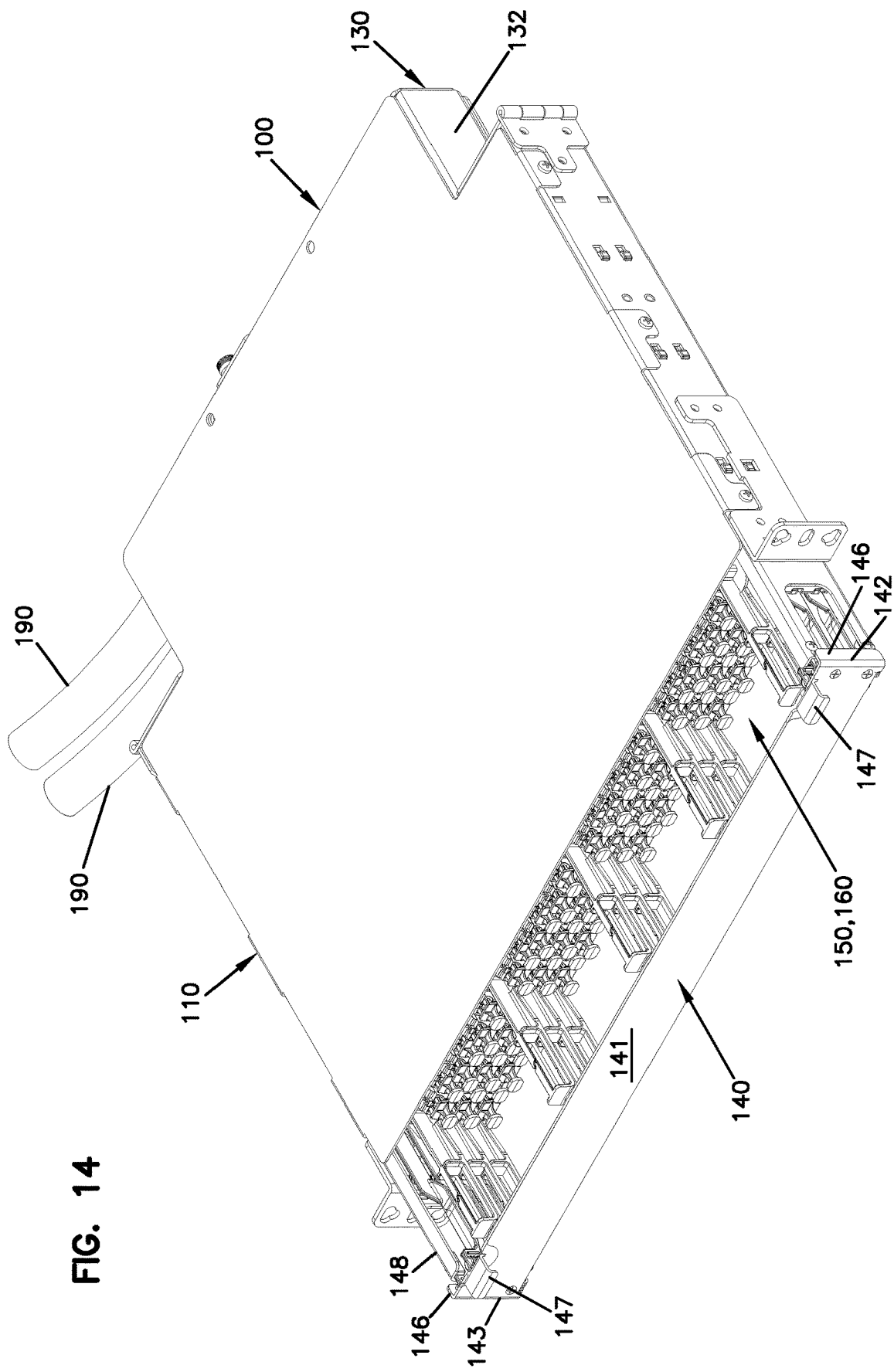
FIG. 14 is a front perspective view of an example front panel mounted in a closed position to an example chassis.

FIGS. 12 and 13 illustrate two examples of fiber management trays 180, 180'. Each fiber management tray 180, 180' includes a spool 181 and a fanout holder 187. The spool 181 includes a drum 182 extending upwardly from a tray base 183. Retaining tabs 184 extend upwardly from the tray base 183 at location radially spaced from the drum 182 and circumferentially spaced from each other. In the example shown, retaining fingers 185 extend outwardly from the drum 182 and inwardly from the retaining tabs 184. The fastener aperture 186 is defined through the drum 182.

The fanout holder 187 includes at least one holding structure 189 extending upwardly from a base 188, which is coupled to the tray base 183 of the spool 181. In the example tray 180 shown in FIG. 12, the fanout holder 187 includes a single holding structure 189. In the example tray 180' shown in FIG. 13, the fanout holder 187' includes multiple (e.g., two) holding structures 189. In the examples shown, the holding structure 189 includes latching arms. In some of the examples shown, the holding structures include pegs.

FIGS. 14-19 illustrate a moveable and removable front panel 140 that extends across the open front 116 of the chassis 110. The chassis 110 includes at least two arms 148 that extend forwardly of the open front 116 of the chassis 110 from opposite sides 105, 106 of the chassis 110. The front panel 140 removably couples to distal ends of the arms 148. In some examples, the arms 148 are located towards the top 103 of the chassis 110. In other examples, the arms 148 are located towards the bottom 104 of the chassis 110. In still other examples, the chassis 110 includes two arms 148 towards the top 103 and two arms 148 towards the bottom 104. The distal ends of the arms 148 define pinot pins 149.

Figure 16:
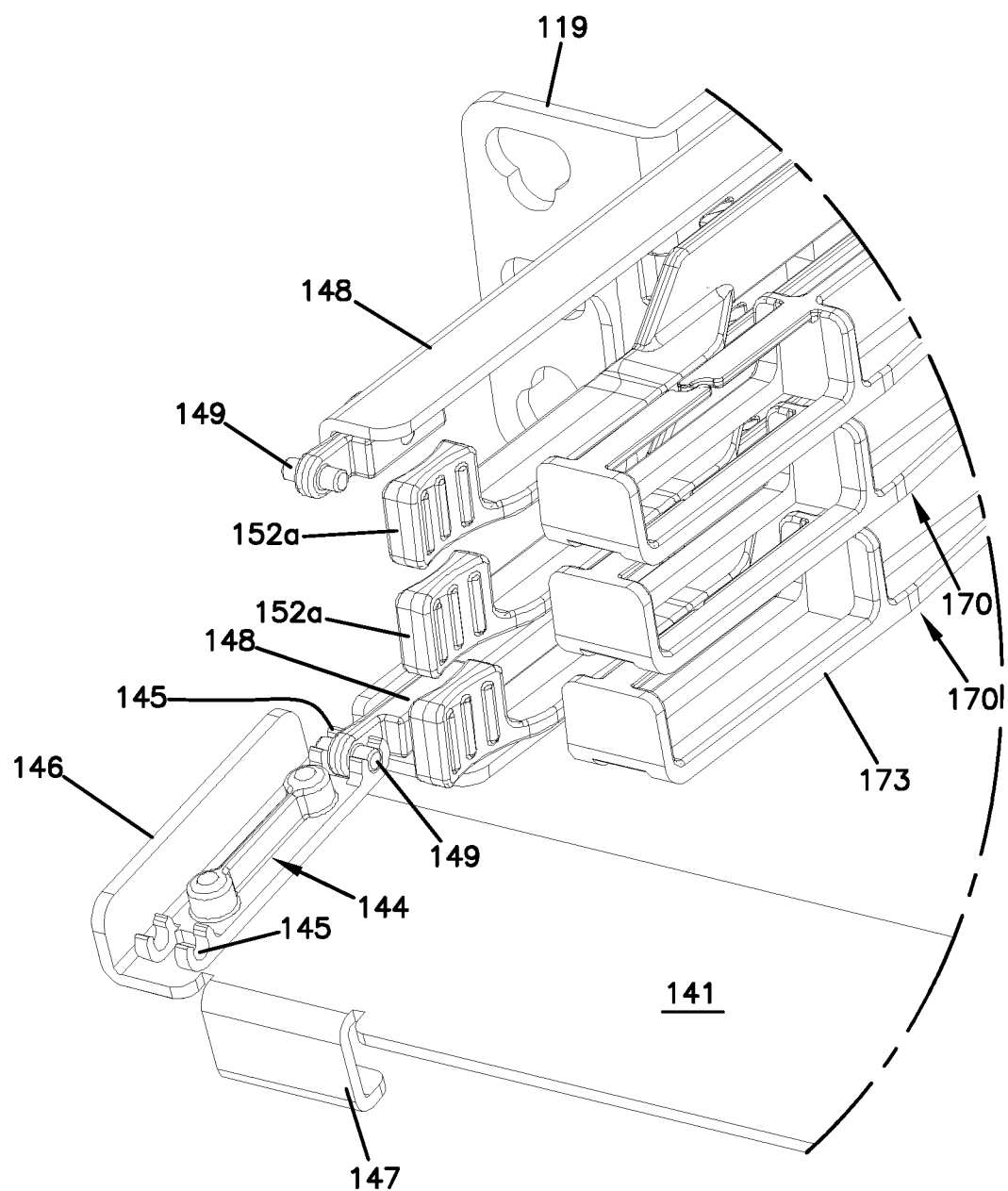
FIG. 16 is an enlarged view of FIG. 15.

The front panel 140 includes a wall 141 that extends from a first end 142 to a second end 143. A mounting structure 144 is disposed at each end 142, 143. As shown in FIG. 16, each mounting structure 144 includes at least one pin receptacle 145. The pin receptacle 145 is configured to snap over (or otherwise connect to) the pivot pins 149 of the forwardly extending arms 148. In certain examples, each mounting structure 144 includes two pin receptacles 145. In such examples, the top pin receptacles 145 are configured to snap over the pivot pins 149 of the top arms 148 and the bottom pin receptacles 145 are configured to snap over the pivot pins 149 of the bottom arms 148 (see. FIG. 16).

Figure 15:
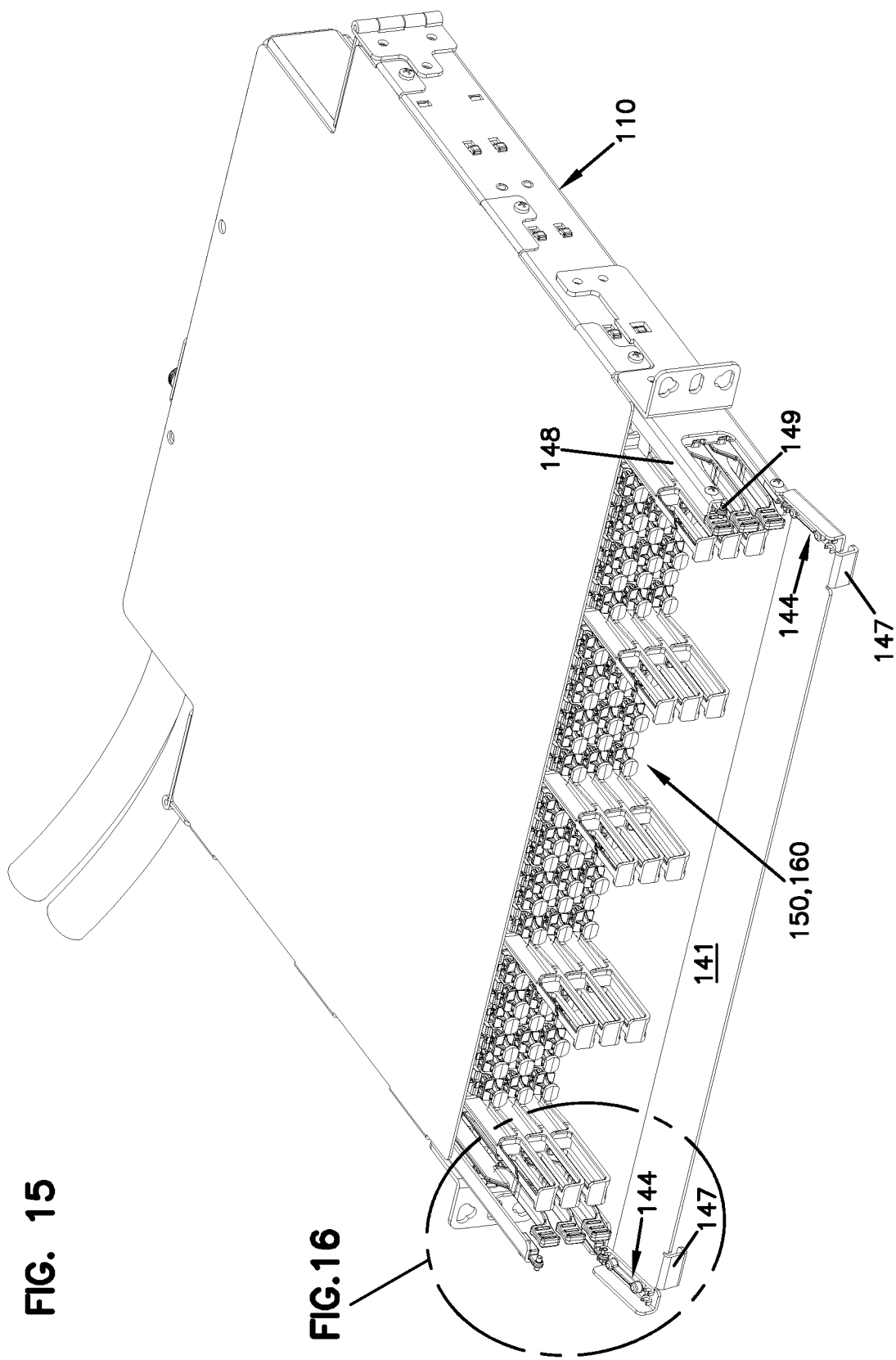
FIG. 15 shows the front panel moved to a first open position relative to the chassis.

In accordance with some aspects of the disclosure, the front panel 140 is movable (e.g., pivotable) between a closed position (FIG. 14) and a first open position (FIG. 15). For example, the top pin receptacles 145 can be detached from the pivot pins 149 of the top arms 148, thereby allowing the front panel 140 to pivot about the pivot pins 149 of the bottom arms 148. When in the first open position, the front panel 140 is retracted sufficiently from the open front 116 to enable blades 150, 160 to be installed into and/or removed from the chassis 110 through the open front. In certain examples, when in the first open position, the front panel 140 is retracted sufficiently from the open front 116 to enable blades 150, 160 to be installed into and/or removed from any blade position within the chassis 110 through the open front.

Figure 17:
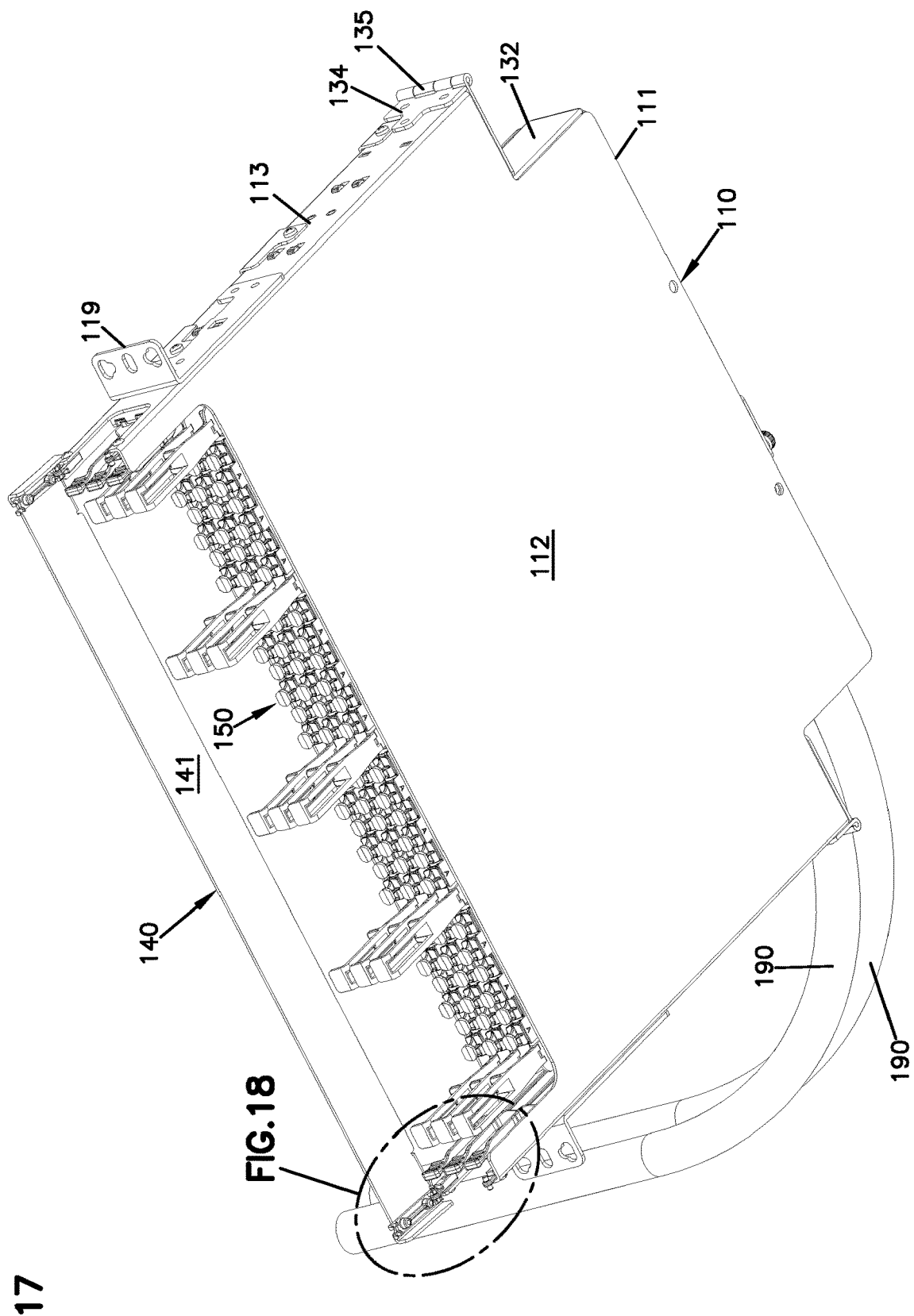
FIG. 17 shows the front panel moved to a second open position relative to the chassis.
Figure 18:
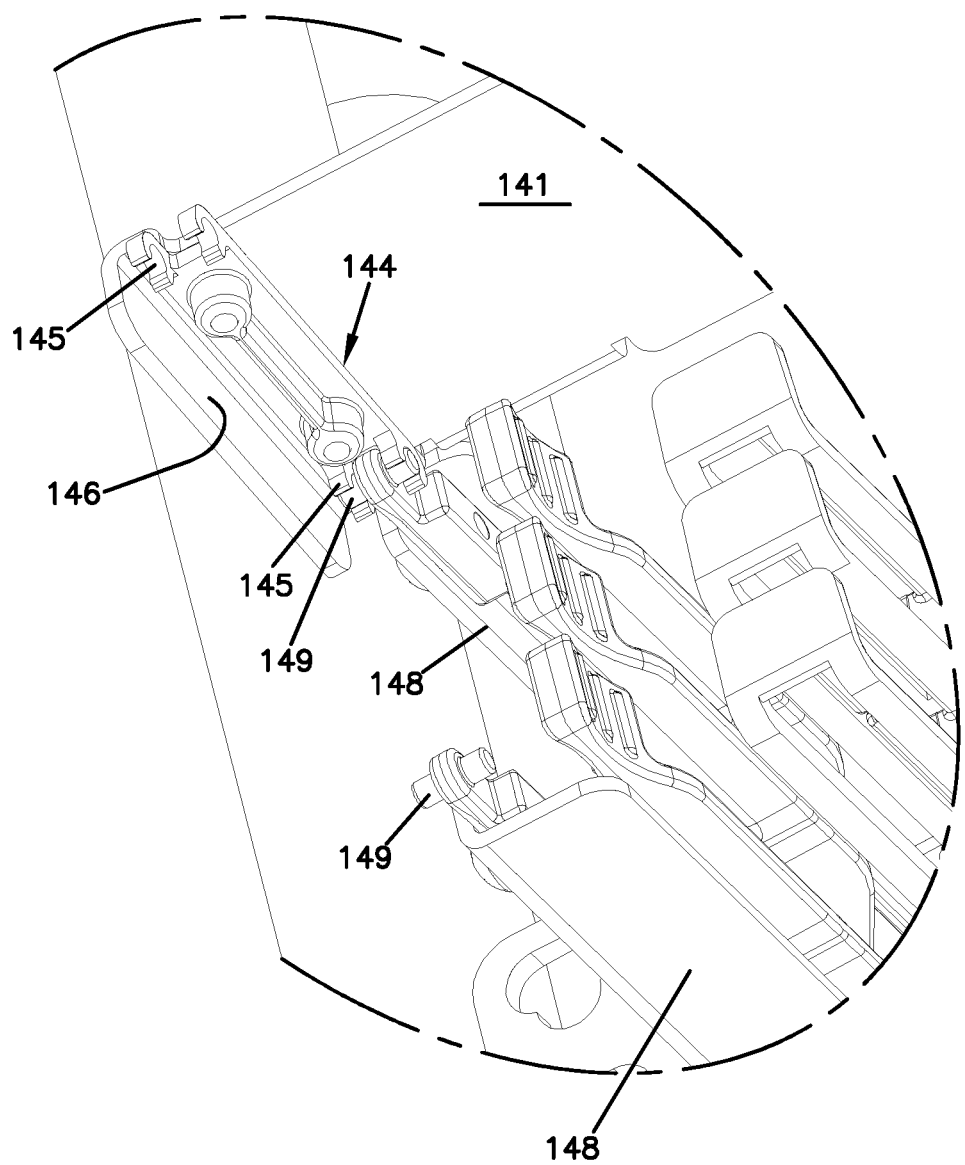
FIG. 18 is an enlarged view of FIG. 17.
Figure 19:
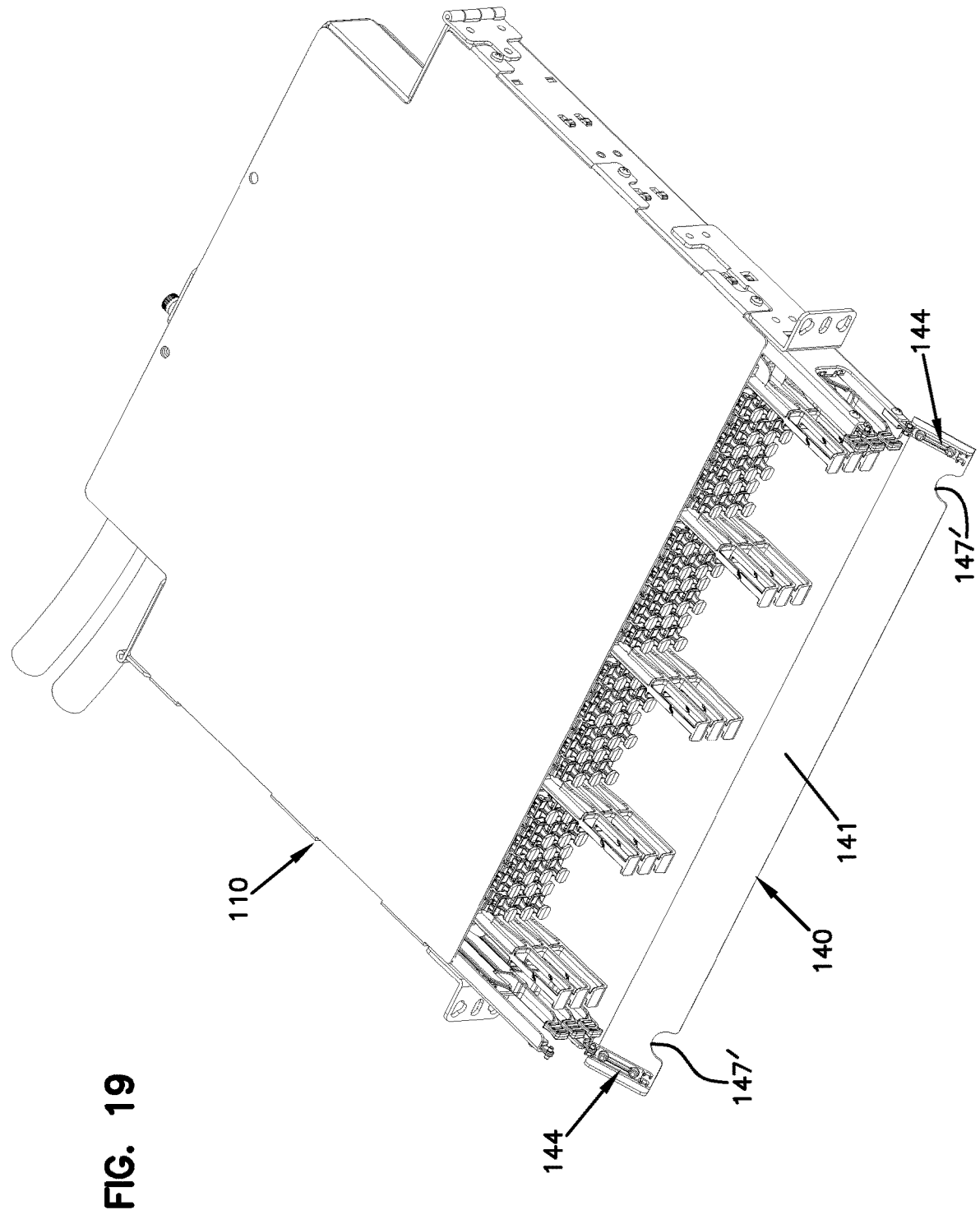
FIG. 19 shows another example front panel mounted to the example chassis.

In accordance with some aspects of the disclosure, the front panel 140 is movable (e.g., pivotable) to a second open position (FIG. 17). For example, the bottom pin receptacles 145 can be detached from the pivot pins 149 of the bottom arms 148, thereby allowing the front panel 140 to pivot about the pivot pins 149 of the top arms 148. When in the second open position, the front panel 140 is retracted sufficiently from the open front 116 to enable blades 150, 160 to be installed into and/or removed from the chassis 110 through the open front. In certain examples, when in the second open position, the front panel 140 is retracted sufficiently from the open front 116 to enable blades 150, 160 to be installed into and/or removed from any blade position within the chassis 110 through the open front.

In certain examples, a side flange 146 extends rearwardly from each end 142, 143 the wall 141. In certain examples, the wall 141 includes one or more handles 147 that aid a user in manipulating the front panel 140. In the example shown in FIG. 14, the front panel 140 has a handle 147 at each end 142, 143. The handles 147 extend forwardly of the wall 141. In other examples, the wall 141 includes one or more notches 147' that aid a user in manipulating the front panel 140. In the example shown in FIG. 19, the front panel 140 has a notch 147' at each end 142, 143.

In certain implementations, the front panel 140 can be attached to the chassis 110 in a first orientation and in a second orientation that is flipped 180° from the first orientation. Accordingly, the handle 147 can be selectively disposed at the top or bottom of the front panel wall 141. In particular, the handle 147 can be selectively disposed at the top or bottom of the front panel wall 141 regardless of the orientation of the chassis 110. For example, the front panel 140 can be coupled to the chassis 110 while the chassis 110 is disposed in a first orientation so that the handle 147 of the front panel 140 extends from a top of the wall 141. The front panel 140 can be removed from the chassis 110, the chassis can be flipped 180°, and the front panel 140 can be reinstalled on the chassis 110 with the handle 147 extending from the top of the wall 141.

Figure 22:
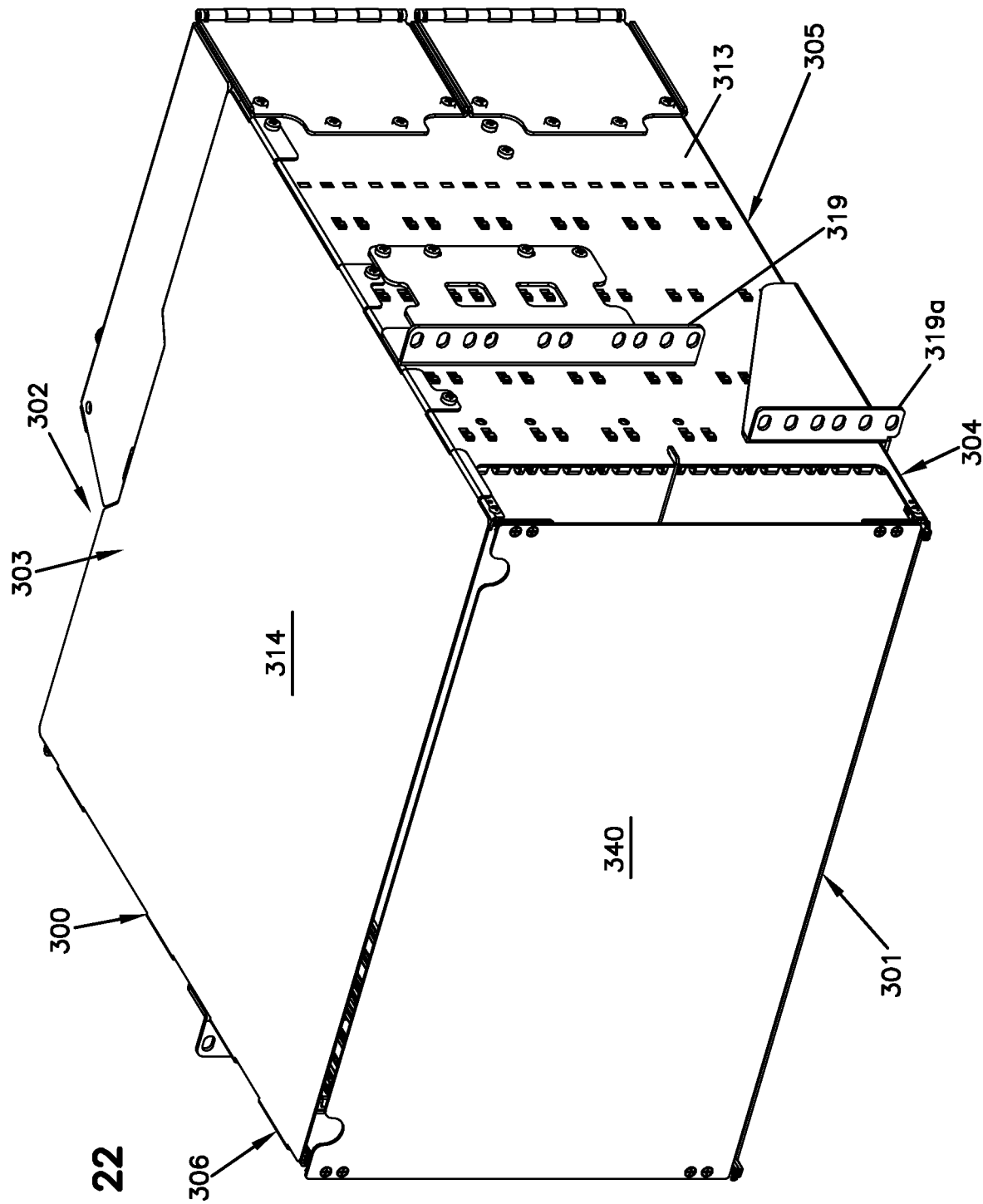
FIG. 22 is a front perspective view of another example bladed chassis system including blades mounted within a chassis.
Figure 23:
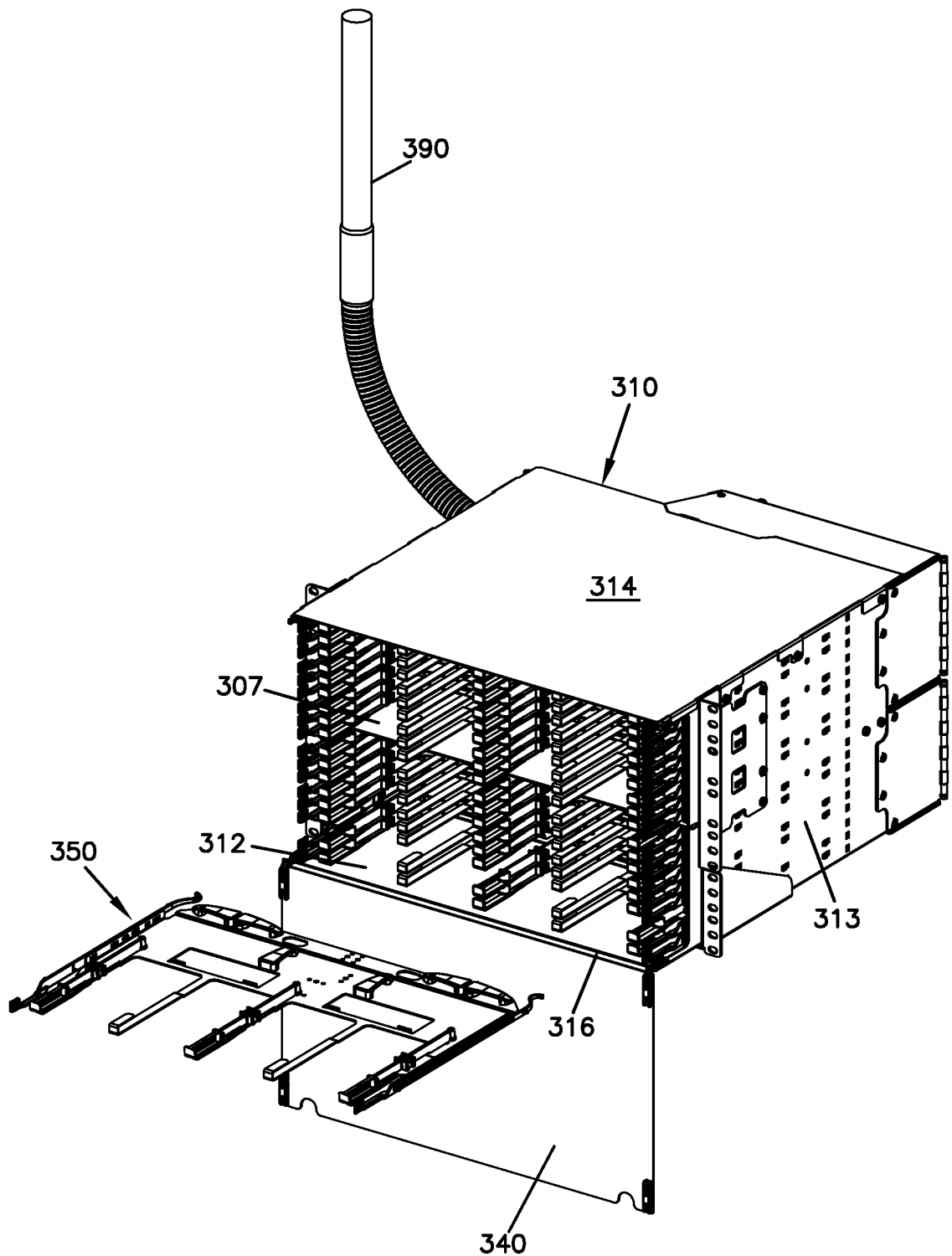
FIG. 23 shows a front panel opened to reveal an interior of the chassis of FIG. 22, a blade exploded from a front of the chassis, and a multi-fiber cable routed to a rear of the chassis.

FIGS. 22-32 illustrate another example bladed chassis system 300 including a chassis 310 and at least one blade 350, 360. In various implementations, the chassis 310 can hold multiple (e.g., two, three, four, five, six, eight, etc.) blades 350, 360. Accordingly, the chassis 310 can be sized at 1 RU (rack unit), 2 RU, 3 RU, 4 RU, 5 RU, 6 RU, etc. The chassis system 300 has a front 301, a rear 302, a top 303, a bottom 304, a first side 305, and a second side 306. The chassis 310 includes a housing 311 having two sidewalls 313 extending between a first end wall 312 (FIG. 23) and a second end wall 314 (FIG. 22). The first end wall 312, sidewalls 313, and second end wall 314 define an interior 315 having an open front 316 and an open rear 317.

Interior surfaces of the sidewalls 313 include guides 318 at which the blades 350, 360 can be received. The guides 318 define channels within which portions of the blades 350, 360 slide. In certain examples, the guides 318 extend between the open front 316 and the open rear 317 of the chassis 310. In certain examples, the guides 318 are symmetrical about a horizontal axis. In certain examples, the guides 318 include hooks that extend through elongated openings defined in the sidewalls 313. The guides 318 also define ramped shoulders at one end that inhibit sliding movement of the guides 318 when the shoulders snap into openings defined in the sidewalls 313. In certain examples, the sidewalls 313 define an extra opening for each guide 318 through which a tool can be inserted to release the shoulders from the openings, thereby freeing the guide 318 for sliding movement to enable removal from the sidewall 313.

In certain examples, a shelf 307 can be disposed within the interior 315 at an intermediate location between the first and second end walls 312, 314. The shelf 307 facilitates managing the optical fibers within the interior 315. For example, the shelf 307 helps to separate the optical fibers of blades 350, 360 mounted to guides 318 at the bottom of the sidewalls 313 from the optical fibers of blades 350, 360 mounted to guides 318 at the top of the sidewalls 313. In certain examples, the blades 350, 360 are mounted to the guides 318 at the top of the sidewalls 313 first. In such implementations, the shelf 307 retains the optical fibers out of a bottom section of the chassis 310 to facilitate loading blades 350, 360 into the bottom section of the chassis 310.

Mounting brackets 319 are disposed at exterior surfaces of the sidewalls 313. In certain examples, a shelf bracket 319 can be mounted to the rack at which the bladed chassis system 300 is to be received. The chassis 310 can seat upon the shelf bracket 319 to provide additional support for the bladed chassis system 300. A front panel 340 can be coupled to the chassis 310 at the open front 316. In certain examples, the front panel 340 can pivot downwardly to expose the open front 316 of the chassis 310. In certain examples, the front panel 340 also can pivot upwardly to expose the open front 316.

Figure 24:
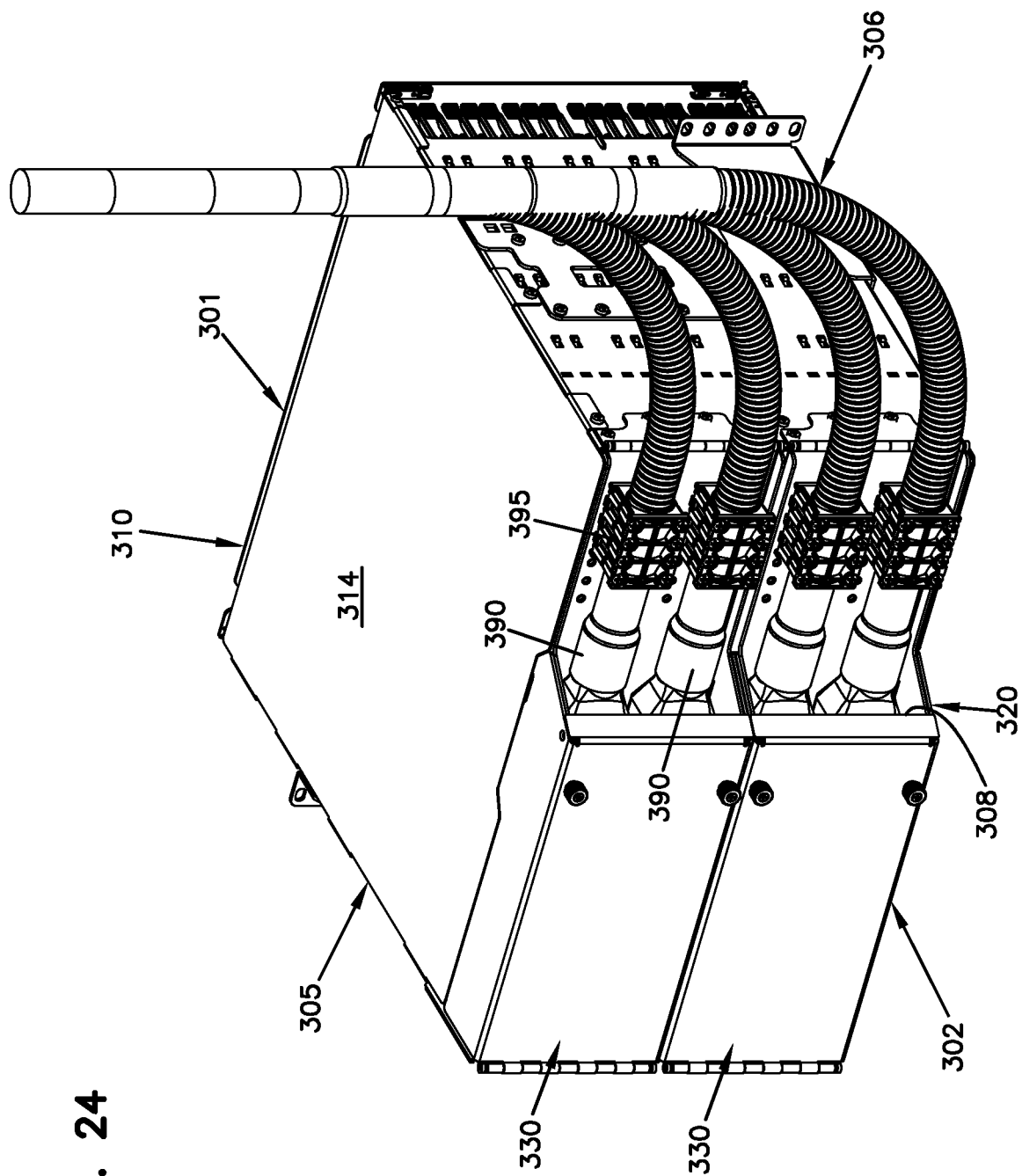
FIG. 24 is a rear perspective view of the chassis of FIG. 22 having multiple cable brackets and bracket covers and with multiple cables routed to the rear of the chassis.

As shown in FIG. 24, the chassis system 300 is configured to receive one or more multi-fiber cables 390 at the rear 302 of the chassis system 300. In certain examples, the chassis system 300 defines one or more cable ports 308 at the rear 302 of the chassis system 300. In certain implementations, the cable port(s) 308 is disposed at an intermediate location along the rear 301 of the bladed chassis system 300. In some implementations, the cable port(s) 308 faces towards a first side 305 of the chassis 310. In other implementations, the cable port(s) 308 faces towards a second side 306 of the chassis 310. In certain implementations, a first cable port 308 can face towards the first side 305 while a second cable port 208 faces towards the second side 306. As will be described in more detail herein, one or more multi-fiber cables 390 can be received and anchored at the ports 308.

Figure 25:
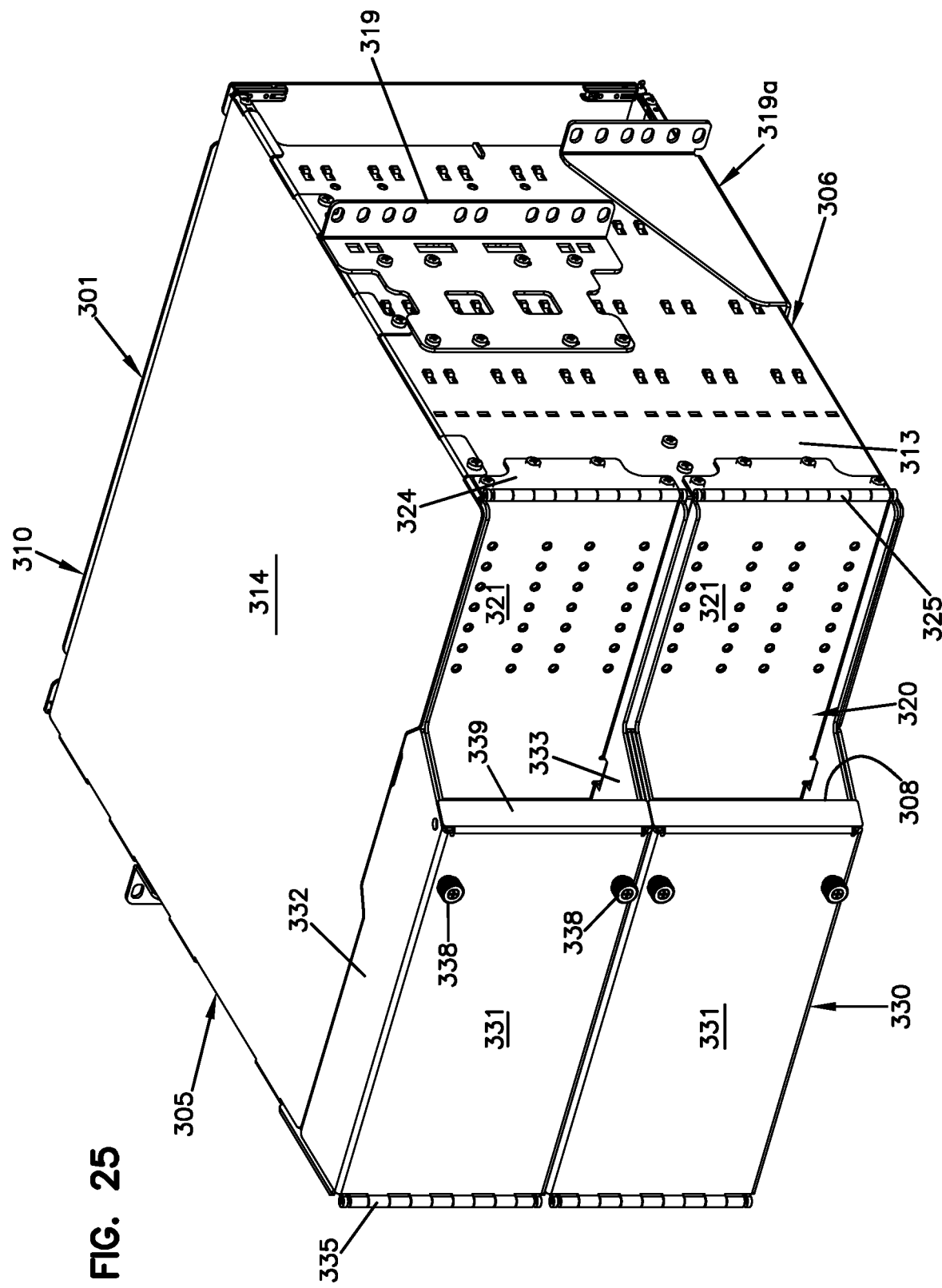
FIG. 25 shows the bladed chassis system of FIG. 24 without the multi-fiber cables.

As shown in FIGS. 25-28, at least one cable bracket 320 and at least one bracket cover 330 are mounted to the chassis housing 311 at the open rear 317. Each of the cable bracket 320 and the bracket cover 330 is movable between an open position (FIG. 26) and a closed position (FIG. 25). The cable brackets 320 and bracket covers 330 cooperate to close the open rear 317 when both are disposed in the closed positions (see FIGS. 25 and 27). In certain implementations, the shelf 307 (FIG. 23) disposed within the chassis interior 315 separates the chassis interior 315 into top and bottom sections. In some such implementations, each of the sections has a corresponding cable bracket 320 and bracket cover 330 so that only one section need be opened to obtain access to the blades 350, 360 of that section. In other implementations, a single bracket cover 330 can be utilized with multiple cable brackets 320. In still other implementations, a single cable bracket 320 can be utilized with multiple bracket covers 330.

The cable bracket 320 and the bracket cover 330 also cooperate to define one or more cable ports 308 when disposed in the closed positions. Moving both the cable bracket 320 and bracket cover 330 to the open positions reveals the open rear 317 sufficient to enable a blade 350, 360 to be inserted and/or removed at the open rear 317 of the chassis housing 311 (see FIG. 27).

Figure 26:
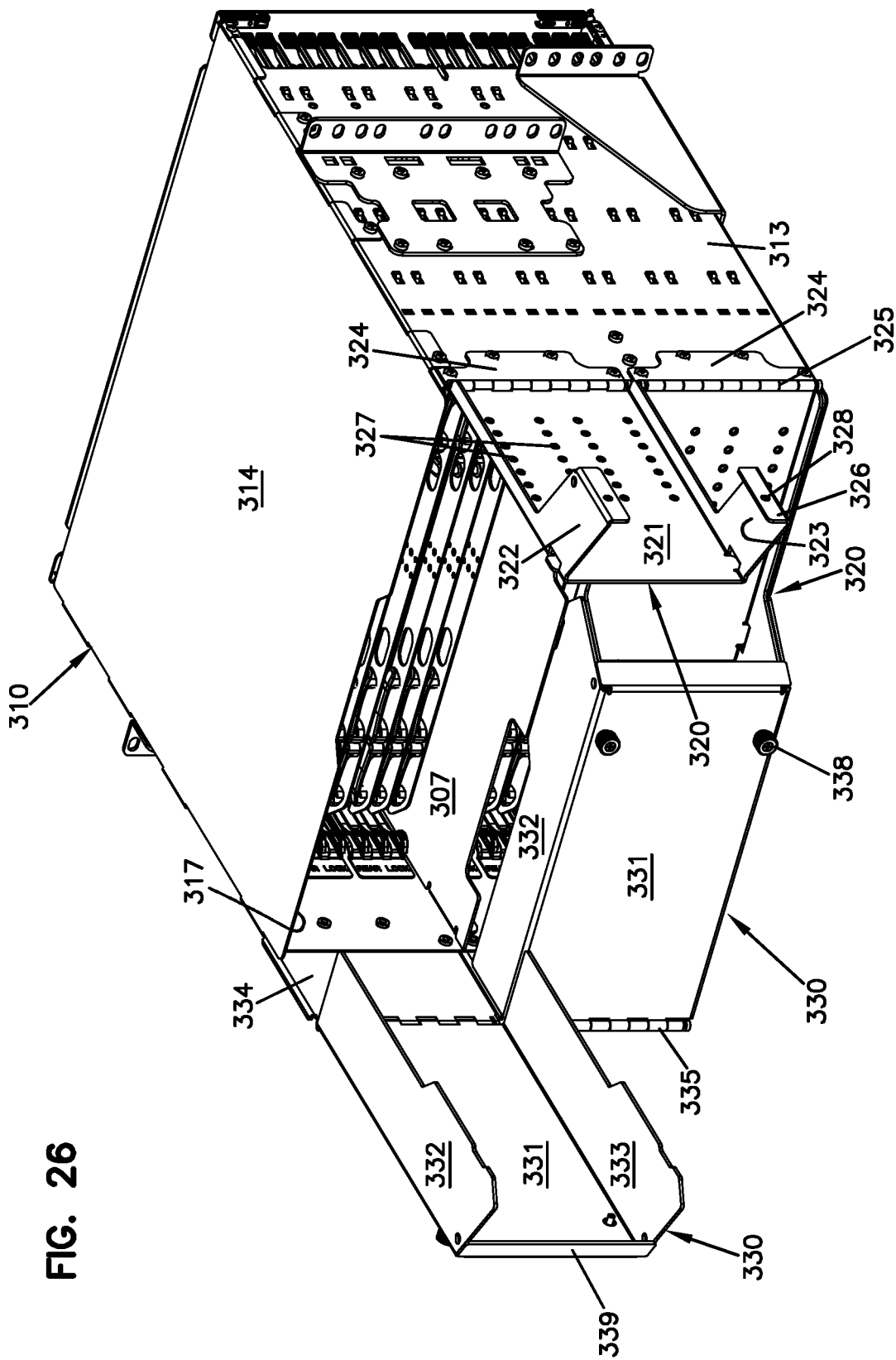
FIG. 26 shows the bladed chassis system of FIG. 25 with one of the cable brackets and the corresponding bracket cover moved to the open position.
Figure 27:
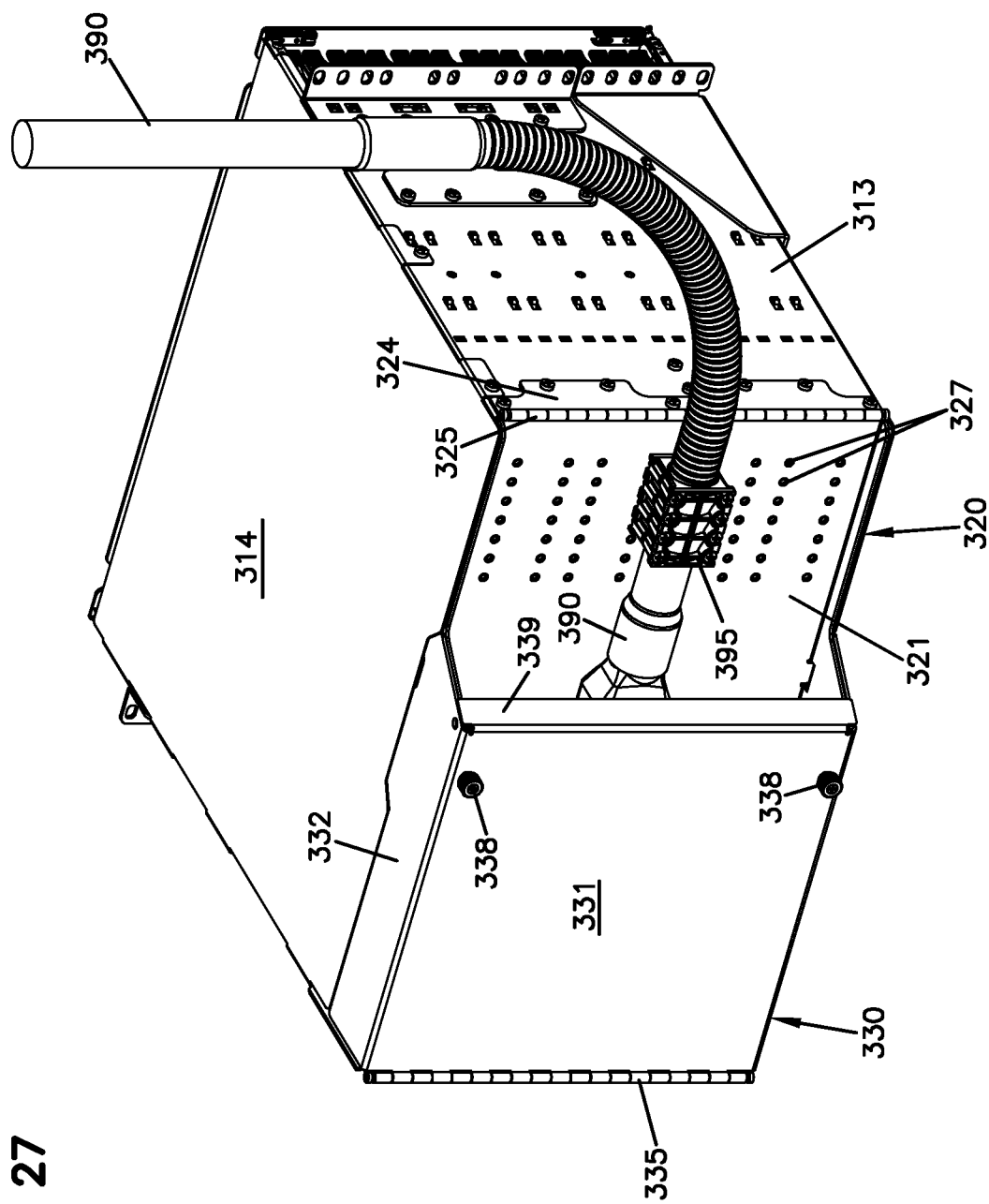
FIG. 27 shows the bladed chassis system of FIG. 24 with only a single cable bracket and bracket cover and with a single cable routed to the rear of the chassis.
Figure 28:
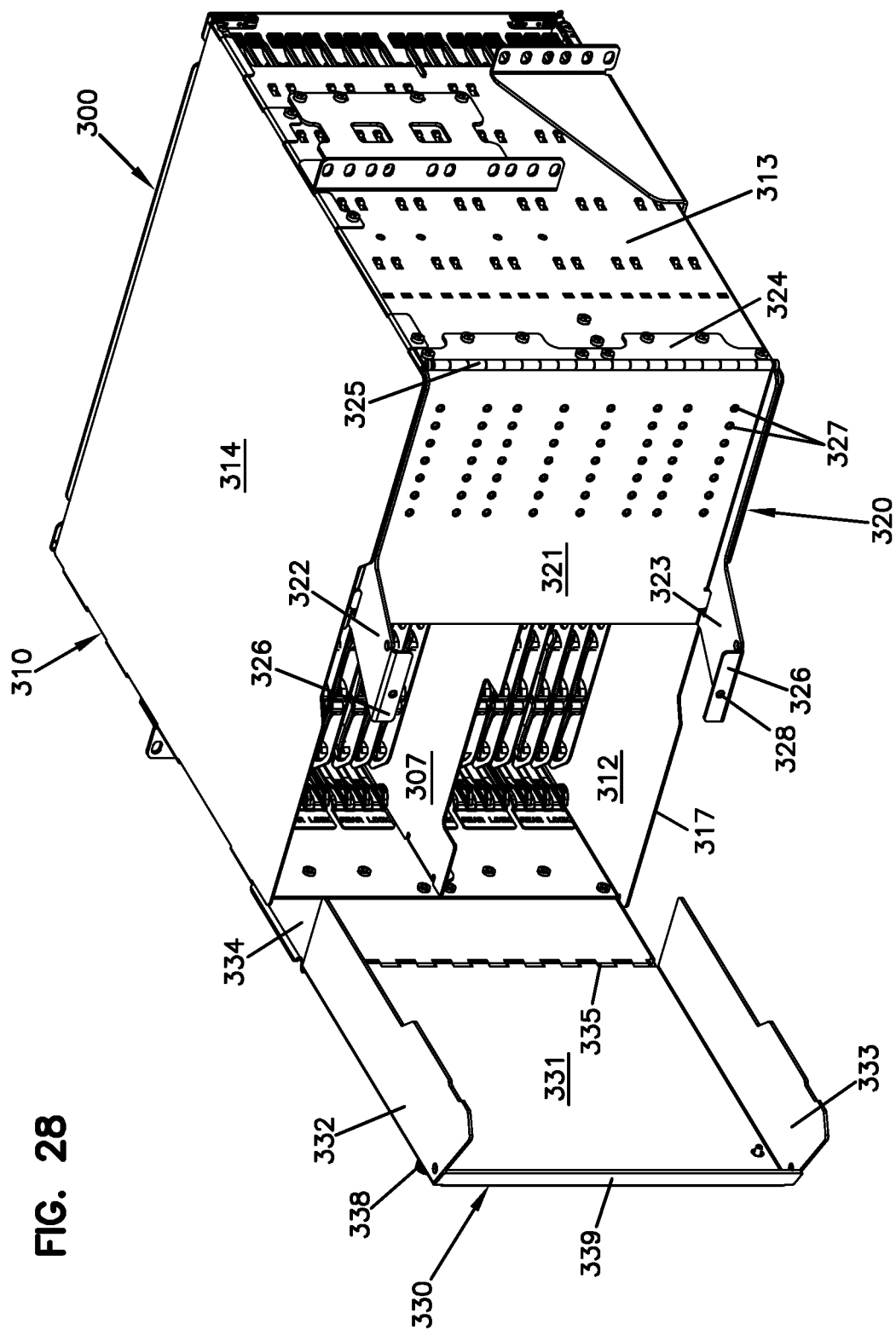
FIG. 28 shows the bladed chassis system of FIG. 27 with the bracket cover moved to the open position.

FIGS. 26 and 28 illustrate examples of a cable bracket 320 configured to be utilized in the chassis system 300. The cable bracket 320 is configured to carry one or more multi-fiber cables 390 (e.g., see FIGS. 24 and 27). In certain implementations, the cable bracket 320 includes a closure wall 321. A hinge bracket 324 is pivotally coupled to the closure wall 321 using a hinge 325. The hinge bracket 324 is coupled to the chassis housing 311 (e.g., at one of the sidewalls 313) to pivotally mount the cable bracket 320 to the chassis 310. Accordingly, in the example shown, the cable bracket 320 is configured to pivot between a closed position and an open position. The cable bracket 320 extends at least partially across the open rear 317 of the chassis housing 311 when in the closed position. The cable bracket 320 does not extend across the open rear 317 when in the open position.

The cable bracket 320 is configured to support a clamping assembly 395 to secure the cable 390 to the cable bracket 320. FIGS. 24 and 27 illustrates example clamping assemblies 395 for holding one or more cables. As shown in FIGS. 26 and 28, the closure wall 321 of the cable bracket 320 defines first apertures 327 that are sized and positioned to align with fastener apertures of the clamping assemblies 395 mounted to the cable bracket 320. Accordingly, the fastener can be inserted through the closure wall 321 (via the first apertures 327) in addition to the clamping assembly 395, thereby securing the clamping assembly 395 to the closure wall 321.

Additional disclosure about example suitable clamping assemblies 395 can be found in U.S. Patent Application No. 62/082,479 titled "Fiber Optic Cable with Flexible Conduit," the disclosure of which is hereby incorporated herein by reference in its entirety.

In certain examples, the cable bracket 320 includes support members 326 spaced outwardly from the closure wall 321. For example, the support members 326 can extend from a top member 322 and a bottom member 323 that extend outwardly from the closure wall 321. In certain examples, the bottom and top members 322, 323 extend from the closure wall 321 at a non-perpendicular angle. The bottom and top members 322, 323 of the cable bracket 320 are shorter than the closure wall 321 to accommodate and provide access to the cables 390 and the cable brackets 320. The support members 326 define second apertures 328.

FIGS. 26 and 28 also illustrate examples of a bracket covers 330 configured to be utilized in the chassis system 300. The bracket cover 330 includes a closure wall 331 that is coupled to a hinge bracket 334 via a hinge 335. The hinge bracket 334 is coupled to the chassis housing 311 (e.g., at one of the sidewalls 313) to pivotally mount the bracket cover 330 to the chassis 310. Accordingly, in the example shown, the bracket cover 330 is configured to pivot between a closed position and an open position. The bracket cover 330 extends at least partially across the open rear 317 of the chassis housing 311 when in the closed position. The bracket cover 330 does not extend across the open rear 317 when in the open position.

The bracket cover 330 is configured to secure to the cable bracket 320 to hold the cable bracket 320 in position. For example, the closure wall 331 includes or is coupled to a fastening section 336 (FIGS. 25 and 27) that defines apertures 337 (FIGS. 26 and 28) that align with the second apertures 328 of the cable bracket 320 when the bracket cover 330 and cable bracket 320 are disposed in the closed positions. One or more fasteners (e.g., set screws) 338 extend through the apertures 337 and the second apertures 328 to releasably secure the bracket cover 330 to the cable bracket 320. Loosening or removing the fasteners 338 enables the bracket cover 330 to be moved (e.g., pivoted) away from the cable bracket 320.

The cable port(s) 308 are defined by a gap between the closure wall 321 of the cable bracket 320 and the closure wall 331 of the bracket cover 330. A top member 332 and a bottom member 333 can extend from the bracket cover closure wall 331 to the cable bracket closure wall 321. The top and bottom members 332, 333 cooperate with the bracket cover closure wall 331 to protect optical fibers of the multi-fiber cables 390. In certain examples, a flange 339 also can extend over a portion of the gap to further protect the optical fibers 390. In the example shown, the flange 339 extends from the bracket cover closure wall 331 at a non-perpendicular angle.

In some implementations, the cable bracket 320 and the bracket cover 330 are symmetrical about a horizontal axis. Accordingly, each of the cable bracket 320 and the bracket cover 330 can be selectively mounted to either side 305, 306 of the chassis housing 311, e.g., by flipping the piece upside down. The cable bracket 320 and bracket cover 330 enable a user, during installation of the chassis system 300, to select from which of the sides 305, 306 of the chassis system 300 the user wants to introduce the multi-fiber cable(s) 390. The user mounts the cable bracket 320 to the selected side 305, 306 and mounts the bracket cover 330 to the other side 305, 306. Furthermore, in systems 300 utilizing multiple pairs of cable brackets 320 and bracket covers 330, the user may select to face one of the ports 308 to the first side 305 and face another of the ports to the second side 306.

In accordance with some aspects of the disclosure, the chassis 310 can be flipped upside-down to change the direction in which the port 308 faces without using tools. Flipping the chassis 310 causes the port 308 to face in the opposite direction from where it was facing. The guides 318 of the chassis 310 are structured to receive the blades 350, 360 in a first orientation and in a second orientation that is flipped 180° from the first orientation. Accordingly, the blades 350, 360 can be installed in the chassis 310 when the chassis is disposed in a first orientation and the blades 350, 360 also can be installed in the chassis 310 when the chassis 310 is disposed in a second orientation that is flipped 180° from the first orientation.

When the bladed chassis system 300 is installed at a frame, the chassis 310 can be installed in either the first orientation or the second orientation based on where the cable is routed to on the frame. If the cable is routed to the first side of the frame, then the chassis 310 can be installed in the first orientation so that the cable port 308 faces the first side of the frame. If the cable is routed to the second side of the frame, then the chassis 310 can be installed in the second orientation so that the cable port 308 faces the second side of the frame. The blades 350, 360 can be inserted into the chassis in the same orientation relative to the frame regardless of whether the chassis is mounted in the frame in the first or second orientation.

Figure 29:
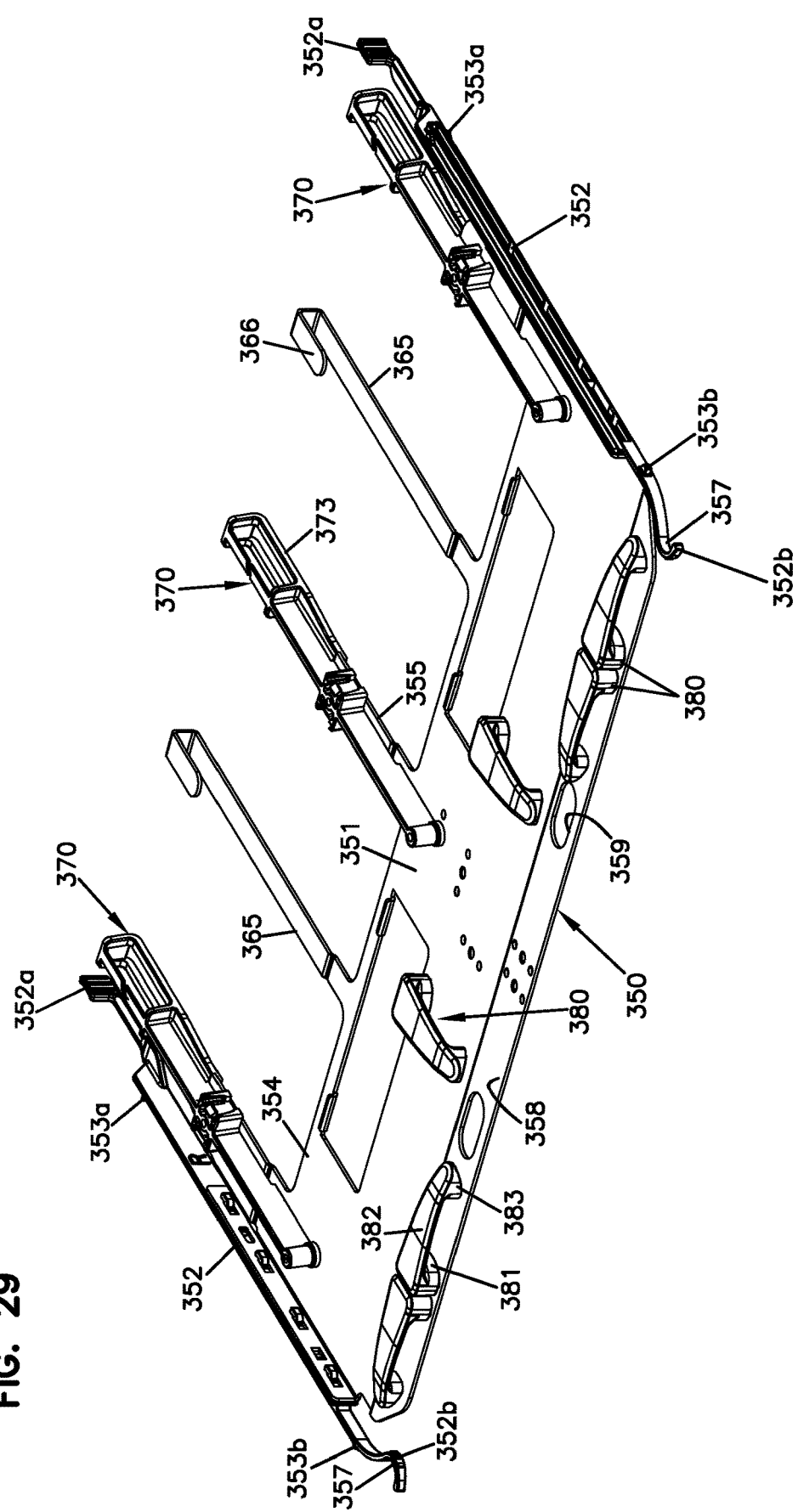
FIG. 29 is a rear perspective view of an example blade configured to be utilized in any of the bladed chassis systems disclosed herein.
Figure 30:
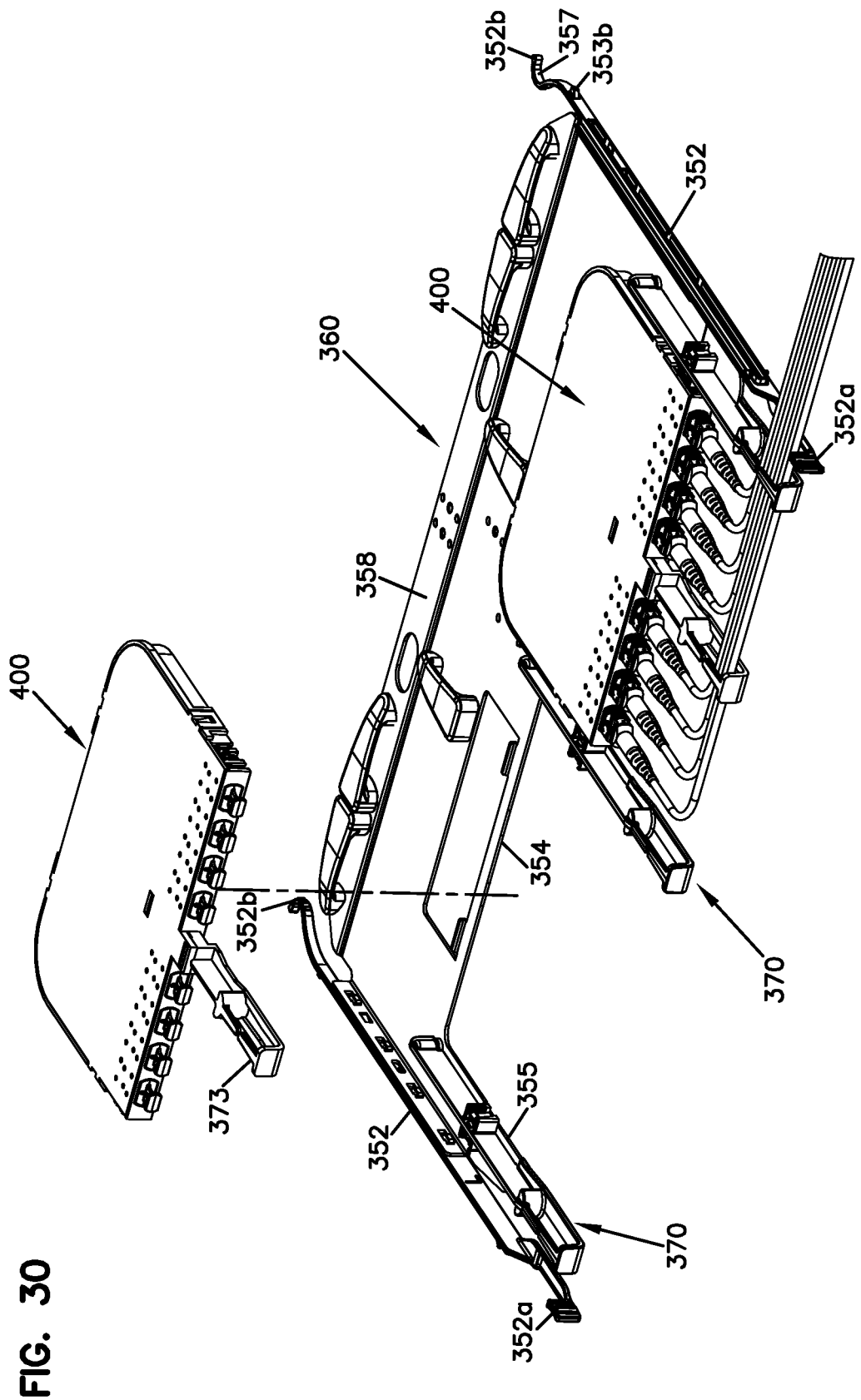
FIG. 30 is a front perspective view of another example blade configured to be utilized in any of the bladed chassis systems disclosed herein.

FIGS. 29 and 30 illustrate example blades 350, 360 configured to mount within the interior 315 of a bladed chassis system 300. Each blade 350, 360 includes a base 351 having slides 352 disposed at opposite sides thereof. The slides 352 are configured to ride in the guides 318 defined in the chassis 310. The slides 352 enable the blade 350, 360 to slide forwardly and rearwardly relative to the chassis 310. Each slide 352 includes a first release 352a at the forward end of the blade 350, 360 and a second release 352b at the rearward end of the blade 350. Each blade 350, 360 also includes a forward and rearward catch or stop 353a, 353b, respectively. Flexing the first release 352a releases the forward stop 353a from an interior surface of the chassis sidewall 313 and/or guide 318. Flexing the second release 352b releases the rearward stop 353b from an interior surface of the chassis sidewall 313 and/or guide 318. In certain examples, the second release 352b curves inwardly from the respective guide 352 and then curves back outwardly to form a finger catch portion 357. To release the rearward stop 353b, the user presses a finger against the finger catch portion 357 to deflect the finger catch portion 357 inwardly relative to the guide 352.

A front edge 354 of the base 351 is disposed at an intermediate position along the slides 352. A rearward edge is disposed towards the rearward end of the slides 352. In certain examples, a flange 358 extends from a rearward edge of the base 351 of the blade 350, 360. In some examples, the flange 358 defines one or more openings 359 to provide a handle for a user to withdraw the blade 350, 360 through the rear 317 of the chassis 310. In other examples, the flange 358 otherwise provides a handle or handhold for the user to manipulate the blade 350, 360 from the rear 302 of the chassis system 300.

In some implementations, the blade 350, 360 also includes one or more cable managers 380. Each cable manager 380 is configured to retain one or more optical fibers at the cable manager 380. For example, each cable manager 380 includes a bend radius limiting surface 381, a retention member 382 extending outwardly from the bend radius limiting surface 381, and a fiber catch 383 disposed at an opposite end of the retention member 382 from the bend radius limiting surface 381. In certain examples, an inner surface of the fiber catch 383 defines a second bend radius limiting surface. In certain examples, an outer surface of the fiber catch 383 is contoured to facilitate sliding insertion of optical fibers into the gap provided between the retention member 382 and the base 351 of the blade 350, 360.

One or more support members 355 extend forwardly from the front edge 354 of the blade 350, 360. An adapter mounting arrangement 370 can be mounted to the support member 355. In certain examples, the support member 355 includes connection structures that cooperate with connection structures on the adapter mounting arrangement 370. In the example shown, the support members 355 and adapter mounting arrangements 370 are the same as the support members 155 and adapter mounting arrangements 170 of FIGS. 9-12.

In some implementations, an example blade 350 includes a retention arm 365 that extend outwardly from the front edge 354 of the blade base 351 between two adjacent ones of the adapter mounting arrangements 370 (see FIG. 29). The retention arm 365 is the same as the retention arm 165 of FIGS. 9-12. In other implementations, an example blade 360 does not include retention arms 365. Rather, no structure extends from the front edge 354 of the blade base 351 between the adapter mounting arrangements 370. In certain implementations, a retention section 373 of the adapter mounting arrangement 370 can extend from components mounted to the blade 360. For example, in one implementation, the retention section 373, which is substantially the same as the retention section 173 of FIGS. 9-12, extends outwardly from an adapter block 200, from between two adapter blocks 200, or from a fiber optic module/cassette 400.

Figure 31:
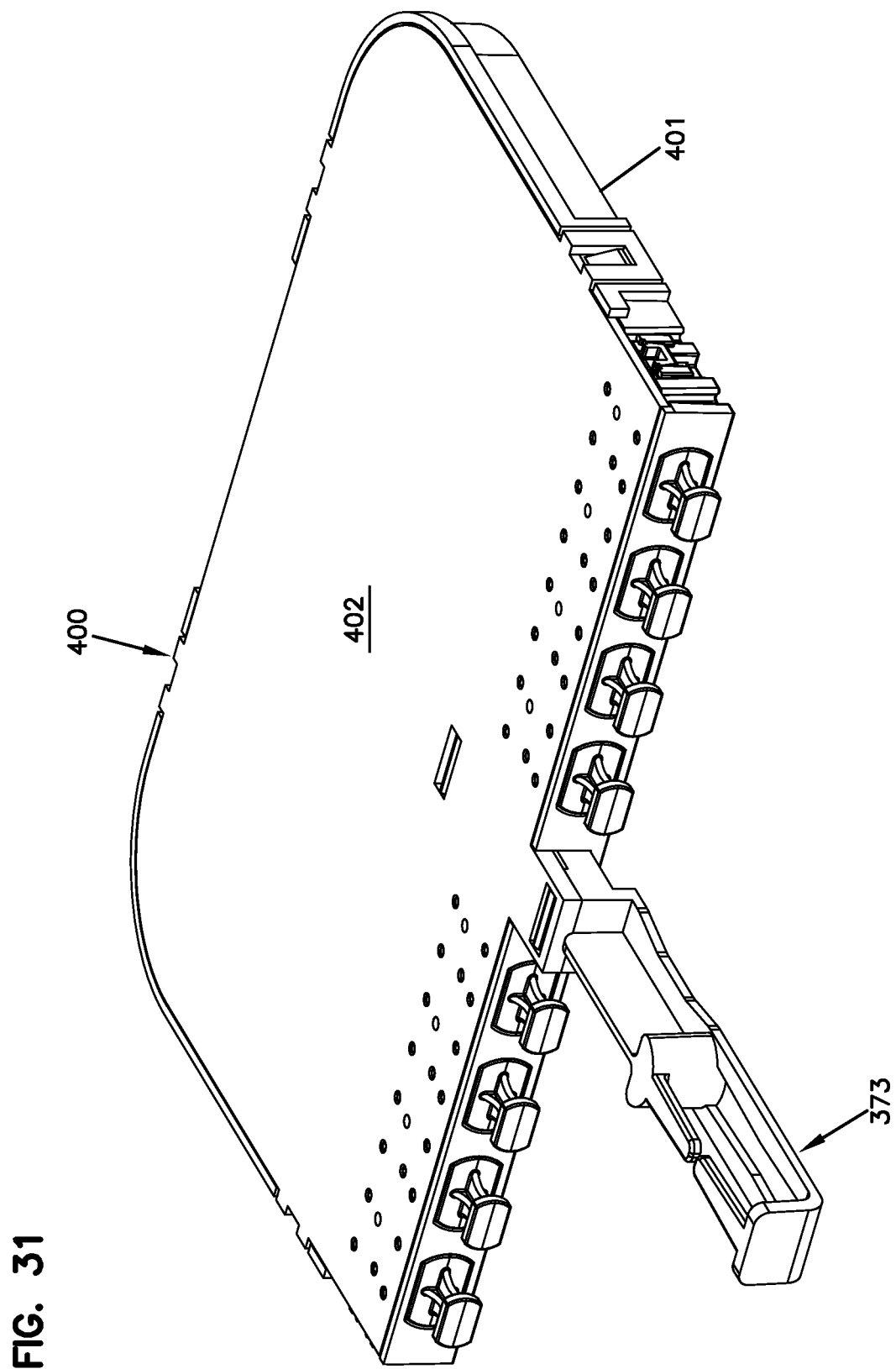
FIG. 31 is a front perspective view of an example cassette carrying adapters that can be mounted to the blade of FIG. 30.
Figure 32:
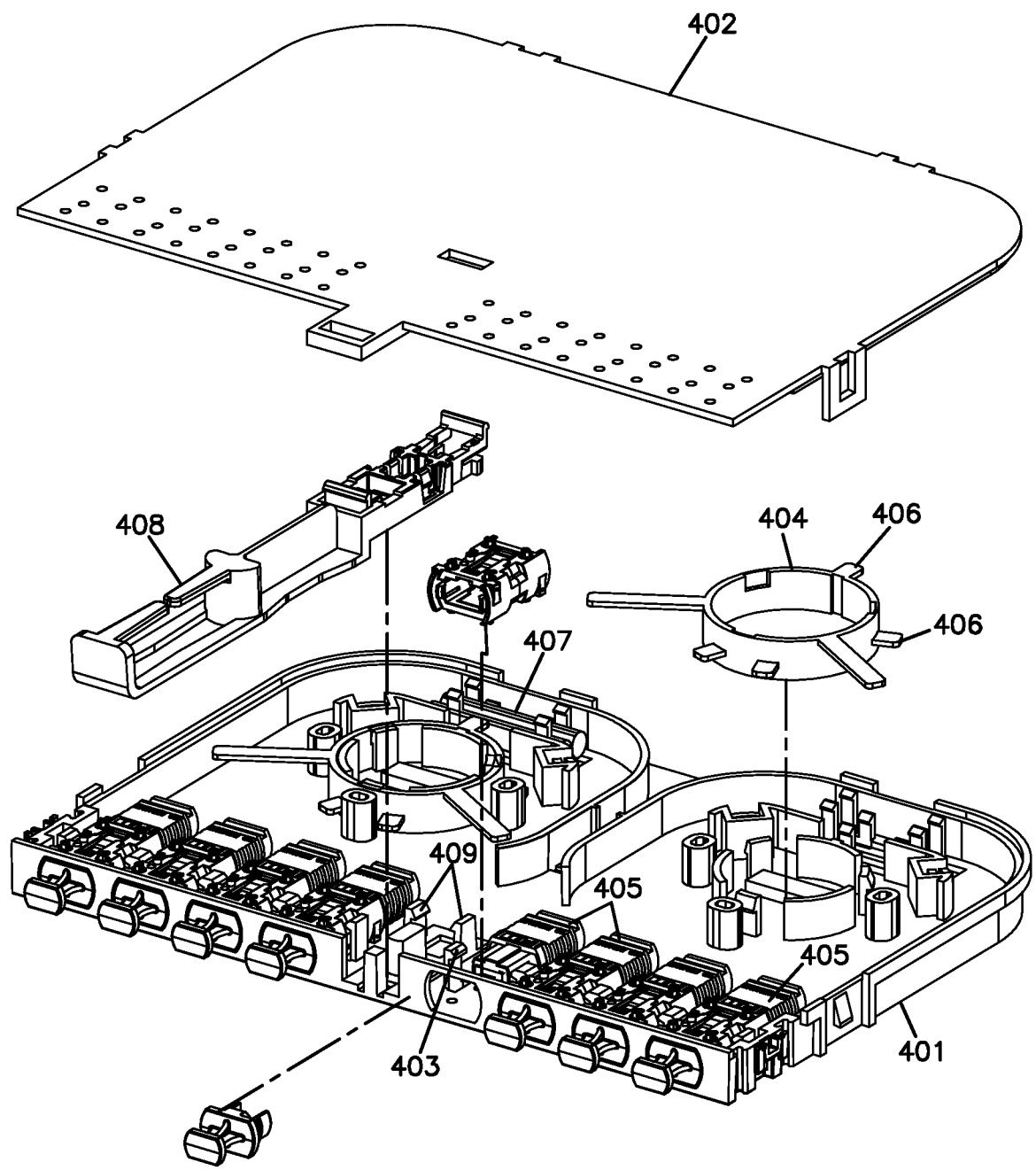
FIG. 32 is an exploded view of the cassette of FIG. 31.

FIGS. 30-32 illustrate one example fiber optic module/cassette 400 that is configured for use within the chassis/frame of FIGS. 22-28. The cassette 400 includes a number of connection locations for inputting fiber optic signals thereinto for processing. In the depicted embodiment, the connection locations are defined by fiber optic adapters 405 (FIG. 32). In certain examples, the adapters may be of the MPO format so that they are configured to receive fiber optic connectors having an MPO footprint. Other styles may be used.

The cassette 400 includes a cassette housing generally formed by a base portion 401 that is enclosed by a cover portion 402. The fiber optic adapters 405 can be snapped into the base portion 401 and the cover portion 402 can enclose the adapters 405, any fiber optic devices within the cassette 400 for processing the input signals, and any cabling therein.

In the depicted embodiment, the MPO type adapters 405 are positioned at a front of the cassette 400 and are used to both input and output fiber optic signals via cables terminated with connectors. As shown, the adapters 405 are configured to be snap-fit to the base portion 401 of the cassette 400 via flexible cantilever tabs 403 (FIG. 32). Other fixation methods may be used. In other implementations, the signal input locations (or output locations) may be at different locations on the cassette such as at the rear of the cassette.

As shown in FIG. 32, the cassette 400 may include spools 404 defining cable retainers 406 for managing cables within the cassette housing 400. In some implementations, the cable retainers 406 extend from an opposite side of the spools 404 from the base 401. In other implementations, the cable retainers 406 can extend from intermediate positions along the spools 404.

The optical equipment housed within the cassette 400 for processing the signals may include a variety of equipment. For example, the housed equipment may be fiber optic splitters, combiners, multiplexer/demultiplexers, filters, etc. The cassettes 400 may also include splices 407 for simply splicing input cables to cables that are within the cassette 400 that have been terminated with connectors leading to the front adapters 405. These connectors may mate with outside connectors via the adapters 405.

As noted above, the adapter mounting arrangements 370 of the blades 350, 360 have retention sections 373 that support the cables extending forwardly of the blades 350, 360. The retention sections 373 help support cables as they extend from the blades 350, 360 to the right and/or left sides of the chassis 310. However, when larger sized cassettes 400 are used with the blades 360 (e.g., as shown in FIG. 30), cables extending from the adapters 405 to the retention sections 373 may still experience some sagging or tangling due to the large distances between the connection points and the retention sections 373 of the blades 360.

For this reason, the cassettes 400 may be configured with their own cable managers 408 that provide support at the center point of the cassettes 400 to limit sagging or tangling as the cables are lead from the connection points to the retention sections 373 of the blades 360. In the example shown, the cable managers 408 have substantially the same structure as the retention sections 373 of the adapter mounting arrangements 370. In certain examples, the cable managers 408 also can include adapter mount structures (e.g., adapter mount structures 175) of the adapter mounting arrangements 170, 370.

According to one example version, the cassette cable manager 408 may be removable mounted to the cassette 400 via snap-fit interlocks. In the depicted version, the cable manager 408 is snap-fit to the base portion 401 of the cassette 400 via flexible cantilever tabs 409 (similar to those used for the adapters 405). In certain examples, the cassette cable manager 408 also defines tabs that are used in snap-fitting the cover portion 402 to the base portion 401.

Figure 33:
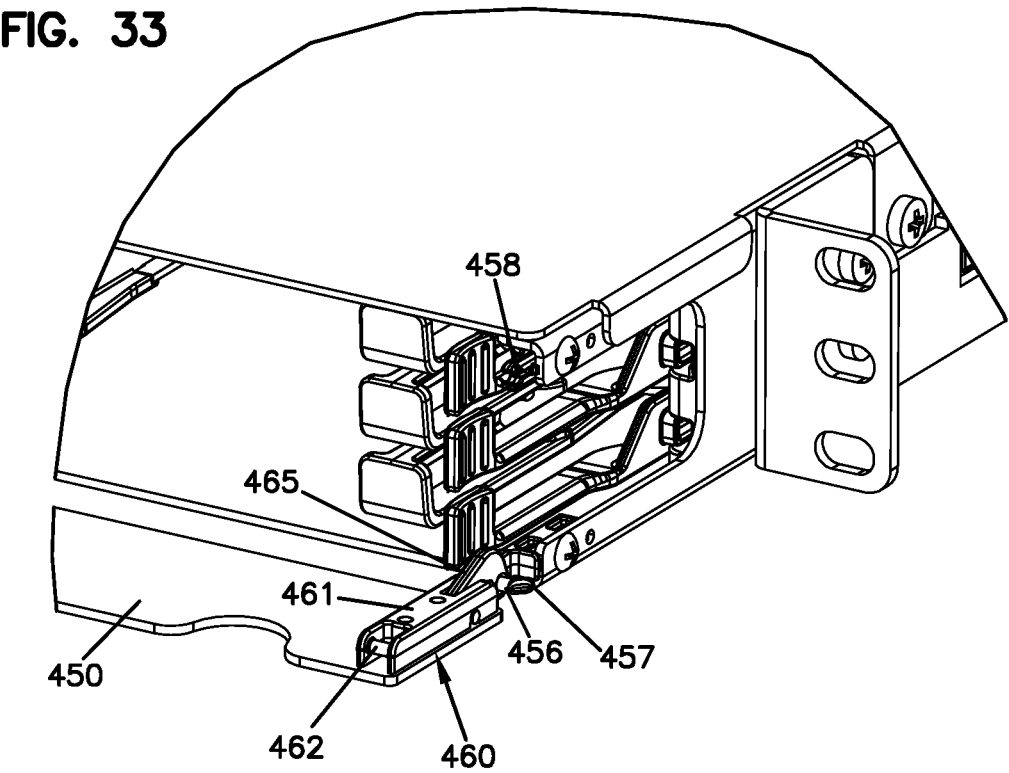
FIG. 33 is a front perspective view of an example hinge arrangement coupling an example chassis and an example front panel.
Figure 34:
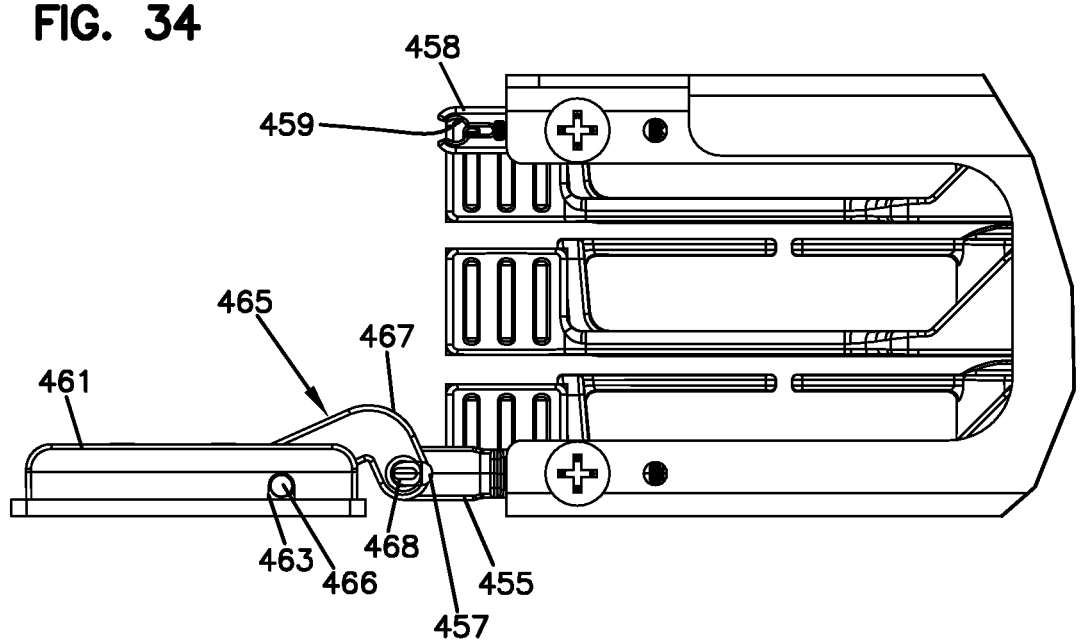
FIG. 34 is a side elevational view of the example hinge arrangement of FIG. 33.
Figure 35:
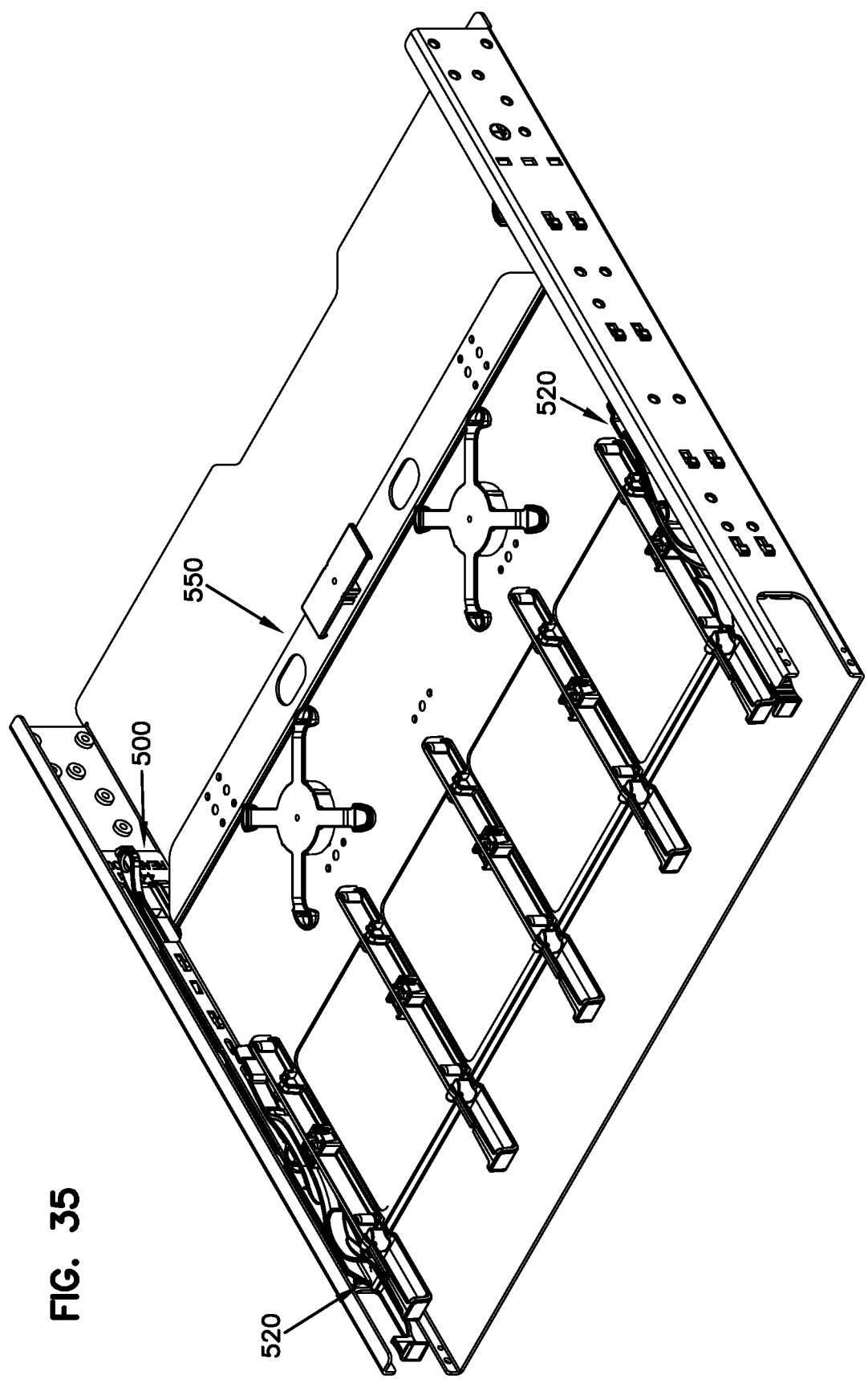
FIG. 35 is a perspective view of an example chassis holding an example blade.

FIGS. 33 and 34 illustrate an example hinge arrangement 460 that couples an example front panel 450 to an example chassis. In the example shown, the chassis is a 1 RU chassis. In other implementations, the chassis 310 can be any desired size (e.g., 2 RU, 3 RU, 4 RU, 5 RU, 6 RU, etc.). The front panel 450 is configured to extend across an open front of the chassis. In the example shown, the front panel 450 is configured to pivot downwardly from a closed position to an open position to provide access to the blades within the chassis from the front of the chassis.

The hinge arrangement 460 includes a door arrangement 460, an elongated pivot member 465, a support member 455 and an attachment member 458. The support member 455 and the attachment member 458 are mounted to the chassis at the top and bottom of the front opening, respectively. The door arrangement 460 mounts to the front panel 450. The elongated pivot member 465 mounts the door arrangement 460 to the support member 455. The front panel 450 pivots about an axis defined by the support member 455 and/or the elongated pivot member 465.

The door arrangement 460 includes a body 461 having a pin 462 at a first end and defining a passage 463 towards an opposite second end. The attachment member 458 defines an open-ended recess 459 sized to receive the pin 462 of the door arrangement 460. Engagement between the attachment member 458 and the pin 462 holds the front panel 450 in the closed position relative to the chassis. The open-ended channel 459 is configured to allow the pin 462 to be snapped in and out of the channel 459.

The elongated pivot member 465 extends from a first end to a second end. The first end includes a first pivot pin 466 that extends through the passage 463 of the door arrangement body 461. The second end of the elongated pivot member 465 defines an opening 468. In certain examples, the pivot member 465 bends or otherwise defines a contour between the first and second ends. In the example shown, the elongated pivot member 465 has an L-shape.

The support member 455 includes a second pin 456 configured to extend through the opening 468 in the pivot member 465. In certain examples, the second pin 456 may have a curved end 457 that aids in retaining the pivot member 465 on the second pin 456. As the front panel 450 moves between the open and closed positions, the second end of the pivot member 465 pivots about the second pin 456 and the front panel 450 pivots about the first pivot pin 466.

In other implementations, the support member 455 can disposed at the top of the open front and the attachment member 458 can be disposed at the bottom of the open front to enable the front panel 450 to pivot upwardly to the open position.

FIGS. 35-47 illustrate example implementations of latching assemblies suitable for use on any blade 150, 160, 350, 360, 550 to allow the blade 150, 160, 350, 360, 550 to move relative to the chassis system 100, 100', 300. Each latching assembly includes a latching arrangement that couples to one side of the blade 150, 160, 350, 360, 550 and a guide member that couples to one sidewall of the chassis housing 111, 311. Typically, each chassis sidewall supports a guide member and each side of the blade 150, 160, 350, 360, 550 supports a latching arrangement.

In certain implementations, the blade 150, 160, 350, 360, 550 is removable from the chassis housing 111, 311 through the front. In certain implementations, the blade 150, 160, 350, 360, 550 is removable from the chassis housing 111, 311 through the rear. In certain implementations, a user can choose whether to remove the blade 150, 160, 350, 360, 550 from the chassis housing 111, 311 through the front or through the rear.

In systems utilizing either of the latching assemblies, the blade 150, 160, 350, 360, 550 is movable relative to the chassis housing 111, 311 between an operation position, a connector access position, and an adapter access position. In an example, the connector access position is located forwardly of the operation position, and the adapter access position is located forwardly of the connector access position. In certain implementations, the blade 150, 160, 350, 360, 550 is movable relative to the chassis housing 111, 311 to a discrete position rearward of the operation position. As the term is used herein, a "discrete" position indicates a position at which the user receives some type of feedback (e.g., tactile feedback, audible feedback, etc.) that the blade 150, 160, 350, 360, 550 has reached a predetermined position relative to the chassis.

In certain implementations, the latching assemblies are configured to lock the blade 150, 160, 350, 360, 550 in one or more of the discrete positions. As the term is used herein, a blade 150, 160, 350, 360, 550 is "locked" in position if the user must take affirmative steps beyond applying forward/rearward pressure to the blade 150, 160, 350, 360, 550 to move the blade 150, 160, 350, 360, 550 relative to the chassis 111, 311.

In certain implementations, the latching assemblies are configured to lock the blade 150, 160, 350, 360, 550 relative to the chassis in the operation position. In certain implementations, the latching assemblies are configured to lock the blade 150, 160, 350, 360, 550 relative to the chassis in the connector access position. In certain implementations, the latching assemblies are configured to lock the blade 150, 160, 350, 360, 550 relative to the chassis in the operation position and in the adapter access position. In certain implementations, the latching assemblies are configured to lock the blade 150, 160, 350, 360, 550 relative to the chassis in the adapter access position. In certain implementations, the latching assemblies are configured to lock the blade 150, 160, 350, 360, 550 relative to the chassis in any discrete position.

FIGS. 35-42 illustrate a first example latching assembly including an example latching arrangement 520 and an example guide member 500. The latching arrangements 520 and guide members 500 interact with each other to enable the blade 150, 160, 350, 360, 550 to move between an operating position and a connector access position in which the blade 150, 160, 350, 360, 550 is disposed forwardly relative to the chassis housing 111, 311. In certain implementations, the latching arrangements 520 and guide members 500 interact to enable the blade 150, 160, 350, 360, 550 to move forward of the connector access position to an adapter access position. In certain implementations, the latching arrangements 520 and guide members 500 interact to enable the blade 150, 160, 350, 360, 550 to be locked in one or more of the operation position, the connector access position, and the adapter access position.

In certain implementations, the latching arrangements 520 and guide members 500 interact to enable the blade 150, 160, 350, 360, 550 to be removed from the chassis housing 111, 311 through a front of the chassis housing 111, 311. For example, the blade 150, 160, 350, 360, 550 can be slid forward from the adapter access position until the blade 150, 160, 350, 360, 550 disconnects from the chassis housing 111, 311. In certain implementations, the latching arrangements 520 and guide members 500 interact to enable the blade 150, 160, 350, 360, 550 to be removed from the chassis housing 111, 311 through a rear of the chassis housing 111, 311. For example, the blade 150, 160, 350, 360, 550 can be slid rearward from the operation position until the blade 150, 160, 350, 360, 550 disconnects from the chassis housing 111, 311.

Figure 36:
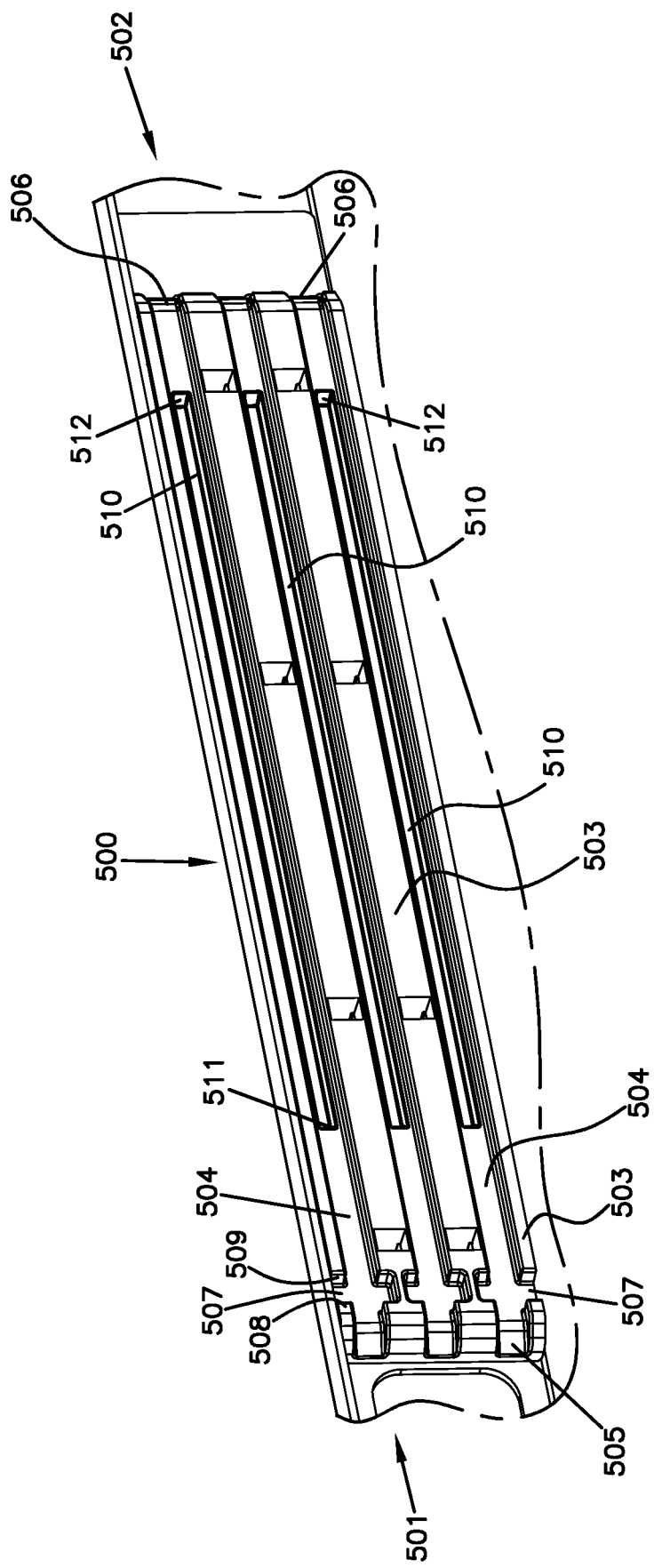
FIG. 36 is a front perspective view of an example guide member of an example latching assembly.
Figure 37:
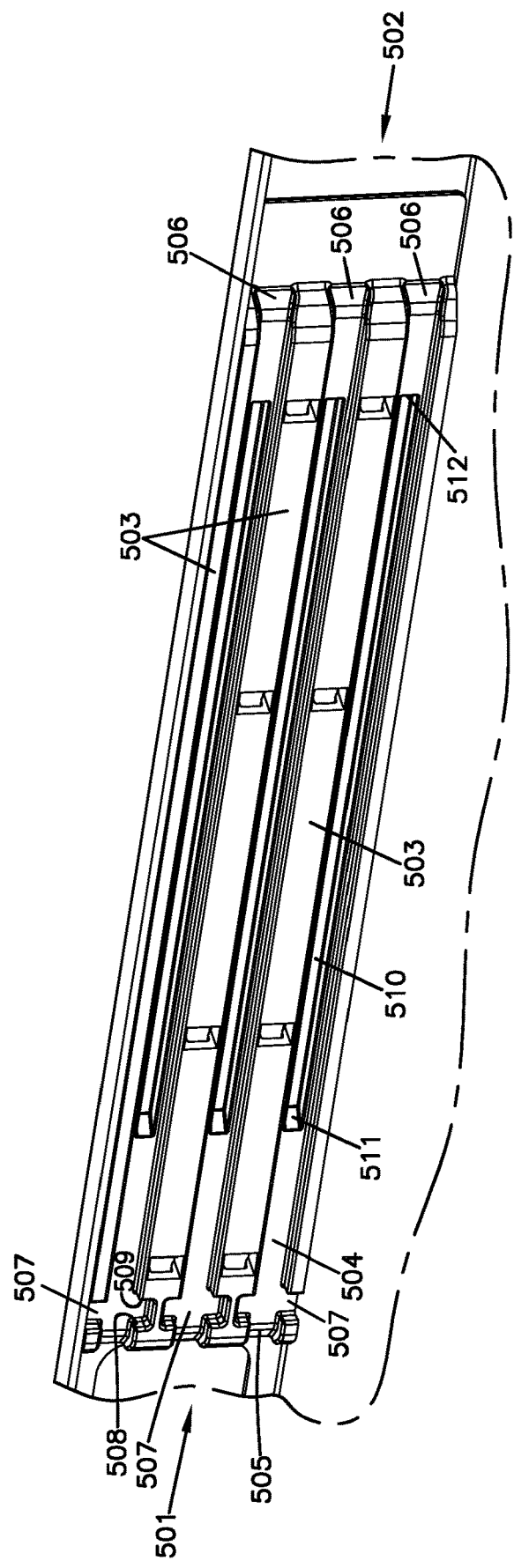
FIG. 37 is a rear perspective view of the guide member of FIG. 36.
Figure 38:
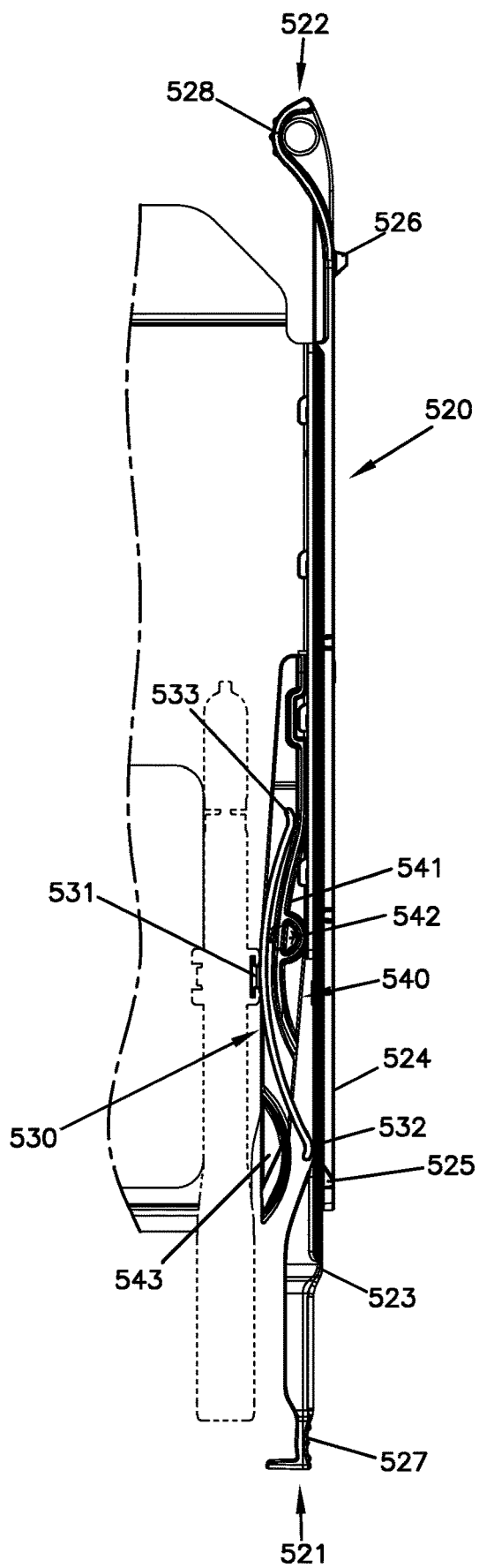
FIG. 38 is a top plan view of an example latching arrangement suitable for use with the guide member of FIG. 36.

FIGS. 36-37 illustrate an example guide member 500 extending between a front 501 and a rear 502. The guide member 500 has an inner surface 503 through which one or more channels 504 are defined. The channels 504 are elongated between the front 501 and rear 502 of the inner surface 503. Each channel 504 is sized to receive the slide 520 of one blade 150, 160, 350, 360, 550. In the example shown, the guide member 500 defines three channels 504. Accordingly, the guide member 500 is configured to hold and guide three blades 150, 160, 350, 360, 550 when mounted to a chassis sidewall. In other examples, the guide member 500 can define a greater or lesser number of channels 504 (e.g., one channel, two channels, four channels, eight channels, etc.).

A forward end 505 of each channel 504 is open to the front 501 of the chassis housing. In some implementations, the forward end 505 is ramped or curved relative to the inner surface 503 to guide the blade slide 520 into/out of the channel 504 from the front 501 of the guide member 500. In other implementations, the forward end 505 of each channel 504 is open to the front without tapering. In some implementations, a rearward end 506 of each channel 504 is ramped or curved relative to the inner surface 503 to guide the blade slide 520 into/out of the channel 504 from the rear 502 of the guide member 500. In other implementations, the rearward end 506 of each channel 504 is open to the rear of the chassis housing without tapering.

A notch 507 is defined in the inner surface 503 at a stop location along the channel 504. In the example shown, the notch 507 is disposed towards the forward end 505 of the channel 504. For example, the ramp or taper at the forward end 505 may extend between the notch 507 and the front 501 of the guide member 500. In the example shown, the notch 507 extends through the inner surface 503 above and below the channel 504. In other examples, the notch 507 may be defined only above or only below the channel 504. A forward portion of the notch 507 defines a rearward facing shoulder 508. A rearward portion of the notch 507 defines a forward facing shoulder 509. In other implementations, however, the forward portion and/or rearward portion may define a cam path ramping from the channel 504 to the inner surface 503.

A trough 510 is recessed into each channel 504 along a portion of the channel 504. The trough 510 extends from a forward end 511 to a rearward end 512. The forward end 511 of the trough 510 is recessed rearwardly from the forward end 505 of the channel 504. The rearward end 512 of the trough 510 is recessed forwardly from the rearward end 506 of the channel 504. In some implementations, the forward end 511 of the trough 510 defines a rearward facing shoulder and the rearward end 512 of the trough 510 defines a cam path from the trough 510 to the channel 504. In other implementations, however, the forward end 511 may define a cam path and/or the rearward end 512 may define a forward facing shoulder.

FIGS. 38-42 illustrate an example latching arrangement 520 suitable for riding along the guide member 500. The latching arrangement 520 includes a body 523 that extends between a front end 521 and a rear end 522. The body 523 includes a slide 524 that is sized and shaped to ride along the channel 504 of the guide member 500. The body 523 also includes at least one forward stop member 525 and at least one rearward stop member 526. In certain implementations, the forward stop member 525 does not extend laterally outwardly beyond the slide 524 and the rearward stop member 526 extends laterally outwardly beyond the slide 526 (see FIG. 38). In certain examples, the body 523 includes two forward stop members above and below the slide 524. In certain examples, the rearward stop member 526 extends outwardly from a middle location (between top and bottom) of the slide 504 towards the rear of the slide 504.

The body 523 also includes a forward handle 527 that is configured to deflect laterally inwardly relative to the blade 150, 160, 350, 360, 550. In the example shown, deflecting the forward handle 527 laterally inwardly causes the forward stop members 525 to move towards the blade 150, 160, 350, 360, 550. The body 523 also includes a rearward handle 528 that is configured to deflect laterally inwardly relative to the blade 150, 160, 350, 360, 550. Deflecting the rearward handle 528 laterally inwardly causes the rearward stop members 526 to move towards the blade 150, 160, 350, 360, 550.

A leaf spring 530 is coupled to the blade 150, 160, 350, 360, 550 to strengthen the forward handle 527. The leaf spring 530 has a mounting portion 531 that couples to the blade 150, 160, 350, 360, 550. In certain implementations, the leaf spring 530 also has a first end 532 that inhibits laterally inward deformation over time of the forward handle 527. For example, the leaf spring 530 may counteract the effects of material deformation within the forward handle 527 that otherwise would have allowed the undeflected position of the forward handle 527 to creep inwardly over time. In certain implementations, the first end 532 applies a force to the forward handle 527 at a location offset from the forward stop member 525.

In some implementations, a latch member 540 also is coupled to the blade 150, 160, 350, 360, 550. The latch member 540 includes a latch body 541 that is coupled to the blade 150, 160, 350, 360, 550 at a pivot location 542. The latch body 541 is elongated between a forward end and a rearward end. The forward and rearward ends pivot relative to the blade 150, 160, 350, 360, 550 about the pivot location 542. The forward end of the latch body 541 defines a handle 543. The rearward end of the latch body 541 includes a stop member 544. When the handle 543 is deflected laterally outwardly, the stop member 544 deflects laterally inwardly.

Figure 39:
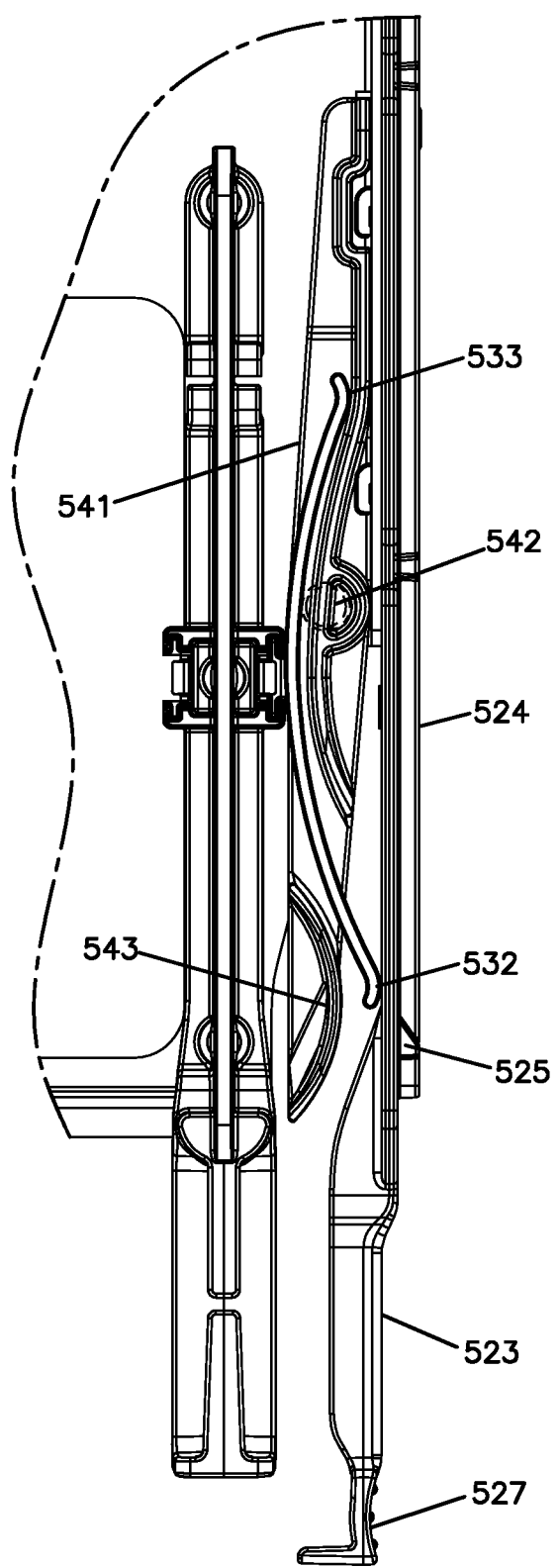
FIG. 39 is an enlarged view of a portion of FIG. 38 with the latch member disposed in an undeflected position.
Figure 40:
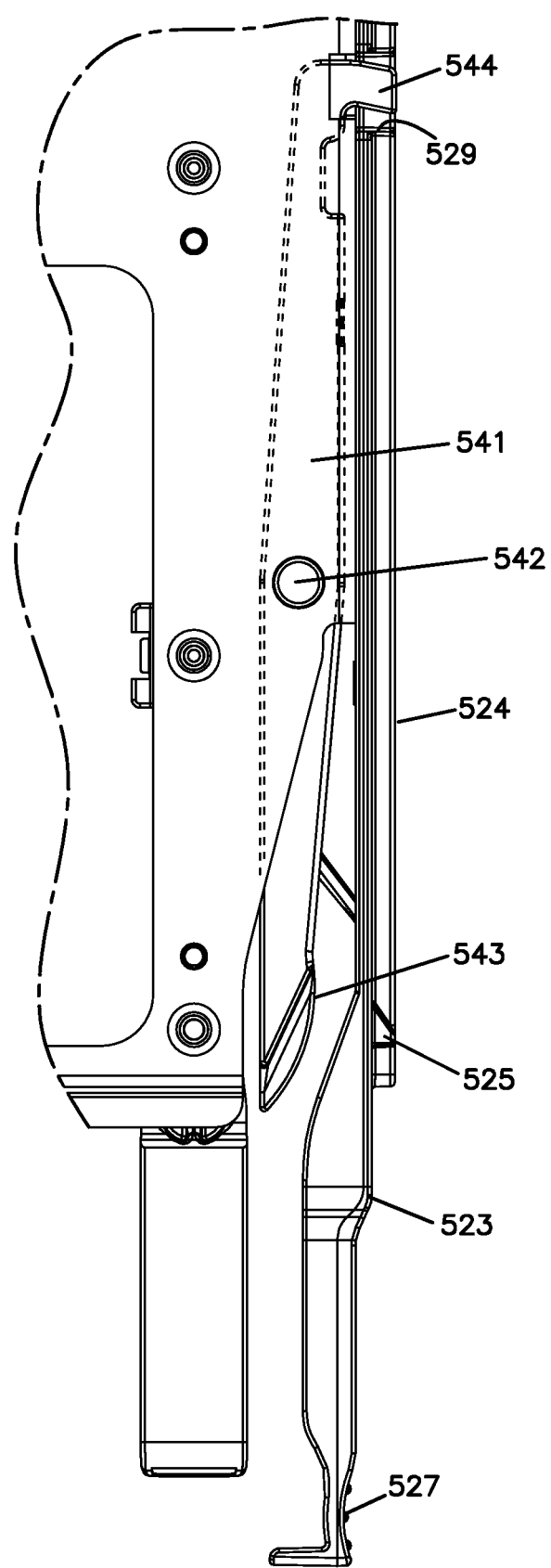
FIG. 40 is a bottom view of the blade and latching arrangement of FIG. 39 with hidden portions of the latch member shown in dashed lines.
Figure 41:
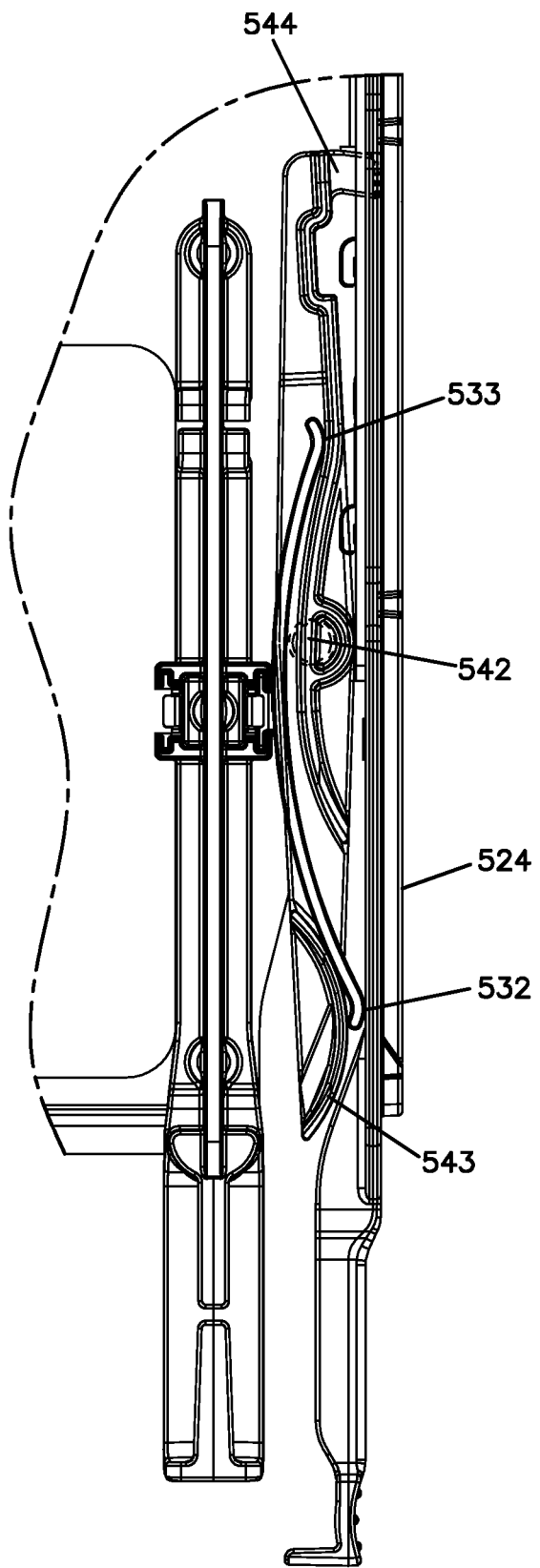
FIG. 41 is an enlarged view of a portion of FIG. 38 with the latch member disposed in a deflected position.

In certain implementations, the leaf spring 530 is configured to bias the stop member 544 of the latch member 540 laterally outwardly (see FIGS. 39 and 40). Laterally outward deflection of the latch handle 543 causes laterally inward deflection of the stop member 544 (see FIGS. 41 and 42). In certain examples, the leaf spring 530 has a second end 533 that engages the latch body 541 rearward of the pivot location 542. In certain examples, the second end 533 of the leaf spring 530 is opposite the first end 532. In certain implementations, the leaf spring 530 is curved between the first and second ends 532, 533.

In use, when the blade 150, 160, 350, 360, 550 is disposed in the operation position relative to the chassis 111, 311, the slide 524 of each latch arrangement 520 is disposed in the channel 504 of a respective guide member 500. The forward stop member(s) 525 are disposed in the notch 507 at the forward end 505 of the channel 504. The rearward stop member 526 is disposed at the rearward end 512 of the trough 510 defined in the channel 504. Engagement between the forward stop member(s) 525 and the rearward facing shoulders 508 at the notch 507 inhibit forward movement of the blade 150, 160, 350, 360, 550 relative to the chassis housing 111, 311. Engagement between the rearward stop member 526 and the forward facing shoulder at the rearward end 512 inhibits rearward movement of the blade 150, 160, 350, 360, 550 relative to the chassis housing 111, 311. In certain examples, engagement between the forward stop member(s) 525 and the forward facing shoulder 509 at the notch 507 inhibit rearward movement of the blade 150, 160, 350, 360, 550 relative to the chassis housing 111, 311. The stop member 544 of the latch member 540 is deflected inwardly through engagement with the interior surface 503 of the guide member 500.

To move the blade 150, 160, 350, 360, 550 forwardly to the connector access position, a user deflects the forward handle 527 of the latching arrangement 520, which retracts the forward stop member(s) 525 from the guide member notch 507. Retracting the forward stop member(s) 525 frees the blade 150, 160, 350, 360, 550 for forward movement. As the blade 150, 160, 350, 360, 550 moves forwardly, the slide 504 glides through the channel 504 and the rearward stop member 526 slides along the trough 510. When the blade 150, 160, 350, 360, 550 reaches the connector access position, the stop member 544 of the latch member 540 snaps into the notch 507. Engagement between the stop member 544 and the rearward facing shoulders 508 at the notch 507 inhibit forward movement of the blade 150, 160, 350, 360, 550 relative to the chassis housing 111, 311. In certain implementations, engagement between the stop member 544 and the forward facing shoulder 509 at the notch 507 inhibit rearward movement of the blade 150, 160, 350, 360, 550 relative to the chassis housing 111, 311.

Figure 42:
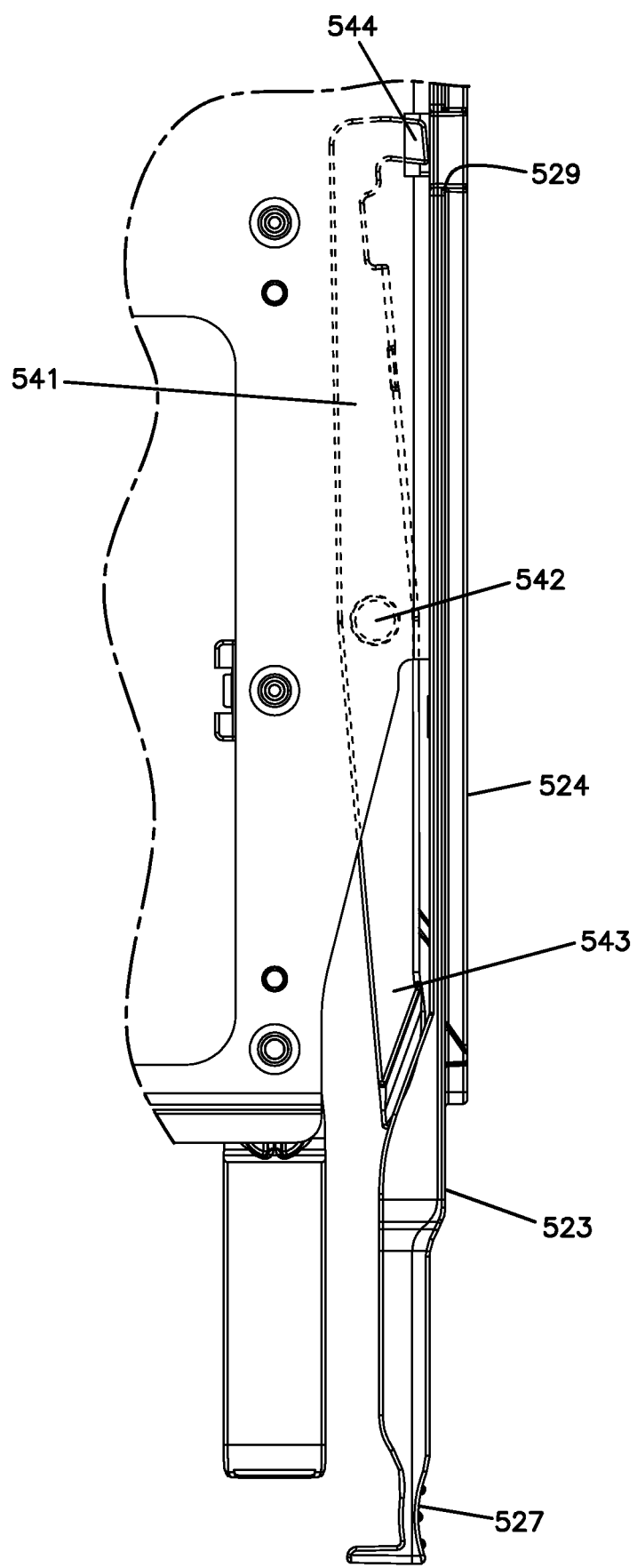
FIG. 42 is a bottom view of the blade and latching arrangement of FIG. 41 with hidden portions of the latch member shown in dashed lines.
Figure 43:
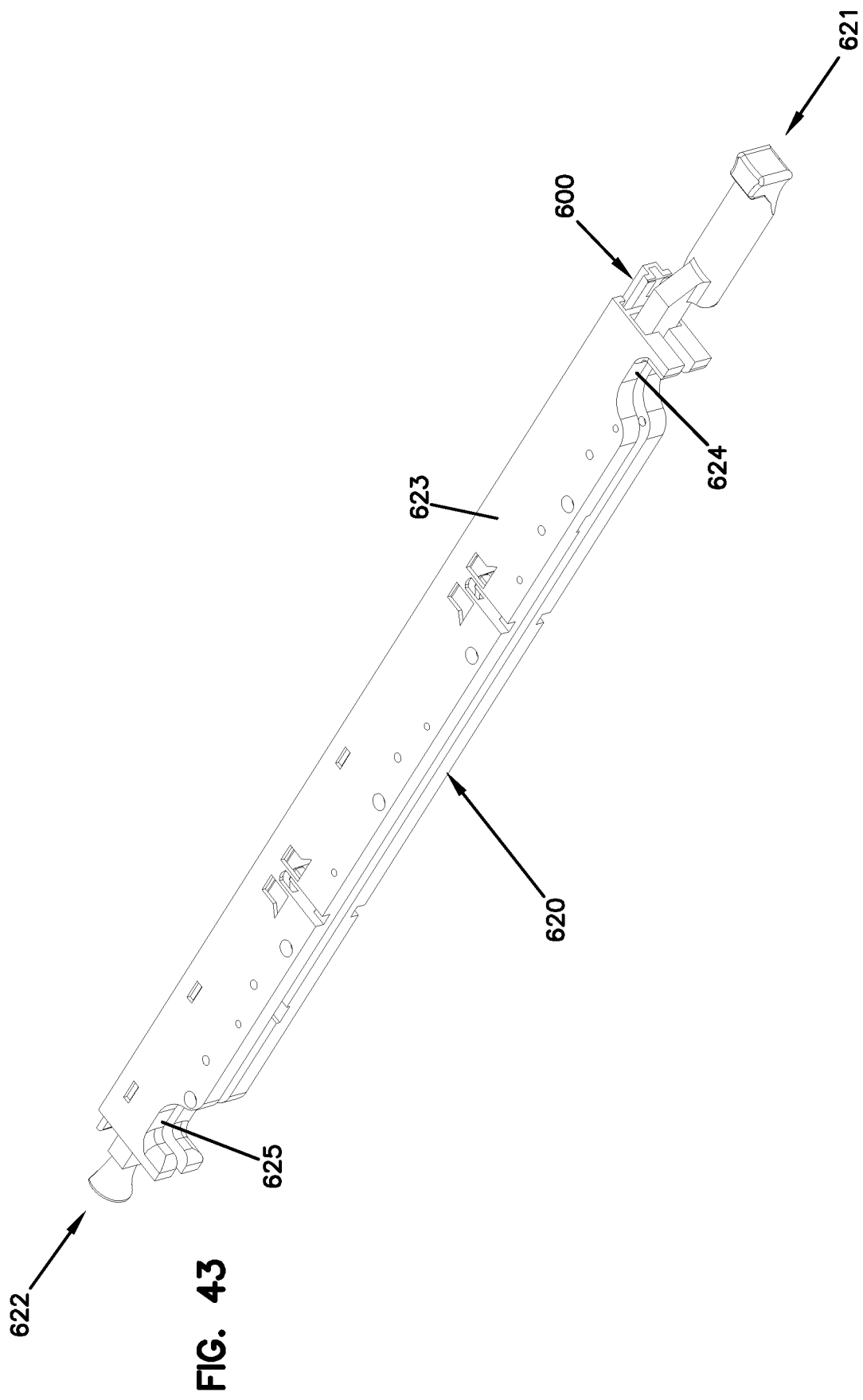
FIG. 43 is a perspective view of an example latching assembly suitable for use in guiding a blade along a chassis.

To move the blade 150, 160, 350, 360, 550 from the connector access position, the user deflects the handle 543 of the latch member 540 (FIG. 41) to retract the stop member 544 from the notch 507 (FIG. 42). When the stop member 544 is retracted from the notch 507, the blade 150, 160, 350, 360, 550 is free to move either forwardly to the adapter access position or rearwardly to the operation position. When the blade 150, 160, 350, 360, 550 reaches the adapter access position, the rear stop member 526 engages the forward end 511 of the trough 510. In certain implementations, the engagement between the rear stop member 526 and the forward end 511 provide tactile feedback to the user that the blade 150, 160, 350, 360, 550 has reached a discrete position.

In certain implementations, the rear stop member 526 has a forward ramped surface configured to ride out of trough 510 when sufficient forward force is applied to the blade 150, 160, 350, 360, 550. Accordingly, in such implementations, the blade 150, 160, 350, 360, 550 can be pulled forwardly out of the chassis from the adapter access position by applying a forward removal force to the blade. In certain implementations, the blade 150, 160, 350, 360, 550 can be returned to the connector access position by applying a rearward force to the blade 150, 160, 350, 360, 550.

To remove the blade 150, 160, 350, 360, 550 from the chassis through the rear of the chassis, a user deflects the rearward handle 528 of the latching arrangement 520, which retracts the rearward stop member(s) 526 from the rear end 512 of the trough 5510. Retracting the rearward stop member(s) 526 frees the blade 150, 160, 350, 360, 550 for rearward movement. As the blade 150, 160, 350, 360, 550 moves rearwardly, the slide 504 glides through the channel 504 and the forward stop member 525 slides along the interior surface 503 of the guide member 500.

FIGS. 43-47 illustrate another example implementation of a latching assembly suitable for use on any of the blades 150, 160, 350, 360, 550 and chassis systems disclosed herein. The latching assembly includes an example latching arrangement 620 and an example guide member 600. The latching arrangements 620 and guide members 600 interact with each other to enable the blade 150, 160, 350, 360, 550 to move between an operating position and a connector access position in which the blade 150, 160, 350, 360, 550 is disposed forwardly of the operating position. In certain implementations, the latching arrangements 520 and guide members 500 interact to enable the blade 150, 160, 350, 360, 550 to move forward of the connector access position to an adapter access position. In certain implementations, the latching arrangements 520 and guide members 500 interact to enable the blade 150, 160, 350, 360, 550 to be locked in one or more of the operation position, the connector access position, and the adapter access position.

In certain implementations, the latching arrangements 520 and guide members 500 interact to enable the blade 150, 160, 350, 360, 550 to be removed from the chassis housing 111, 311 through a front of the chassis housing 111, 311. For example, the blade 150, 160, 350, 360, 550 can be slid forward from the adapter access position until the blade 150, 160, 350, 360, 550 disconnects from the chassis housing 111, 311. In certain examples, a front portion of the latching arrangement 520 must be accessed to remove the blade 150, 160, 350, 360, 550 from the chassis through the front of the chassis. In certain implementations, the latching arrangements 520 and guide members 500 interact to enable the blade 150, 160, 350, 360, 550 to be removed from the chassis housing 111, 311 through a rear of the chassis housing 111, 311. For example, the blade 150, 160, 350, 360, 550 can be slid rearward from the operation position until the blade 150, 160, 350, 360, 550 disconnects from the chassis housing 111, 311. In certain examples, a rear portion of the latching arrangement 520 must be accessed to remove the blade 150, 160, 350, 360, 550 from the chassis through the rear of the chassis.

Figure 44:
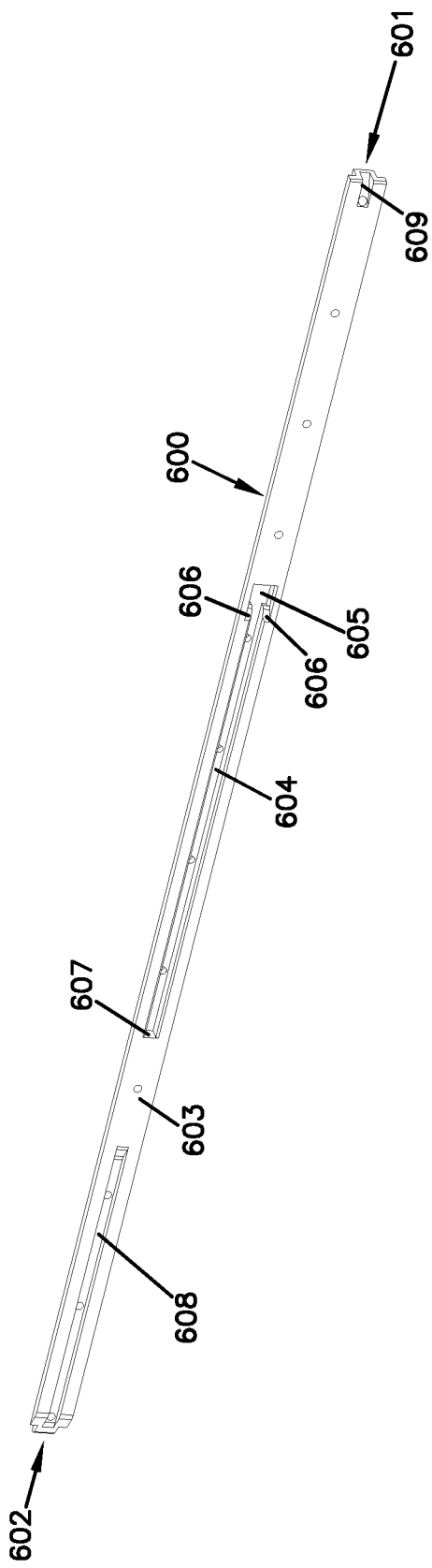
FIG. 44 is a perspective view of an example guide member along which a respective latching arrangement can slide.

FIG. 44 illustrates an example guide member 600 extending between a front 601 and a rear 602. The guide member 600 is configured to be secured to a sidewall of the chassis. In certain implementations, the guide member 600 does not move relative to the chassis. In certain implementations, the guide member 600 includes a rail configured to glide within a channel defined by the latching arrangement 620 (e.g., see FIG. 43).

The guide member 600 has an inner surface 603 in which one or more recessed troughs 604 are defined. In the example shown, a first trough 604 extends rearwardly from a pocket 605 to a rearward end 606. In certain implementations, the pocket 605 defines a rearward facing shoulder. In certain implementations, the rearward end 607 of the trough 610 defines a forward facing shoulder. In certain implementations, the pocket 605 is taller than the trough 604. For example, the pocket 605 may extend outwardly beyond a top and bottom of the trough 604 (see FIG. 44). In certain implementations, cam paths 606 ramp from the interior surface 603 above and below the trough 604 down into the pocket 605 (see FIG. 44).

In some examples, a second trough 608 is defined in the inner surface 603 rearward of the first trough 604. In examples, the second trough 608 is aligned with and spaced rearwardly from the first trough 604. The second trough 608 is open at the rear. In certain implementations, the second trough 608 is ramped or tapered at the front. In certain examples, the forward end of the guide member 600 defines a ramped portion 609. In certain implementations, an additional pocket can be disposed in the inner surface 603 forward of the first trough 610.

Figure 45:
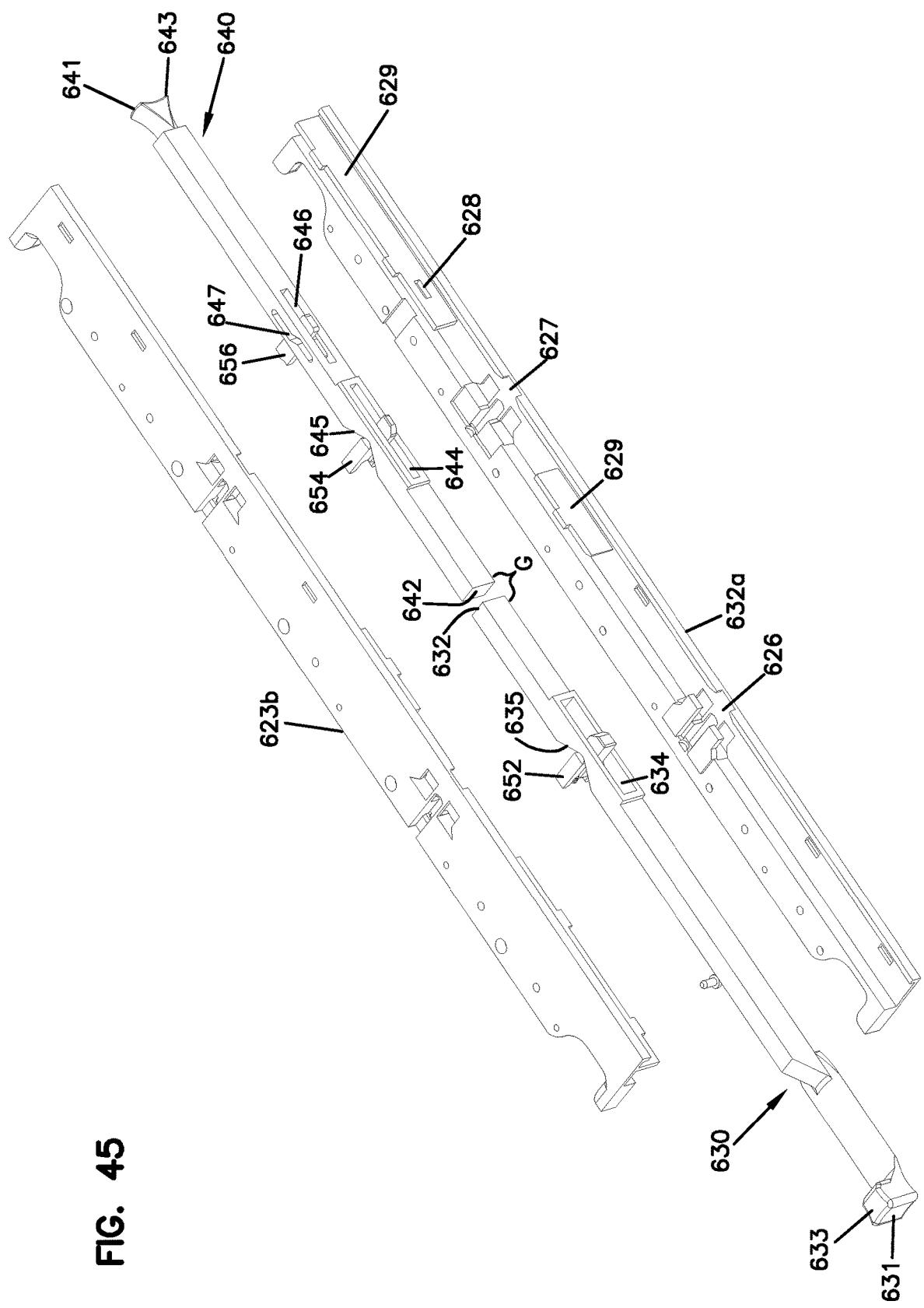
FIG. 45 is an exploded view of an example latching arrangement suitable for use with the guide member of FIG. 44.
Figure 46:
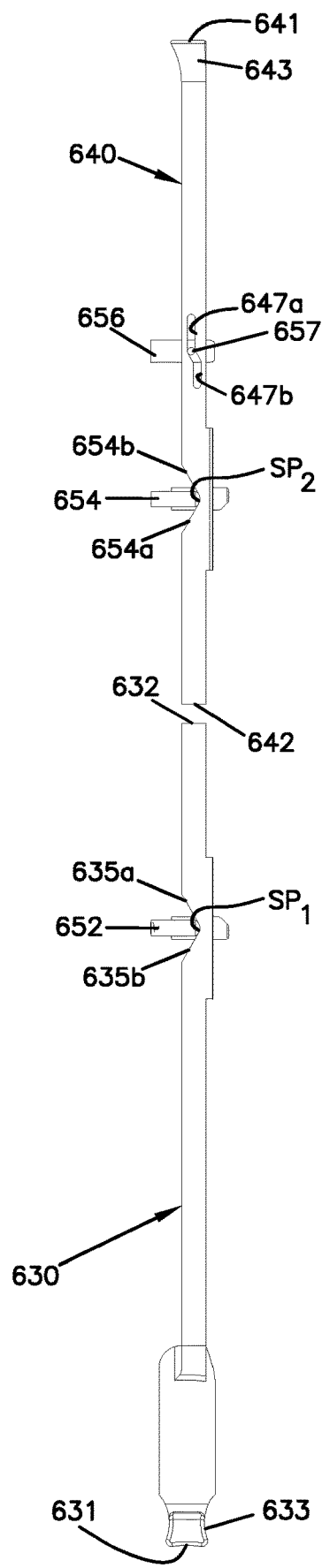
FIG. 46 is a top plan view of portions of the latching arrangement of FIG. 45.
Figure 47:
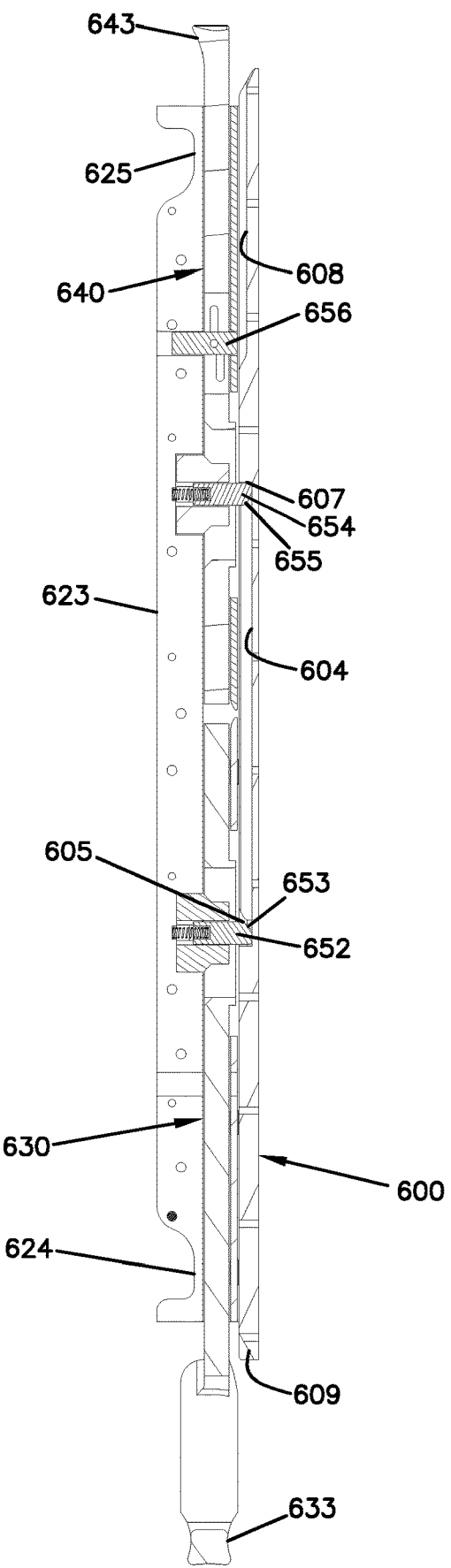
FIG. 47 is an axial cross-sectional view of the latching assembly of FIG. 43 showing the positions of the stop members relative to the guide member when the blade is disposed in an operation position.

FIGS. 45-47 illustrate an example latching arrangement 620 suitable for sliding along the guide member 600. The latching arrangement 620 extends between a front end 621 and a rear end 622. The latching arrangement 620 includes a body 623 that supports a first handle 630, a second handle 640, and one or more stop members. As shown in FIG. 45, the body 623 can include a first body member 623a and a second body member 623b that sandwich the handles 630, 640 and stop members 652, 654, 656 therebetween. The first handle 630 extends forwardly of the body 623. The first handle 630 defines a grip portion 633 that is accessible from the front 621 of the latching arrangement 620. The second handle 640 extends rearwardly of the body 623. The second handle 640 defines a grip portion 643 that is accessible from the rear 622 of the latching arrangement 620.

Each handle 630, 640 is movable forwardly and rearwardly along a respective travel distance relative to the body 623. For example, each handle 630, 640 may be forwardly movable from a starting position along a forward travel distance and rearwardly movable from the starting position along a rearward travel distance. The first handle 630 is separate from the second handle 640 so that forward movement of the first handle 630 does not affect the second handle 640 and rearward movement of the second handle 640 does not affect the first handle 630. The handles 630, 640 are separated by a gap G between opposing surfaces 632, 642 thereof (FIG. 45). Rearward movement of the first handle 630 causes the first handle 630 to cross the gap G and then to move the second handle 640 rearwardly over a portion of the second handle's rearward travel distance. Forward movement of the second handle 640 causes the second handle 640 to cross the gap G and then to move the first handle 630 forwardly over a portion of the first handle's forward travel distance.

In the example shown, the latching arrangement 620 includes a first stop member 652, a second stop member 654, and a third stop member 656. In other implementations, the latching arrangement 620 can include a greater or lesser number of stop members. Each stop member 562, 564, 566 is movable relative to the body 623 between an extended position and a retracted position. When in the extended position, the stop member 652, 654, 656 extends beyond the body 623 towards the guide member 600. In certain implementations, the first stop member 652 defines a rearwardly facing ramp surface 653 and the second stop member 654 defines a forwardly facing ramp surface 655. In the example shown, the first stop member 652 is taller than the second and third stop members 654, 656.

In some implementations, the body 623 can define a first stop member mounting location 626, a second stop member mounting location 627, and a third stop member mounting location 628. The stop member mounting locations 626, 627, 628 are configured to guide the movement of the stop members 652, 654, 656 between the retracted and extended positions. For example, in certain implementations, the stop member mounting locations 626, 627, 628 are configured to maintain linear movement of the stop members 652, 654, 656. In an example, one or more of the stop member mounting locations 626, 627, 628 define grooves along which the stop members 652, 654, 656 glide.

Movement of the first and second handles 630, 640 moves the stop members 652, 654, 656 between extended and retracted positions. In some implementations, one or more of the stop members 652, 654, 656 are spring-biased to the extended position. The body 623 includes one or more walls 629 against which the handles 630, 640 are disposed. The walls 629 retain the handles 630, 640 within the body against the bias of the one or more springs. Each handle 630, 640 defines an opening 634, 644, 646 through which a respective one of the stop members 652, 654, 656 protrudes when in the extended position. The openings 634, 644, 646 are sufficiently wide to accommodate relative movement between the handles 630, 640 and the stop members 652, 654, 656.

In some implementations, the first and second stop members 652, 654 are spring-biased to the extended position. Movement of the handles 630, 640 retracts the respective stop members 652, 654. Each handle 630, 640 defines a cam path 635, 645 along which a portion of the respective stop member 652, 654 rides when the handle 630, 640 is moved. For example, as shown in FIG. 46, each cam path 635, 645 may define an outer ramp 635a, 645a and an inner ramp 635b, 645b. A spring biases the first and second stop members 652, 654 to starting positions SP1, SP2 along the cam path 635, 645.

When the first handle 630 is pulled forwardly (e.g. using grip portion 633), a portion of the first stop member 652 rides over the inner ramp 635a of the first handle 630 from the starting position SP1 to retract the first top member 652. Forward movement of the first handle 630 does not affect the second handle 640 and, accordingly, does not affect the second or third stop members 654, 656. When the second handle 640 is pulled rearwardly (e.g., using grip portion 643), a portion of the second stop member 654 rides over the inner ramp 645a of the second handle 640 from the starting position SP2 to retract the second top member 654. Rearward movement of the second handle 640 does not affect the first handle 630 and, accordingly, does not affect the first stop member 652.

When the first handle 630 is pushed rearwardly, the first handle 630 travels across a gap G (FIG. 45) to engage the second handle 640. Continued rearward movement of the first handle 630 moves the second handle 640 rearwardly. As the first handle 630 is moved rearwardly, the portion of the first stop member 652 rides over the outer ramp 635b of the cam path 635 from the starting position SP1 to retract the first stop member 652. Due to the travel across the gap G, the second handle 640 is moved less than its full rearward travel distance. Accordingly, the second stop member 654 rides only part of the way along the outer ramp 645b and is only partially retracted.

Likewise, when the second handle 640 is pushed forwardly, the second handle 640 travels across a gap G (FIG. 45) to engage the first handle 630 and then moves the first handle 630 forwardly. As the second handle 640 is moved rearwardly, the portion of the second stop member 654 rides over the outer ramp 645b of the cam path 645 from the starting position SP2 to retract the second stop member 654. Due to the travel across the gap G, the first handle 630 is moved less than its full forward travel distance. Accordingly, the first stop member 652 rides only part of the way along the outer ramp 635b and is only partially retracted.

In certain implementations, the third stop member 656 is not spring biased. In certain examples, the third stop member 656 includes a peg 657 that slides along a track 647 defined by the second handle 640. The track 647 has a first section 647a and a second section 647b connected by a short transition section. When the peg 657 is disposed in the first section 647a of the track 647, the third stop member 656 is retracted. When the peg 657 is disposed in the second section 647b of the track 647, the third stop member 656 is extended. When the second handle 640 is disposed in the start position (i.e., the second stop member 654 is disposed in the start position SP2), the peg 657 is disposed in the first track 647a. Rearward movement of the second handle 640 moves the peg 657 into the second section 647b. The rearward movement sufficient to move the peg 657 to the second section 647b of the track 647 is sufficient to only partially retract the second stop member 654.

In use, when the blade 150, 160, 350, 360, 550 is disposed in the operation position relative to the chassis 111, 311, the first stop member 652 is biased (e.g., by a coil spring) to extend into the pocket 605 defined in the guide member 600. Engagement between the first stop member 652 and a forward edge of the pocket 605 inhibits forward motion of the blade 150, 160, 350, 360, 550 relative to the chassis. The second stop member 654 is biased (e.g., by a coil spring) to extend into the rearward end 607 of the trough 604. Engagement between the second stop member 654 and the forwardly facing shoulder at the rearward end 607 inhibits rearward movement of the blade 150, 160, 350, 360, 550. The third stop member remains in the retracted position.

To remove the blade 150, 160, 350, 360, 550 from the chassis through the rear of the chassis, the user pulls the grip portion 643 of the second handle 640 to move the second handle 640 rearwardly. Rearward movement of the second handle 640 retracts the second stop member 654, thereby allowing the second stop member 654 to clear the rearward edge 607 of the trough 604. Rearward movement of the second handle 640 also extends the third stop member 656 into the second trough 608. As the blade 150, 160, 350, 360, 550 is pulled rearwardly, the third stop member 656 glides along the second trough 608 and the second stop member 654 glides initially along an interior surface 603 of the guide member 600 and subsequently along the second trough 608. The first stop member 652 is sufficiently tall to align with the ramp 606 at the pocket 605. Accordingly, forward motion of the blade 150, 160, 350, 360, 550 causes the first stop member 652 to ride up the ramps 606 to retract the first stop member 652. The first stop member 652 then rides along the inner guide surface 603 until reaching the rear end of the guide member 600.

Alternatively, to move the blade 150, 160, 350, 360, 550 forwardly from the operation position to the connector access position, a user pulls the grip portion 633 of the first handle 630 to move the first handle 630 forwardly. Forward movement of the first handle 630 retracts the first stop member 652 from the pocket 605, thereby allowing forward movement of the blade 150, 160, 350, 360, 550. The second stop member 654 rides in the trough 604 until the seconds top member 654 reaches the pocket 605. Engagement between the second stop member 654 and the forward edge of the pocket 605 inhibits forward motion of the blade 150, 160, 350, 360, 550 relative to the chassis.

Releasing the first handle 630 allows the spring of the first stop member 652 to bias the first handle 630 to a starting position, which extends the first stop member 652. In some implementations, the first stop member 652 engages a forward edge of the guide member 600 to inhibit rearward movement of the blade 150, 160, 350, 360, 550 relative to the chassis. In other implementations, the first stop member 652 extends into a second pocket (not shown), which is defined by the guide member 600 forward of the pocket 605, to inhibit rearward movement of the blade 150, 160, 350, 360, 550. Releasing the first handle 630 does not affect the second handle 640.

To move the blade 150, 160, 350, 360, 550 forwardly from the connector access position to the adapter access position, the user pushes rearwardly on the first handle 630. While the first handle 630 is depressed rearwardly, the user pulls the blade 150, 160, 350, 360, 550 forwardly. To facilitate these steps, the body 623 of the latching arrangement 620 defines a finger notch 624 that the user can grasp while depressing the first handle 630. The user squeezes the grip portion 633 of the first handle 630 and the finger notch 624 to effect the forward motion of the blade 150, 160, 350, 360, 550 while pushing the first handle 630 rearwardly.

Moving the first handle 630 rearwardly retracts the first stop member 652. Moving the first handle 630 rearwardly also pushes the second handle 640 rearwardly along a partial rearward travel distance. Accordingly, the second stop member 654 is partially retracted and the third stop member 656 is extended. Partially retracting the second stop member 654 enables the second stop member 654 to cam out of the pocket 605 upon forward movement of the blade 150, 160, 350, 360, 550. For example, forward ramp surface 655 of the second stop member 654 aids in camming the second stop member 654 out of the pocket 605. The third stop member 656 glides along the trough 604 until reaching the pocket 605. Engagement between the third stop member 656 and the forward edge of the pocket 605 inhibits forward motion of the blade 150, 160, 350, 360, 550 relative to the chassis.

Releasing the first handle 630 allows the spring of the first stop member 652 to bias the first handle 630 to a starting position and allows the spring of the second stop member 654 to bias the second handle 640 to the starting position. Accordingly, the third stop member 656 is retracted, thereby freeing the blade 150, 160, 350, 360, 550 for forward movement. Thereby, the blade 150, 160, 350, 360, 550 can be removed from the chassis through the front of the chassis.

To move the blade 150, 160, 350, 360, 550 rearwardly from the adapter access position to the connector access position, the user pushes rearwardly on the blade 150, 160, 350, 360, 550. The third stop member 656 will remain retracted. The second stop member 654 will ride along the interior guide surface 603. If the second stop member 654 is disposed forward of the guide 600 when in the adapter access position, then the ramp 609 will cam the second stop member 654 into a retracted position to enable the second stop member 654 to ride over the interior guide surface 603. Upon reaching the connector access position, the second stop member 654 will be biased into the pocket 605.

To move the blade 150, 160, 350, 360, 550 rearwardly from the connector access position to the operation position, the user pushes forwardly on the first handle 630, thereby retracting the first stop member 652 out of engagement with the guide member 600 (e.g., the front edge or the second pocket). The first stop member 652 can glide along the interior guide surface 603 until reaching the first pocket 605. The second stop member 654 glides along the trough 604 until reaching the rear end 607. Since the stop member 654 is spring biased outwardly, the second stop member 654 will engage the forwardly facing shoulder at the rear end 607 of the trough 604 to stop the tray at the operation position.

In certain implementations, even if the user pushes the first handle 630 rearwardly when moving the blade 150, 160, 350, 360, 550 rearwardly, the blade 150, 160, 350, 360, 550 will stop in the operation position. Due to the gap, moving the first handle 630 rearwardly moves the second handle 640 only a portion of the rearward travel distance. Accordingly, the second stop member 654 is only partially retracted. The rearward edge of the second stop member 654 is not ramped. Accordingly, partially retracting the second stop member 654 is not sufficient to allow the second stop member 654 to clear the rear end 607 of the trough 604.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A chassis system comprising:
   a housing including first and second sides spaced apart along a lateral axis to define an interior, the first and second sides also extending along a forward-rearward axis between a front of the housing and a rear of the housing, the first side including a channel extending along the forward-rearward axis, a forward recess, and a rearward recess spaced along the channel from the forward recess; and
   a blade mountable to the housing to move along the forward-rearward axis between a retracted position and an extended position, which is located further forward along the forward-rearward axis than the retracted position, the blade carrying a latching arrangement, the latching arrangement including:
   a first stop member movably coupled to the blade between a biased position and a deflected position, the first stop member being aligned with the forward recess when the blade is disposed in the retracted position;
   a second stop member movably coupled to the blade between a biased position and a deflected position, the second stop member being aligned with the rearward recess when the blade is disposed in the retracted position and being aligned with the forward recess when the blade is disposed in the extended position;
   a resilient member that biases the first and second stop members laterally outwardly to the biased positions; and
   a handle mounted to the blade and accessible at the front of the housing, the handle being configured to move relative to the resilient member between a non-actuated position and an actuated position, wherein moving the handle to the actuated position causes movement of only the first stop member to the deflected position against a bias of the resilient member.

2. The chassis system of claim 1, wherein the handle laterally deflects between the non-actuated and actuated positions.

3. The chassis system of claim 1, wherein the first stop member is integrally formed with the handle.

4. The chassis system of claim 1, wherein the second stop member is carried by an elongate member that couples to the blade at a mounting location spaced from the second stop member so that the second stop member pivots about the mounting location between the respective biased and deflected positions.

5. The chassis system of claim 4, wherein the elongate member is a separate piece from the resilient member.

6. The chassis system of claim 4, wherein the elongate member defines the second stop member at a distal end.

7. The chassis system of claim 6, wherein the elongate member defines a second handle that is pivotal about the mounting location so that deflection of the second handles moves the second stop member from the biased position to the deflected position.

8. The chassis system of claim 6, wherein the second stop member has a hook shape.

9. The chassis system of claim 1, wherein the handle extends outwardly from the blade along the forward-rearward axis.

10. The chassis system of claim 1, wherein the first and second stop members have different shapes.

11. A chassis system comprising:
    a housing including first and second sides spaced apart along a lateral axis to define an interior, the first and second sides also extending along a forward-rearward axis between a front of the housing and a rear of the housing, the first side including a channel extending along the forward-rearward axis, a forward recess, and a rearward recess spaced along the channel from the forward recess; and
    a blade mountable to the housing to move along the forward-rearward axis between a retracted position and an extended position, which is located further forward along the forward-rearward axis than the retracted position, the blade carrying a latching arrangement, the latching arrangement including an elongate member having a mounting location, a first arm extending outwardly from the mounting location to a first distal end, and a second arm extending outwardly from the mounting location to a second distal end, both the first and second distal ends being located closer to the first side of the housing than to the second side of the housing, the elongate member being coupled to the blade at the mounting location so that the first and second arms are movable relative to the blade, the second distal end of the elongate member defining a stop member that is carried with the second distal end, the stop member being biased towards the first side of the housing, the stop member being aligned with the rearward recess when the blade is disposed in the retracted position and being aligned with the forward recess when the blade is disposed in the extended position.

12. The chassis system of claim 11, wherein the stop member is biased towards the first side of the housing by a resilient member.

13. The chassis system of claim 12, wherein the resilient member is a separate piece from the elongate member.

14. The chassis system of claim 11, further comprising a handle mounted to the blade and accessible at the front of the housing, the handle being configured to move relative to the resilient member between a non-actuated position and an actuated position.

15. The chassis system of claim 14, wherein moving the handle to the actuated position causes movement of the stop member.

16. The chassis system of claim 15, wherein the handle is disposed at a distal end of the second arm of the elongate member.

17. The chassis system of claim 14, wherein the stop member is a rearward stop member; and wherein the chassis system further comprises a forward stop member spaced along the forward-rearward axis from the rearward stop member.

18. The chassis system of claim 17, wherein the forward stop member is movable between biased and deflected positions by the handle.

19. A chassis system comprising:
    a housing including first and second sides spaced apart along a lateral axis to define an interior, the first and second sides also extending along a forward-rearward axis between a front of the housing and a rear of the housing, the first side including a channel extending along the forward-rearward axis, a forward recess, and a rearward recess spaced along the channel from the forward recess; and
    a blade mountable to the housing to move along the forward-rearward axis between a retracted position and an extended position, which is located further forward along the forward-rearward axis than the retracted position, the blade carrying a latching arrangement, the latching arrangement including an elongate member having a mounting location, a first arm extending outwardly from the mounting location to a first distal end, and a second arm extending outwardly from the mounting location to a second distal end, the elongate member being coupled to the blade at the mounting location so that the first and second arms are movable relative to the blade, the second distal end of the elongate member defining a stop member that is carried with the second distal end, the stop member being biased towards the first side of the housing, the stop member being aligned with the rearward recess when the blade is disposed in the retracted position and being aligned with the forward recess when the blade is disposed in the extended position, wherein the stop member is a rearward stop member; and wherein the chassis system further comprises a forward stop member spaced along the forward-rearward axis from the rearward stop member; and a handle mounted to the blade and accessible at the front of the housing, the handle being configured to move relative to the resilient member between a non-actuated position and an actuated position, wherein the forward stop member is movable between biased and deflected positions by the handle, wherein the handle is laterally deflectable.

20. A chassis system comprising:

a housing including first and second sides spaced apart along a lateral axis to define an interior, the first and second sides also extending along a forward-rearward axis between a front of the housing and a rear of the housing, the first side including a channel extending along the forward-rearward axis, a forward recess, and a rearward recess spaced along the channel from the forward recess; and a blade mountable to the housing to move along the forward-rearward axis between a retracted position and an extended position, which is located further forward along the forward-rearward axis than the retracted position, the blade carrying a latching arrangement, the latching arrangement including an elongate member having a mounting location, a first arm extending outwardly from the mounting location to a first distal end, and a second arm extending outwardly from the mounting location to a second distal end, the elongate member being coupled to the blade at the mounting location so that the first and second arms are movable relative to the blade, the second distal end of the elongate member defining a stop member that is carried with the second distal end, the stop member being biased towards the first side of the housing, the stop member being aligned with the rearward recess when the blade is disposed in the retracted position and being aligned with the forward recess when the blade is disposed in the extended position, wherein the stop member is a rearward stop member; and wherein the chassis system further comprises a forward stop member spaced along the forward-rearward axis from the rearward stop member; and a handle mounted to the blade and accessible at the front of the housing, the handle being configured to move relative to the resilient member between a non-actuated position and an actuated position, wherein the forward stop member is movable between biased and deflected positions by the handle, wherein movement of the handle does not affect a position of the rearward stop member.

* * * * *